(12) United States Patent
Chung

(10) Patent No.: US 7,042,244 B2
(45) Date of Patent: May 9, 2006

(54) METHOD OF DETECTING DEFECTS IN TFT-ARRAYS AND A TFT-ARRAY TESTING SYSTEM INCORPORATING THE SAME

(75) Inventor: Kyo Young Chung, San Jose, CA (US)

(73) Assignee: Yieldboost Tech Inc., San Jose, CA (US)

( * ) Notice: Subject to any disclaimer, the term of this patent is extended or adjusted under 35 U.S.C. 154(b) by 0 days.

(21) Appl. No.: 10/876,644

(22) Filed: Jun. 28, 2004

(65) Prior Publication Data

US 2004/0232940 A1    Nov. 25, 2004

Related U.S. Application Data

(63) Continuation-in-part of application No. 10/355,059, filed on Jan. 31, 2003, now Pat. No. 6,862,489.

(51) Int. Cl.
*G01R 31/00* (2006.01)

(52) U.S. Cl. .................................... 324/770

(58) Field of Classification Search ............... None
See application file for complete search history.

(56) References Cited

U.S. PATENT DOCUMENTS 6,275,061 B1 *  8/2001  Tomita ........................ 324/770
6,388,646 B1 *  5/2002  Fujiwara et al. ............. 345/87

* cited by examiner

*Primary Examiner*—Minh N. Tang
(74) *Attorney, Agent, or Firm*—Fleshner & Kim LLP

(57) ABSTRACT

A system and method for detecting defects in TFT-array panels is provided that improves defect detection accuracy by adjusting the thresholding parameters used to classify defective pixels in accordance with the standard deviation of the measured pixel voltages. The present invention is particularly suited for the testing of TFT-array panels that contain more pixels than can be measured by the sensor of the TFT-array tester in a single measurement. The system and method of the present invention calculates a reference pixel voltage at each pixel based on a low frequency component of the measured pixel voltage, and adjusts the thresholding parameters based on the calculated reference pixel voltage.

26 Claims, 38 Drawing Sheets

Defect sorting table

|  |  |  | Defect Found in $DF_{NEW}$ | Defect Not Found in $DF_{NEW}$ |
|---|---|---|---|---|
| Defect Found in $DF_{PRIME}$ | No Repair action taken | Defect Found by Cell inspection | GGc | GUc |
| | | Defect Found by Module inspection | GGm | GUm |
| | | Defect Not Found by Cell or Module inspection | OOn | OGn |
| | Commonly Reported Defects & Repair action taken | Defect Found by Cell inspection | GGcr | |
| | | Defect Found by Module inspection | GGmr | |
| | | Defect Not Found by Cell or Module inspection (repaired) | GGr | |
| Defect Not Found in $DF_{PRIME}$ | | Defect Found by Cell inspection | UGc | UUc |
| | | Defect Found by Module inspection (although not found by Cell inspection) | UGm | UUm |
| | | Defect Not Found by Cell and Module inspection | GOn | GGn |

FIG. 6

Key to Notations:
First Letter (G, U, O) for accuracy of primary test: G=Good, U=Under-kill, O=Over-kill
Second Letter (G, U, O) for accuracy of new test: G=Good, U=Under-kill, O=Over-kill
Third or fourth letter (c,m,n,r): c=Defect detected at cell inspection, m=Defected detected at module inspection, n=No defect found, r=Repair action taken
UUc denotes either defects caused by under-kills in $DF_{PRIME}$ and $DF_{NEW}$ or new defects generated in cell assembly process.
UUm denotes either defects caused by under-kills in $DF_{PRIME}$ and $DF_{NEW}$ or new defects generated in module assembly process.

Revised defect sorting table for primary-test-only at TFT-array test.

| | | | |
|---|---|---|---|
| Defect Found in $DF_{PRIME}$ | No Repair action taken | Defect Found by Cell inspection | GGc |
| | | Defect Found by Module inspection | GGm |
| | | Defect Not Found by Cell or Module inspection | OOn + OGn |
| | Repair action taken | Defect Found by Cell inspection | GGcr + (1-Nc) GUc |
| | | Defect Found by Module inspection | GGmr + (1-Nm) GUm |
| | | Defect Not Found by Cell or Module inspection (repaired) | GGr + Nc GUc + Nm GUm |
| Defect Not Found in $DF_{PRIME}$ | | Defect Found by Cell inspection | UGc + UUc |
| | | Defect Found by Module inspection (although not found by Cell inspection) | UGm + UUm |
| | | Defect Not Found by Cell or Module inspection | GOn + GGn |

FIG. 8

Revised defect sorting table for new-test-only at TFT-array test.

| | Defect Found in $DF_{NEW}$ | Defect Not Found in $DF_{NEW}$ |
|---|---|---|
| Defect Found by Cell inspection | GGc + GGcr + (1 − Nc) UGc | GUc + UUc |
| Defect Found by Module inspection | GGm + GGmr + (1 − Nm) UGm | GUm + UUm |
| Defect Not Found by Cell or Module inspection | OOn + GOn + GGr + Nc UGc + Nm UGm | OGn + GGn |

FIG. 9

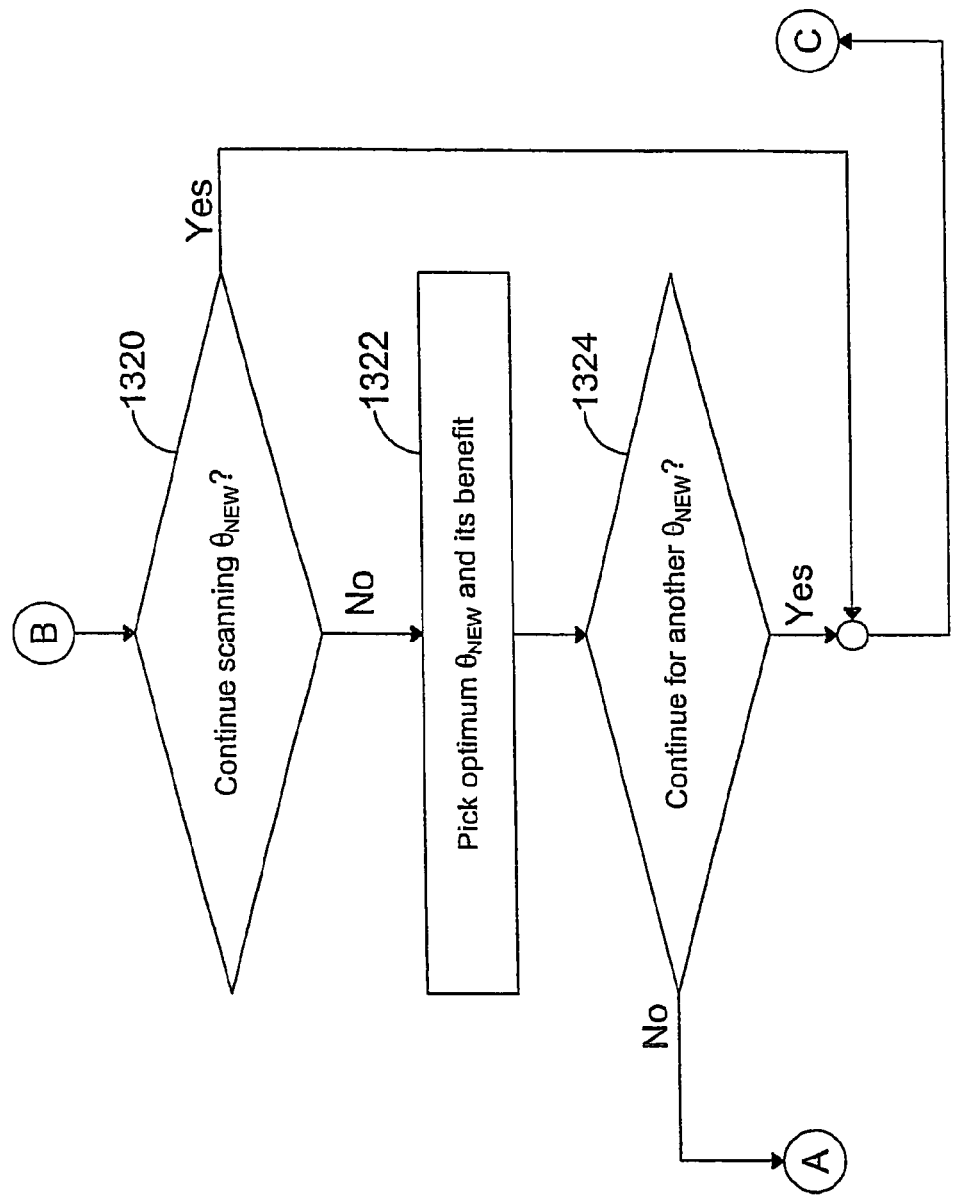

Defect sorting table for tighter $\theta_{NEW}$ for new test recipe.

| | | | Defect Found in $DF_{NEW}$ | Defect NOT Found in $DF_{NEW}$ |
|---|---|---|---|---|
| Defect Found in $DF_{PRIME}$ | No Repair action taken | Defect Found by Cell inspection | GGc | GUc−ΔGUc |
| | | Defect Found by Module inspection | GGm | GUm−ΔGUm |
| | | Defect Not Found by Cell or Module inspection | OOn+ΔOGn | OGn−ΔOGn |
| | Commonly Reported Defects & Repair action taken | Defect Found by Cell inspection | GGcr+(1−Nc)ΔGUc | |
| | | Defect Found by Module inspection | GGmr+(1−Nm)ΔGUm | |
| | | Defect Not Found by Cell or Module inspection(well repaired) | GGr+Nc ΔGUc+Nm ΔGUm | |
| Defect Not Found in $DF_{PRIME}$ | | Defect Found by Cell inspection | UGc+ΔUUc | UUc−ΔUUc |
| | | Defect Found by Module inspection (although not found by Cell inspection) | UGm+ΔUUm | UUm−ΔUUm |
| | | Defect Not Found by Cell and Module inspection | GOn+ΔGGn | GGn−ΔGGn |

FIG. 14

GG'c=GGc
GU'c=GUc−ΔGUc
GG'm=GGm
GU'm=GUm−ΔGUm
OO'n=OOn+ΔOGn
OG'n=OGn−ΔOGn
GG'cr=GGcr+(1−Nc)ΔGUc
GG'mr=GGmr+(1−Nm)ΔGUm
GG'r=GGr+Nc ΔGUc+Nm ΔGUm
UG'c=UGc+ΔUUc
UU'c=UUc−ΔUUc
UG'm=UGm+ΔUUm
UU'm=UUm−ΔUUm
GO'n=GOn+ΔGGn
GG'n=GGn−ΔGGn

Where Nc=Nm=GGr/(GGmr+GGcr+GGr)

Defect sorting table for looser θ$_{NEW}$ for new test recipe.

| | | | Defect Found in DF$_{NEW}$ | Defect NOT Found in DF$_{NEW}$ |
|---|---|---|---|---|
| Defect Found in DF$_{PRIME}$ | No Repair action taken | Defect Found by Cell inspection | GGc-ΔGGc | GUc+ΔGGc+ΔGGcr+ ΔGGr GUc/(GUc+GUm) |
| | | Defect Found by Module inspection | GGm-ΔGGm | GUm+ΔGGm+ΔGGmr+ ΔGGr GUm/(GUc+GUm) |
| | | Defect Not Found by Cell or Module inspection | OOn-ΔOOn | OGn+ΔOOn |
| | Commonly Reported Defects & Repair action taken | Defect Found by Cell inspection | GGcr-ΔGGcr | |
| | | Defect Found by Module inspection | GGmr-ΔGGmr | |
| | | Defect Not Found by Cell or Module inspection(well repaired) | GGr-ΔGGr | |
| Defect Not Found in DF$_{PRIME}$ | | Defect Found by Cell inspection | UGc-ΔUGc | UUc+ΔUGc |
| | | Defect Found by Module inspection (although not found by Cell inspection) | UGm-ΔUGm | UUm+ΔUGm |
| | | Defect Not Found by Cell and Module inspection | GOn-ΔGOn | GGn+ΔGOn |

GUc is increased by ΔGGc, ΔGGcr, and ΔGGr GUc/(GUc+GUm).
GUm is increased by ΔGGm, ΔGGmr, and ΔGGr GUm/(GUc+GUm).

GG'c=GGc-ΔGGc
GU'c=GUc+ΔGGc+ΔGGcr+ΔGGr GUc/(GUc+GUm)
GG'm=GGm-ΔGGm
GU'm=GUm+ΔGGm+ΔGGmr+ΔGGr GUm/(GUc+GUm)
OO'n=OOn-ΔOOn
OG'n=OGn+ΔOOn
GG'cr=GGcr-ΔGGcr
GG'mr=GGmr-ΔGGmr
GG'r=GGr-ΔGGr
UG'c=UGc-ΔUGc
UU'c=UUc+ΔUGc
UG'm=UGm-ΔUGm
UU'm=UUm+ΔUGm
GO'n=GOn-ΔGOn
GG'n=GGn+ΔGOn

FIG. 15

Revised defect sorting table in conjunction with initial defect sorting of FIG. 11 for primary-test-only at TFT-array test.

| | | | |
|---|---|---|---|
| Defect Found in $DF_{PRIME}$ | No Repair action taken | Defect Found by Cell inspection | $CSDnr=GGc$ |
| | | Defect Found by Module inspection | $MSDnr=GGm$ |
| | | Defect Not Found by Cell or Module inspection | $Q=OOn + OGn$ |
| | Repair action taken | Defect Found by Cell inspection | $CSDrp=GGcr + (1-Nc)\ GUc$ |
| | | Defect Found by Module inspection | $MSDrp=GGmr + (1-Nm)\ GUm$ |
| | | Defect Not Found by Cell or Module inspection (repaired) | $Well=GGr + Nc\ GUc + Nm\ GUm$ |
| Defect Not Found in $DF_{PRIME}$ | | Defect Found by Cell inspection | $CPD+CND=UGc + UUc$ |
| | | Defect Found by Module inspection (although not found by Cell inspection) | $MPD+MND=UGm + UUm$ |
| | | Defect Not Found by Cell or Module inspection | $GOn + GGn$ |

FIG. 16

Distribution of the pixel voltages of TFT-array panel. The dashed line is for normal pixel voltages and the solid line is for defect pixel voltages.

Effect of changing threshold for cells (dashed line) and module (solid line) yield.

Effect of changing threshold for total monetary benefit.

Under-killed defects for different defect density values.

METHOD OF DETECTING DEFECTS IN TFT-ARRAYS AND A TFT-ARRAY TESTING SYSTEM INCORPORATING THE SAME

CROSS-REFERENCE TO RELATED APPLICATIONS

This application is a continuation-in-part of U.S. patent application Ser. No. 10/355,059, filed Jan. 31, 2003, now U.S. Pat. No. 6,862,489 issued on Mar. 1, 2005, the contents of which are incorporated herein by reference.

BACKGROUND OF THE INVENTION

1. Field of the Invention

This invention relates to LCD manufacturing and, more particularly, to a system and method for detecting defects in TFT-array panels.

2. Background of the Related Art

Yield management is important in LCD manufacturing. In LCD manufacturing, a single large plate of glass is divided into just a handful of LCD panels. As consumer demand grows for larger and larger displays, substrates get larger and the number of LCD panels per glass plate decreases. Accordingly, production yields are critical in LCD manufacturing.

The majority of the costs of an LCD panel comes from manufacturing. As a result, profitability is closely linked to yield rates. Any changes in yield rates will have a financial impact.

LCD panel production is a highly automated process involving various manufacturing stages. Each manufacturing stage consists of many complex steps. For example, one stage of the process creates the thin-film transistor arrays on the glass substrate, which includes multiple passes of thin film deposition, resist layers, exposure, development, etching and stripping. The opportunities for defects occur at nearly every step of every stage in the manufacturing process.

Defects take several different forms, and can generally be divided into optical, mechanical and electrical defects. Some of these defects can be repaired, while others are permanent and may be severe enough to render the LCD panel unusable.

Optical defects are the most common defect. When this type of defect is present, a pixel is "stuck" in either a bright state, in which the pixel always transmits light, or a dark state, in which the pixel never transmits light. The most common cause for this type of defect is an electrical problem, such as a short or an open circuit in the cell's transistor or signal leads. Light or dark spots can also be caused by foreign particle contamination between the glass plates, or between the LCD panel and the backlight.

Another type of optical defect is non-uniformity, which can be caused by non-uniform cell gaps that result in varying thickness of the liquid crystal layer. Uniformity problems can also be caused by errors in the rubbing process for liquid crystal alignment layers, inconsistent color filter thickness or incomplete removal of chemical residues.

Mechanical defects can include broken glass and broken electrical connections. Broken electrical connections can arise from improper assembly, errors in alignment of the components and/or mishandling.

Some LCD manufacturers use testing and inspection equipment that can automatically evaluate panels at intermediate points in the manufacturing process. In some cases, the defects can be automatically repaired. However, comprehensive testing in the LCD production process slows down production. In addition, there are capital and maintenance costs associated with the test equipment. Accordingly, manufacturers have to balance the need for comprehensive and accurate testing against the need to avoid slowing production as much as possible.

SUMMARY OF THE INVENTION

An object of the invention is to solve at least the above problems and/or disadvantages and to provide at least the advantages described hereinafter.

To achieve the objects, and in accordance with the purpose of the invention, as embodied and broadly described herein, the present invention provides a system and method for detecting defects in TFT-array panels. The system and method of the present invention improves defect detection accuracy by adjusting the thresholding parameters used to classify defective pixels in accordance with the standard deviation of the measured pixel voltages.

The present invention is particularly suited for the testing of TFT-array panels that contain more pixels than can be measured by the sensor of the TFT-array tester in a single measurement. In this case, the TFT-array tester needs to perform multiple measurements in order to measure all the pixels in the TFT-array panel. The system and method of the present invention calculates the standard deviation of the measured pixel voltages at each measurement point, and adjusts the thresholding parameters based on the calculated standard deviation. Accordingly, the system and method of the present invention helps to compensate for differences in the measured pixel voltages between measurement points due to environmental factors or other causes.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a defect sorting table, in accordance with the present invention;

FIG. 8 is a revised defect sorting table for primary-test-only at the TFT-array test stage, in accordance with the present invention;

FIG. 9 is a revised defect sorting table for new-test-only at the TFT-array test stage, in accordance with the present invention;

FIGS. 13A–13D illustrate a flow chart of a process for profit maximization of new and primary test recipes, in accordance with the present invention;

FIG. 14 is a defect sorting table for tighter new thresholding parameters for a new test recipe, in accordance with the present invention;

FIG. 15 is a defect sorting table for looser new thresholding parameters for a new test recipe, in accordance with the present invention;

FIG. 16 is a revised defect sorting table, in conjunction with the initial defect sorting of FIG. 11, for primary-test-only at the TFT-array test stage, in accordance with the present invention;

DETAILED DESCRIPTION OF PREFERRED EMBODIMENTS

I. Thin-Film Transistor (TFT) Liquid Crystal Display (LCD) Fabrication

Figure 1A:
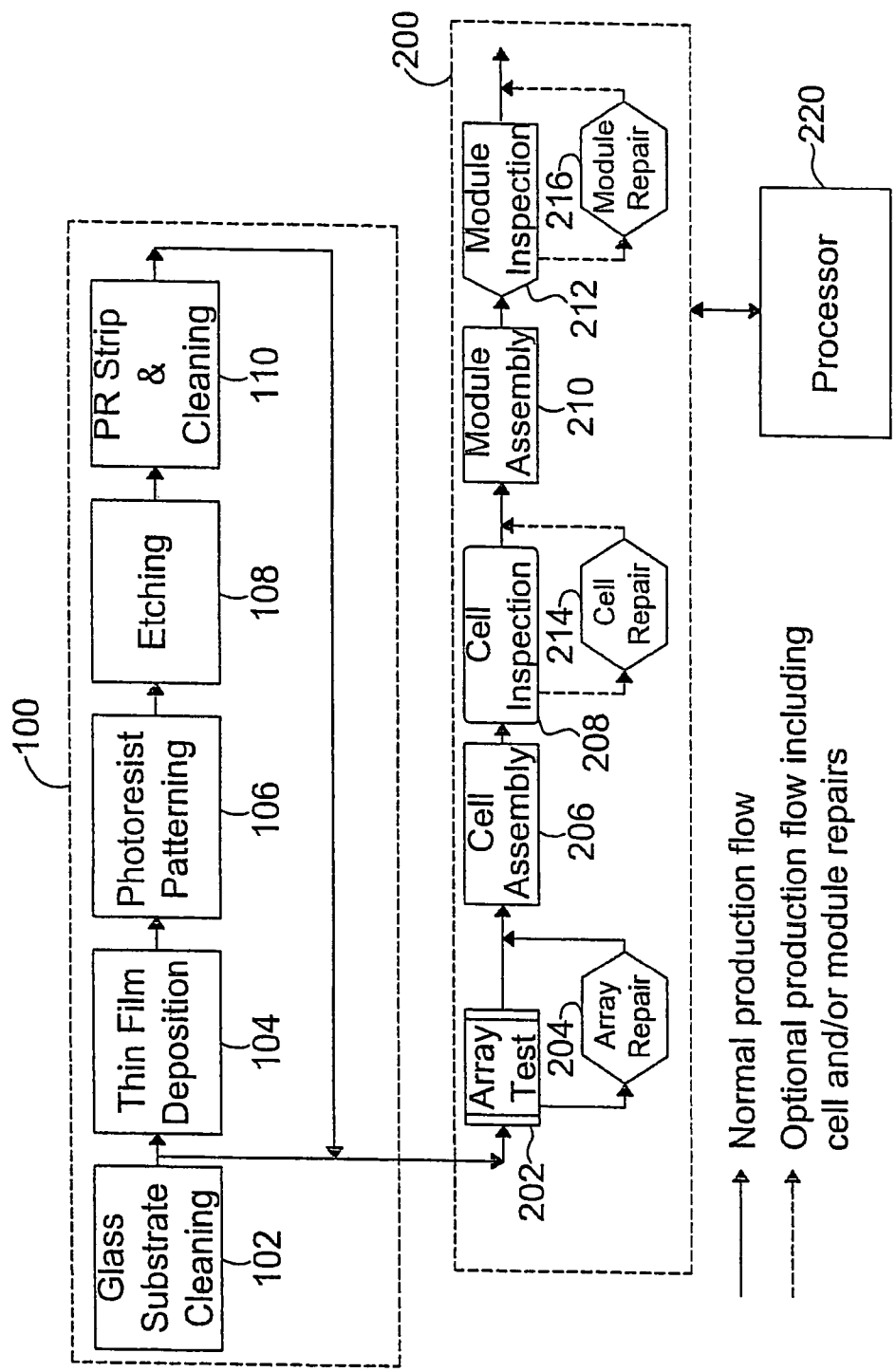
FIG. 1A is a block diagram of the process flow for TFT-LCD fabrication, in accordance with the present invention.

FIG. 1A is a block diagram of the process flow for TFT-LCD fabrication. The fabrication process can be divided into two stages, an array panel fabrication stage 100, in which the thin-film transistor (TFT) array panels are fabricated on a substrate, and a test and assembly stage 200, in which the TFT-array panels are tested and the displays are assembled.

In the array panel fabrication stage, the glass substrate on which the TFT-array panels are fabricated is cleaned at step 102. Steps 104–110 represent well known process steps for forming TFT-array panels on a glass substrate. They consist of a thin film deposition step 104, a photoresist patterning step 106, and etching step 108 and a photoresist stripping and cleaning step 110. Steps 104–110 are repeated for each patterned thin film layer that is deposited on the glass substrate.

Multiple TFT-array panels are typically fabricated on each glass substrate, which are also referred to as TFT-array base plates. A display unit, such as an LCD display, utilizes one TFT-array panel.

Once the TFT-array panels are fabricated on the glass substrate, the TFT-array panels proceed to the test and assembly stage 200, during which the TFT-array panels are tested, the liquid crystal (LC) cells are assembled and separated, and the electrical connections are made to the liquid crystal cells to yield the liquid crystal modules that will ultimately be used in the LCDs. The assembly stage consists of various substages, including an array test stage 202, an array repair stage 204, a cell assembly stage 206, a cell inspection stage 208, a module assembly stage 210 and a module inspection stage 212. The assembly stage 200 may also optionally include a cell repair stage 214 and a module repair stage 216.

In the array test stage 202, each TFT-array panel is tested by driving the panel with a test signal, which will be explained in more detail below. TFT-array panels that are determined to be bad (e.g., defective) are sent to the array repair stage 204. The panels that are determined to be good are sent to the cell assembly stage 206. In the array repair stage 204, the bad panels that can be repaired are repaired using techniques known in the art, and the repaired panels are then sent to the cell assembly stage 206.

In the cell assembly stage 206, the LC cells are assembled by laminating front and rear glass plates to the TFT-array panels and injecting liquid crystal material between the front and rear glass plates using techniques known in the art. In addition, the individual LC cells are separated from each other at this stage by dicing the TFT-array base plate (glass substrate).

The assembled and separated LC cells are then sent to the cell inspection stage 208, where they are inspected for defects. LC cells that are determined to be damaged can be sent to an optional cell repair stage 214. The LC cells that are determined to be good LC cells, and the repaired LC cells, if the optional cell repair stage 214 is implemented, are then sent to the module assembly stage 210.

In the module assembly stage 210, the required electrical connections are made to the LC cells to yield the LCD modules that will ultimately be used in LCDs. The LCD modules then proceed to the module inspection stage 212, where they are tested using techniques known in the art. An optional module repair stage 216 can be used to repair LCD modules that are deemed to be defective at the module inspection stage 212.

Figure 1B:
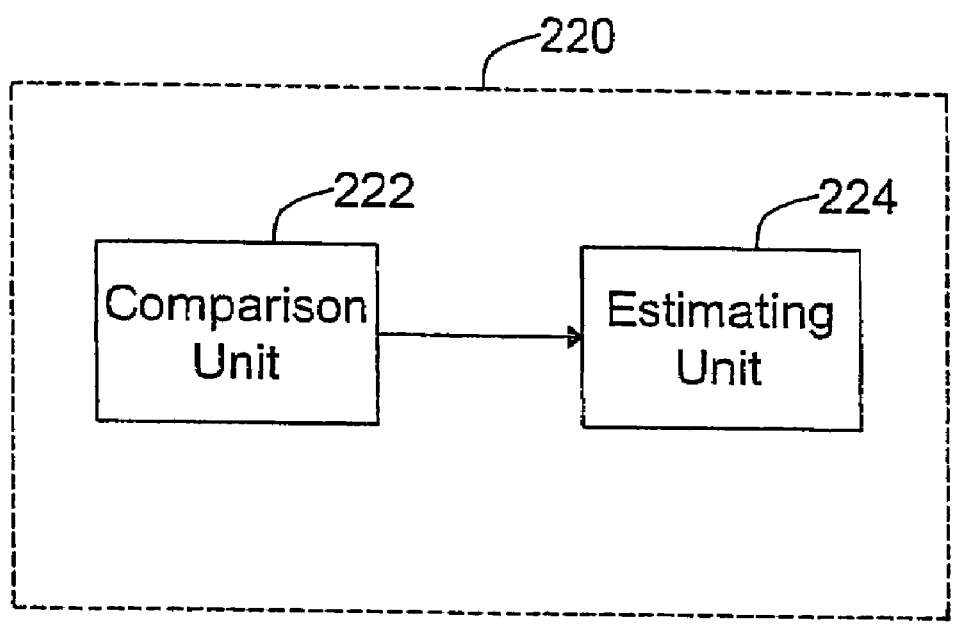
FIG. 1B is a block diagram of one preferred embodiment of the processor of FIG. 1A.

A processor 220 sends and receives data to/from the test and assembly stage 200. In a preferred embodiment, shown in FIG. 1B, the processor 220 includes a comparison unit 222 and an estimating unit 224. The comparison unit 222 compares the inputs and outputs of the various substages in the test and assembly stage 200 for different manufacturing setups. The estimating unit 224 receives comparison data from the comparison unit 222, and estimates the effect that a change in the manufacturing setup has on a desired parameter, such as profit. The estimating unit 224 utilizes methodologies that will be described below. The estimate data produced by the estimating unit 224 may be used to optimize the manufacturing setup used by the test and assembly stage 200.

II. Profit Model for TFT-LCD Fabrication

A profit model for TFT-LCD fabrication, in accordance with one embodiment of the present invention, will be described with reference to FIG. 2, which is a block diagram of the assembly stage 200 of the process flow shown in FIG. 1.

Figure 2:
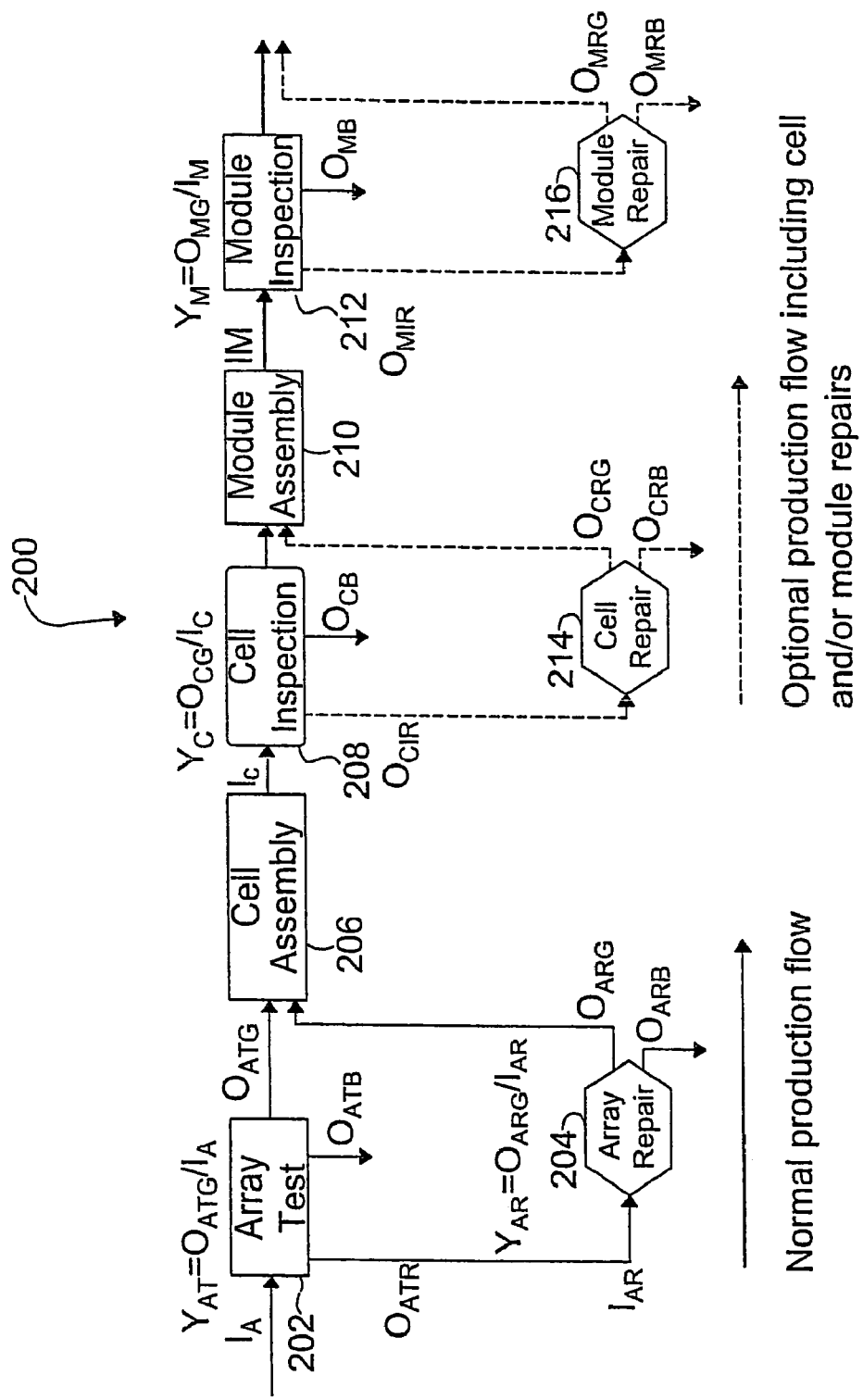
FIG. 2 is a block diagram of the assembly stage 200 of the process flow shown in FIG. 1.

The variables used to describe the main process stages of FIG. 2 are defined as follows:

$I_A$=Number of input panels to array test stage 202;
$I_{AR}$=Number of input panels to array repair stage 204;
$I_C$=Number of input panels to cell inspection stage 208;
$I_M$=Number of input panels to module inspection stage 212;
$O_{ATG}$=Number of passed panels at array test stage 202;
$O_{ATB}$=Number of irreparably bad panels at array test stage 202;
$O_{ATR}$=Number of reparable panels at array test stage 202, which is the same as $I_{AR}$;
$O_{ARG}$=Number of passed panels at array repair stage 204;
$O_{ARB}$=Number of bad panels at array repair stage 204;
$O_{CG}$=Number of passed panels at cell inspection stage 208;
$O_{CB}$=Number of irreparably bad panels at cell inspection stage 208;
$O_{MG}$=Number of passed panels at module inspection stage 212; and
$O_{MB}$=Number of irreparably bad panels at module inspection stage 212.

For the optional production flow stages 214 and 216, the additional variables used are defined as follows:

$O_{CIR}$=Number of reparable panels at cell inspection stage 208;
$O_{MIR}$=Number of reparable panels at module inspection stage 212;
$O_{CRG}$=Number of passed panels at cell repair stage 214;
$O_{MRG}$=Number of passed panels at module repair stage 216;
$O_{CRB}$=Number of bad panels at cell repair stage 214; and
$O_{MRB}$=Number of bad panels at module repair stage 216.

A model that describes the relationship between profits and variations in yields at cell and module inspections will now be described. Certain cost variables will be used as follows:

$C_A$=Cost to make a TFT panel;
$C_T$=Cost to test a TFT panel;
$C_R$=Cost to repair a TFT panel;
$C_C$=Cost of cell assembly for a TFT panel;
$C_{CI}$=Cost of cell inspection for a TFT panel;
$C_M$=Cost of module assembly for a TFT panel; and
$C_{MI}$=Cost of module inspection for a TFT panel.

In order to have an initial reference for the evaluation of changes in the manufacturing parameters used in the testing, inspection, or assembly stages, a current manufacturing setup is called a "primary manufacturing setup", and the results obtained with the primary manufacturing setup are referred to as "primary results."

The cost analysis is done in connection with the assembly stage 200 of the process flow, without the optional cell repair stage 214 and module repair stage 216. This assumes that there is no difference in costs and output quantities between the primary manufacturing setup and a proposed new manufacturing setup. The cost to manufacture a TFT-LCD panel using the primary setup, $COST_{PRIME}$, can be expressed as follows:

$$COST_{PRIME} = \text{Array manufacturing cost} + \text{Array test cost} + \text{Array repair cost} + \text{Cell assembly cost} + \text{Cell inspection cost} + \text{Module assembly cost} + \text{Module inspection cost.} \quad (1)$$

One can obtain the expressions for the cost values as follows:

$$\text{Array manufacturing cost} = I_A C_A \quad (2)$$

$$\text{Array test cost} = I_A C_T \quad (3)$$

$$\text{Array repair cost} = I_{AR} C_R \quad (4)$$

$$\text{Cell assembly cost} = I_C C_C \quad (5)$$

$$\text{Cell inspection cost} = I_C C_{CI} \quad (6)$$

$$\text{Module assembly cost} = I_M C_M \quad (7)$$

$$\text{Module inspection cost} = I_M C_{MI} \quad (8)$$

The yields at each stage are defined as follows:

$$\text{Yield of array test } (Y_{AT}) = O_{ATG}/I_A \quad (9)$$

$$\text{Yield of array repair } (Y_{AR}) = O_{ARG}/I_{AR} \quad (10)$$

$$\text{Yield of cell inspection } (Y_C) = O_{CG}/I_C \quad (11)$$

$$\text{Yield of module inspection } (Y_M) = O_{MG}/I_M \quad (12)$$

Since $I_M = O_{CG}$ without the optional cell repair and module repair stages 214 and 216, Equation (11) can be written as:

$$I_M = Y_C I_C \quad (13)$$

From Equations (1), (2)–(8), and (13) one obtains:

$$COST_{PRIME} = I_A C_A + I_A C_T + I_{AR} C_R + I_C C_C + I_C C_{CI} + Y_C I_C C_M + Y_C I_C C_{MI} \quad (14)$$

The value of the final TFT-LCD module output, in the case of the primary manufacturing setup without the optional cell repair and module repair stages 214 and 216, can be expressed as follows:

$$PRODUCT_{PRIME} = O_{MG} P_{VALUE}, \quad (15)$$

where $P_{VALUE}$ is the value of a TFT-LCD module fabricated using the primary manufacturing setup. From Equations (12), (13), and (14), one obtains:

$$PRODUCT_{PRIME} = Y_M Y_C I_C P_{VALUE} \quad (16)$$

When a new manufacturing setup is used in the array test stage 202, cell inspection stage 206, module inspection stage 212, cell assembly stage 206, and/or module assembly stage 210, one can expect to have new values represented by the following variables:

$I'_{AR}$=New number of input panels to array repair;
$I'_{C}$=New number of input panels to cell inspection;
$I'_{M}$=New number of input panels to module inspection;
$O'_{ATG}$=New number of passed panels at array test;
$O'_{ATB}$=New number of irreparably bad panels at array test;
$O'_{ATR}$=New number of reparable panels at array test, which is the same as $I'_{AR}$;
$O'_{ARG}$=New number of passed panels at array repair;
$O'_{ARB}$=New number of bad panels at array repair;
$O'_{CG}$=New number of passed panels at cell inspection, which is same as $I'_M$;
$O'_{CB}$=Number of bad panels at cell inspection;
$O'_{MG}$=New number of passed panels at module inspection;
$O'_{MB}$=New number of bad panels at module inspection;
$Y'_{AT}$=New yield of array test;
$Y'_{AR}$=New yield of array repair;
$Y'_{C}$=New yield of cell inspection; and
$Y'_{M}$=New yield of module inspection.

One can then obtain a new set of expressions for the new manufacturing setup, without the optional cell repair and module repair stages 214 and 216, as follows:

$$COST_{NEW} = I_A C_A + I_A C_T + I'_{AR} C_R + I'_C C_C + I'_C C_{CI} + Y'_C I'_C C_M + Y'_C I'_C C_{MI} \quad (17)$$

$$PRODUCT_{NEW} = Y'_M Y'_C I'_C P'_{VALUE}, \quad (18)$$

where $P'_{VALUE}$ is the value of the TFT-LCD module fabricated with the new manufacturing setup.

The profit increase (or deficit decrease), P, that results from the new manufacturing setup is obtained as follows:

$$P = COST_{PRIME} - COST_{NEW} + PRODUCT_{NEW} - PRODUCT_{PRIME} \quad (19)$$

From Equations (14), (16), (17), (18), and (19) one obtains the following expression for P:

$$P = (I_{AR} - I'_{AR}) C_R + (I_C - I'_C) C_C + (I_C - I'_C) C_{CI} + Y_C I_C C_M + Y_C I_C C_{MI} - Y'_C I'_C C_M - Y'_C I'_C C_{MI} + Y'_M Y'_C I'_C P'_{VALUE} - Y_M Y_C I_C P_{VALUE} \quad (20)$$

During regular production of a TFT-LCD, one can assume that $O_{ATB} + O_{ARB} \cong O'_{ATB} + O'_{ARB}$, because a bad panel usually gets carried to the next process stage, as the individual panels have not yet been separated from each other and are all on a common TFT-array base plate. If this assumption is valid, then with $$I_C = I_A - (O_{ATB} + O_{ARB}), \text{ and} \quad (21)$$

$$I'_C = I_A - (O'_{ATB} + O'_{ARB}), \quad (22)$$

one obtains:

$$I_C = I'_C \quad (23)$$

Using Equation (23) in Equation (20), one obtains $$P \cong (I_{AR} - I'_{AR}) C_R + (Y_C - Y'_C) I_C (C_M + C_{MI}) + (Y'_M Y'_C P'_{VALUE} - Y_M Y_C P_{VALUE}) I_C \quad (24)$$

Since the value of a TFT-LCD module is irrelevant to the manufacturing setup, one obtains:

$$P_{VALUE} = P'_{VALUE} \quad (25)$$

Thus, with Equation (25), Equation (24) can be further simplified as:

$$P \cong (I_{AR} - I'_{AR}) C_R + (Y_C - Y'_C) I_C (C_M + C_{MI}) + (Y'_M Y'_C - Y_M Y_C) P_{VALUE} I_C \quad (26)$$

Accordingly, Equation (26) can be used to calculate the profit increase or decrease as a result of the yield variation that occurs due to a new manufacturing setup.

One can use the relationships described above to evaluate the profits and the production quantities needed to achieve a break-even point in TFT-LCD manufacturing. This type of cost analysis is done based on the assumption that no TFT-array panels are discarded as bad panels during TFT-array process. The cost of TFT-LCD panel (COST) can be expressed as follows:

$$\begin{aligned}COST = &\text{Array manufacturing cost+Array test cost+}\\&\text{Array repair cost+Cell assembly cost+Cell}\\&\text{inspection cost+Module assembly cost+Module}\\&\text{inspection cost+Packaging cost+Storage and}\\&\text{transportation cost+Other fixed cost.}\end{aligned} \quad (27)$$

One can obtain additional expressions for the cost values as follows:

$$\text{Packaging cost} = I_M C_P; \text{ and} \quad (28)$$

$$\text{Storage and transportation cost} = I_M C_S, \quad (29)$$

where $C_P$ and $C_S$ are the unit packaging and storage/transportation cost, respectively.

From Equations (2)–(8), (13), (27), (28), and (29) one obtains:

$$COST = I_A C_A + I_A C_T + I_{AR} C_R + I_C C_C + I_C C_{CI} + Y_C I_C (C_M + C_{MI} + C_P + C_S) + C_F, \quad (30)$$

where $C_F$ is other fixed costs. The value of the final output, without the optional cell and module repair stages 214 and 216, can be expressed as follows:

$$PRODUCT = O_{MG} D_{SALE}, \quad (31)$$

where $D_{SALE}$ is the sales price of a TFT-LCD product unit. From Equations (12), (13), and (31), one obtains:

$$PRODUCT = Y_M Y_C I_C D_{SALE}. \quad (32)$$

Then, the profit (PT) is obtained by:

$$PT = PRODUCT - COST. \quad (33)$$

From Equations (30), (32), and (33), one obtains:

$$PT = Y_M Y_C I_C D_{SALE} - (I_A C_A + I_A C_T + I_{AR} C_R + I_C C_C + I_C C_{CI} + Y_C I_C (C_M + C_{MI} + C_P + C_S) + C_F). \quad (34)$$

Using Equation (21) in Equation (34), one obtains:

$$PT = Y_M Y_C (I_A - O_{ATB} - O_{ARB}) D_{SALE} - (I_A C_A + I_A C_T + I_{AR} C_R + C_F + (I_A - O_{ATB} - O_{ARB})(C_C + C_{CI} + Y_C C_M + Y_C C_{MI} + Y_C C_P + Y_C C_S)). \quad (35)$$

If one defines $Y_T$ as:

$$Y_T \cong (O_{ATB} + O_{ARB})/I_A, \quad (36)$$

then Equation (35) becomes:

$$PT = Y_M Y_C I_A (1-Y_T) D_{SALE} - (I_A(C_A+C_T) + I_{AR}C_R + C_F + I_A (1-Y_T)(C_C+C_{CI}+Y_C(C_M+C_{MI}+C_P+C_S))). \quad (37)$$

$I_A$ for the break-even point where PT is zero ($I_{A-EVEN}$) becomes:

$$I_{A-EVEN} = (I_{AR}C_R+C_F)/(Y_M Y_C(1-Y_T) D_{SALE} - (C_A+C_T+ (1-Y_T)(C_C+C_{CI}+Y_C(C_M+C_{MI}+C_P+C_S)))). \quad (38)$$

In normal production, one can assume:

$$O_{ATB} << I_A \quad (39)$$

Thus, with Equation (9), one obtains:

$$I_{AR} = O_{ATR} = I_A - O_{ATB} - O_{ATG} \cong I_A - O_{ATG} = I_A(1-Y_{AT}). \quad (40)$$

From Equations (37) and (40), one obtains:

$$PT \cong Y_M Y_C I_A (1-Y_T) D_{SALE} - (C_F + I_A(C_A+C_T+(1-Y_{AT}) C_R + (1-Y_T)(C_C+C_{CI}+Y_C(C_M+C_{MI}+C_P+C_S)))). \quad (41)$$

$I_{A-EVEN}$ is again obtained for $I_A$, making PT=0 in Equation (41), as follows:

$$I_{A-EVEN} \cong C_F/(Y_M Y_C(1-Y_T) D_{SALE} - (C_A+C_T+(1-Y_{AT}) C_R+(1-Y_T)(C_C+C_{CI}+Y_C(C_M+C_{MI}+C_P+C_S)))). \quad (42)$$

Accordingly, the profit and the production quantities needed for break-even can be derived from yield numbers, cost numbers and sales price.

The profit model described above is applicable to a production line model that does not utilize the cell and module repair stages 214 and 216. However, it should be appreciated that the profit model described above can be adapted for a production line model that does utilize the optional cell and model repair stages 214 and 216, while still falling within the scope of the present invention. Further, if the optional cell and module repair stages 214 and 216 are used, but the cell and module repair rates are so low as to not make a significant contribution to the yield rates, then the above-described profit model may be applied.

III. Identifying Defects During TFT-Array Panel Testing

Each TFT-array panel is tested in the array test stage 202 using array testing equipment known in the art. When each TFT-array panel is tested by the array testing equipment, the TFT-array panel is driven by electrical signals and the storage capacitor of each pixel goes through electrical charging and discharging operations in order to achieve certain target voltage signals. The sensor of the array test equipment measures the pixel voltage on the storage capacitor of every pixel of the TFT-array panel. If a pixel has a defect, then the pixel voltage of the defected pixel is different from the pixel voltage of the normal pixels. The difference between the defected pixel voltage and the normal pixel voltage is called a "defect signal."

Figure 3A:
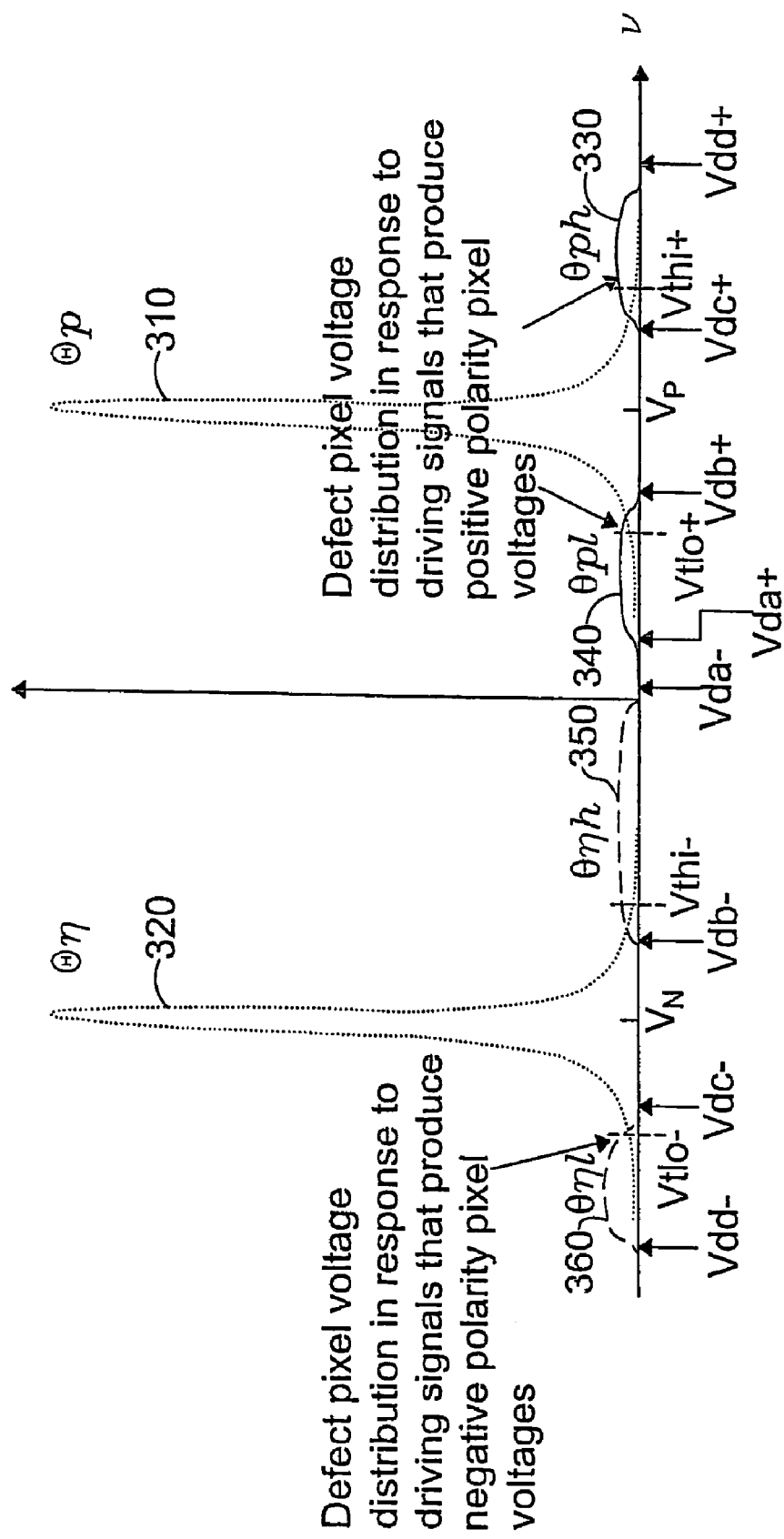
FIG. 3A is a plot showing the pixel voltage distribution when half of the pixels of the TFT-array panel have positive pixel voltages and the other half have negative pixel voltages, in accordance with the present invention.

FIG. 3A is a plot showing the pixel voltage distribution when half of the pixels of the TFT-array panel have positive pixel voltages and the other half have negative pixel voltages. These distributions can be represented by a statistical distribution function because of the large number of pixels in each TFT-array panel, and because of the sensor's statistical behavior. The distribution function for normal positive pixel voltages 310 is well represented by a normal distribution function as follows:

$$\Theta p = N_P \exp[-(v-V_P)^2/(2\sigma_P^2)]/\sqrt{2\pi\sigma_P^2}, \quad (43)$$

where $\Phi p$ represents the distribution function for normal positive pixel voltages, $N_P$ is the total number of pixels having normal positive pixel voltages, v is a pixel voltage variable, $V_P$ is a mean value and $\sigma_P$ is a standard deviation of the normal distribution function for positive pixel voltages.

$N_P$ can be obtained by subtracting the number of defective pixels having positive pixel voltages from the total number of pixels having positive pixel voltages, and can be approximated to be the total number of pixels having positive pixel voltages because the number of defective pixels having positive pixel voltages is far lower than the number of normal pixels having positive pixel voltages.

The distribution function for normal negative pixel voltages 320 is similarly well represented by a normal distribution function as follows:

$$\Theta n = N_N \exp[-(v-V_N)^2/(2\sigma_N^2)]/\sqrt{2\pi\sigma_N^2}, \quad (44)$$

where $\Theta n$ represents the distribution function for normal negative pixel voltages, $N_N$ is a total number of pixels having normal negative pixel voltage, and $V_N$ is a mean value and $\sigma_N$ is a standard deviation of normal distribution function for negative pixel voltages.

$N_N$ can be obtained by subtracting the number of defective pixels having negative pixel voltages from the total number of pixels having negative pixel voltages, and can be approximated to be the total number of pixels having negative pixel voltages because the number of defective pixels having negative pixel voltages is far lower than the number of normal pixels having negative pixel voltages. The values of $V_P$, $\sigma_P$, $V_N$, and $\sigma_N$ can be typically obtained from the array testing equipment.

The plot of FIG. 3 also shows the defective pixel voltage distributions 330 ($\theta$ph), 340 ($\theta$pl), 350 ($\theta$nh), and 360 ($\theta$nl). $\theta$ph and $\theta$pl represent the defective pixel voltage distributions in response to driving signals that produce positive polarity pixel voltages. $\theta$nh and $\theta$nl represent defective pixel voltage distributions in response to driving signals that produce negative polarity pixel voltages.

The array testing equipment uses thresholding parameters of Vthi+, Vtlo+, Vthi−, and Vtlo− to detect the defective pixels. Pixels driven to have positive pixel voltages are reported as defective when their pixel voltages fall outside of the positive threshold region between Vthi+ and Vtlo+. Pixels driven to have negative pixel voltages are reported as defective when their pixel voltages fall outside of the negative threshold region between Vthi− and Vtlo−.

Under-Killed and Over-Killed Defects

If a normal pixel exhibits a pixel voltage that is outside of the threshold region, then the normal pixel is wrongly classified as a defective pixel. This erroneous classification is called an "over-killed defect." If a defective pixel exhibits a pixel voltage that is inside of the threshold region, then the defective pixel is wrongly characterized as a normal pixel. This erroneous classification is called an "under-killed defect."

Under-killed defects lower the yields at the cell inspection stage 208 ($Y_C$) and/or the yields at the module inspection stage 212 ($Y_M$). Over-killed defects lower the productivity of the array repair equipment used in the array repair stage 204. Therefore it is very important to set the right values for the thresholding parameters, in order to maximize profit or minimize the loss of product fabrication.

Improving Defect Detection Accuracy of TFT-Array Tester

As the size of TFT-LCDs increase for use in larger TFT-LCD displays, the TFT-array tester has to take multiple measurements to test a single TFT-array panel. This is because, once the TFT-array panel exceeds a certain size, the measurement sensor of TFT-array testers can not cover the entire TFT-array panel. Thus, multiple measurements are performed by the TFT-array tester for one TFT-array panel.

Figure 3B:
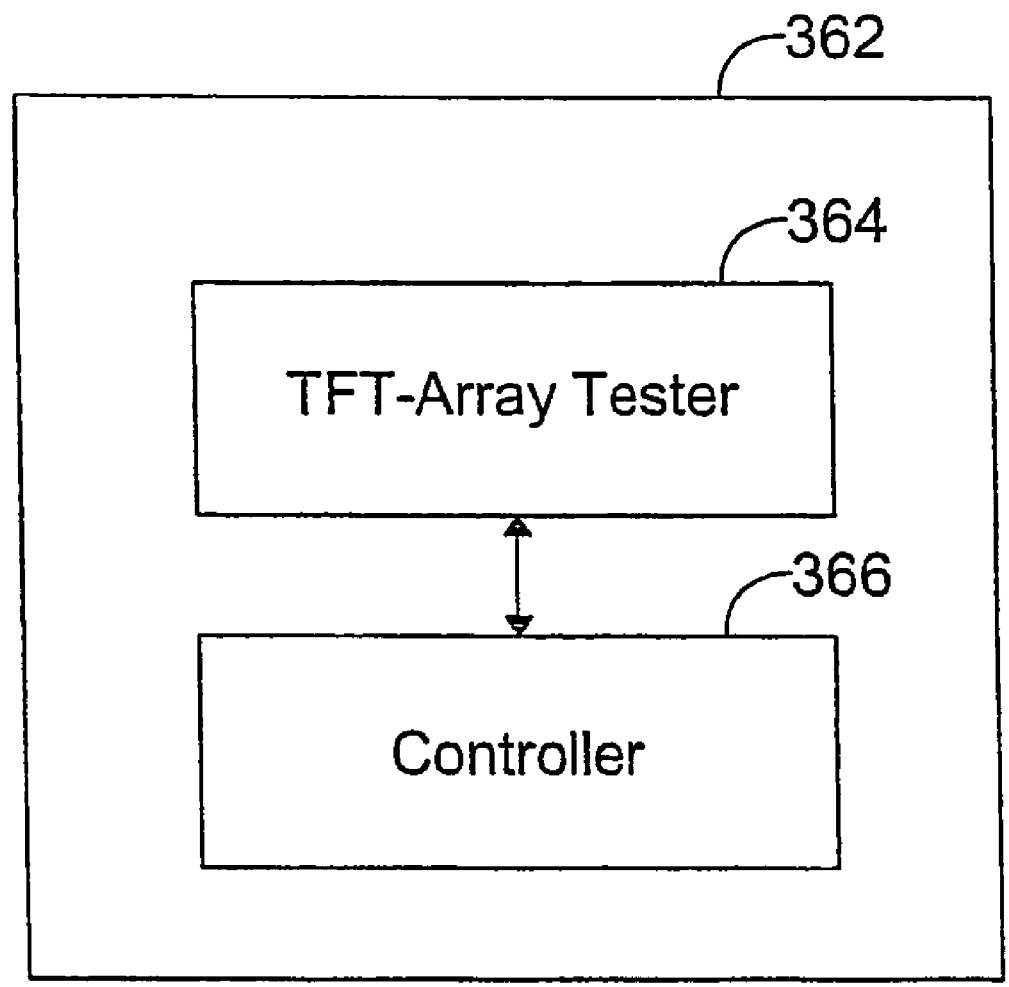
FIG. 3B is a block diagram of a TFT-array testing system 362, in accordance with the present invention.

FIG. 3B is a block diagram of a TFT-array testing system 362, which includes a TFT-array tester 364 and a controller 366. For large TFT-array panels, the TFT-array tester 364, under the control of the controller 366, takes measurements at one portion of the TFT-array panel, and then either the TFT-array panel or the sensor (not shown) of TFT-array tester 364 is moved, preferably via a stepping motion, so that another portion of the TFT-array panel can be tested.

Because either the sensor of the TFT-array tester 362 or the TFT-array panel is moved between measurements, the pixel voltage distributions (310, 320, 330, 340, 350 and 360 in FIG. 3A) may change after each measurement due to environmental changes or other causes. If fixed thresholding parameters are used, such as the fixed thresholding parameters Vthi+, Vtlo+, Vthi− and Vthl− in FIG. 3A, the defect detection accuracy decreases, because the fixed thresholding parameters are designed to be used with substantially fixed pixel voltage distributions.

One way of mitigating this effect and improving the defect detection accuracy of the TFT-array testing system 362 is to use "relative thresholding", in which the mean values of the pixel voltage distributions ($V_P$ and/or $V_N$ in FIG. 3A) are obtained at each measurement position, and predetermined constants are added to or subtracted from the mean pixel voltage distributions to obtain the values for the thresholding parameters.

Figure 3C:
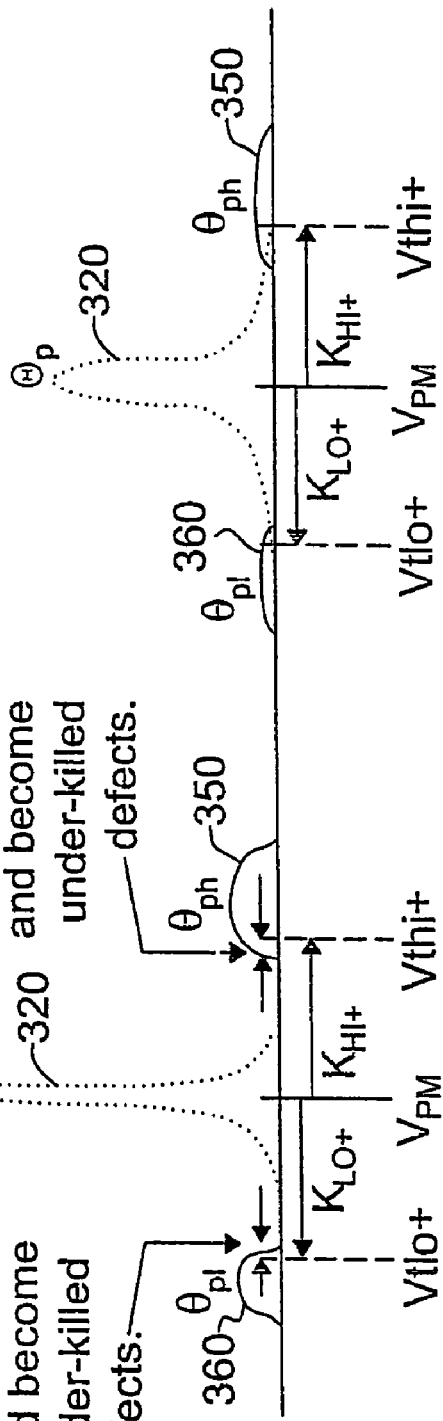
FIG. 3C are plots showing measured pixel voltage distributions for pixels driven with positive voltages, along with thresholding parameters calculated using a "relative thresholding" method.

This relative thresholding method is illustrated in FIG. 3C, which are plots showing measured pixel voltage distributions for pixels driven with positive voltages, along with thresholding parameters calculated using the relative thresholding method. Although only pixel voltage distributions for pixels driven with positive voltages are shown for ease of illustration, it should be appreciated that the following method can also be applied to pixels driven with negative voltages.

Like the distributions shown in FIG. 3A, the distributions shown in FIG. 3C are represented by a statistical distribution function because of the large number of pixels in each TFT-array panel, and because of the sensor's statistical behavior. Plot (1) shows a measured pixel voltage distribution having a relatively small standard deviation $\sigma_P$ and plot (2) shows a measured pixel voltage distribution having a relatively large standard deviation $\sigma_P$.

Using the relative thresholding method, the thresholding parameters are calculated as follows:

$$Vthi+=(V_{PM}+K_{HI+});$$

$$Vtlo+=(V_{PM}-K_{LO+});$$

$$Vthi-=(V_{NM}+K_{HI-}); \text{ and}$$

$$Vtlo-=(V_{NM}-K_{LO-});$$

where $V_{PM}$ and $V_{NM}$ are the measured mean pixel voltage values for positively and negatively driven pixels, respectively, and $K_{HI+}$, $K_{LO+}$, $K_{HI-}$, and $K_{LO-}$ are the predetermined constants that are added to or subtracted from the measured mean pixel voltage values.

Figure 3D:
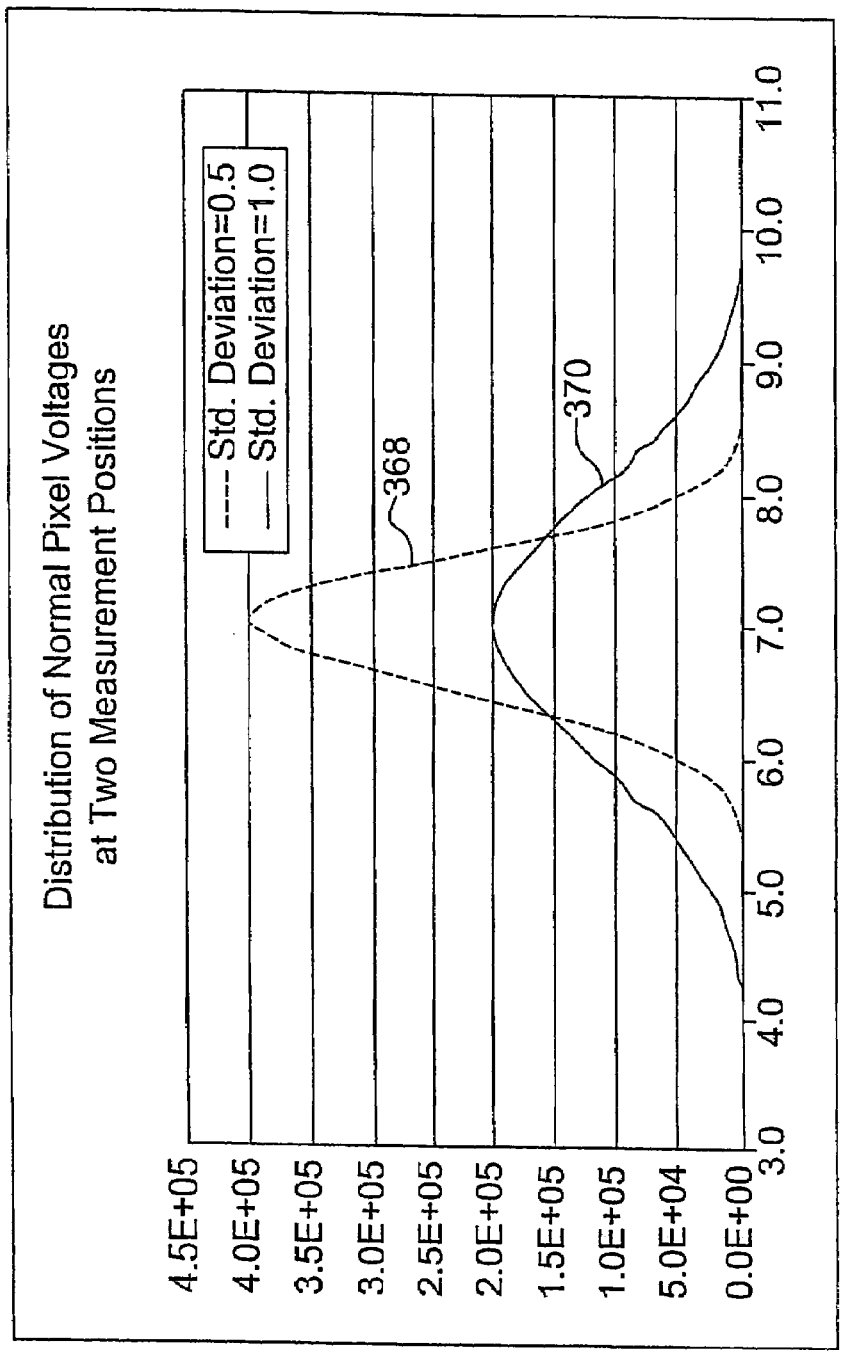
FIG. 3D is a plot showing an example of pixel voltage distributions at two measurement points on a TFT-array panel.

The relative thresholding method reduces the effect of moving mean pixel voltage values on the defect detection accuracy. However, this method does not take into account changes in the standard deviation $\sigma_P$ of the pixel voltage distribution due to environmental changes or other causes. The change in the standard deviation of the pixel voltage distribution is illustrated in FIG. 3D, which is a plot showing an example of pixel voltage distributions at two measurement points.

Pixel voltage distribution 368 is for a first measurement point on a TFT-array panel, and pixel voltage distribution 370 is for a second measurement point on the TFT-array panel. Both pixel voltage distributions 368 and 370 exhibit the same mean value of approximately 7.0, but the standard deviation of pixel voltage distribution 368 is 0.5, while the standard deviation of pixel voltage distribution 370 is 1.0. The change in the standard deviation may be caused by environmental factors, variations in the manufacturing process, or by other factors.

Similarly, plot (1) of FIG. 3C is for a first measurement point on a TFT-array panel having a first standard deviation, and plot (2) in FIG. 3C is for a second measurement point on the TFT-array panel having a second, larger standard deviation. A larger standard deviation means a wider pixel voltage distribution 320. A wider pixel voltage distribution means that some pixels exhibiting voltages in the normal range may exceed the thresholding limits set by the predetermined constants in the relative thresholding method, and be falsely classified as defective.

In order to avoid this phenomena when using the relative thresholding method, larger values must be used for the predetermined constants. However, using larger values for the predetermined constants will result in a decrease in detection accuracy if the standard deviation goes down in subsequent measurements, such as the measurement shown in plot (1).

Figure 3E:
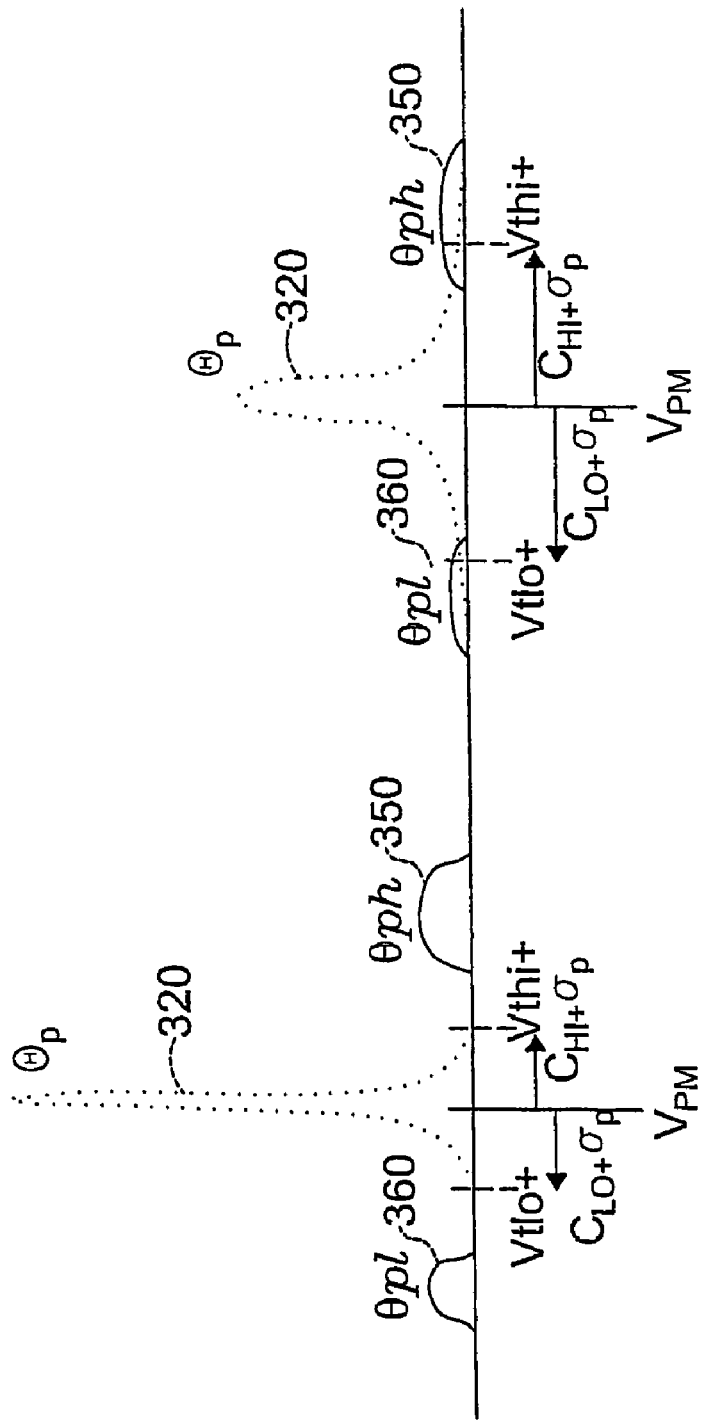
FIG. 3E are plots showing measured pixel voltage distributions for pixels driven with positive voltages, along with thresholding parameters calculated using a "standard deviation" method, in accordance with the present invention.

Accordingly, a preferred method of determining the thresholding parameters is illustrated in FIG. 3E, which are plots showing measured pixel voltage distributions for pixels driven with positive voltages, along with thresholding parameters calculated using a "standard deviation" method.

With the standard deviation method, the standard deviation of the pixel voltage distribution is obtained at each measurement point. The thresholding parameters for each measurement point are then obtained by multiplying the standard deviation value obtained for the current measurement point by a predetermined constant to yield on offset value, and adding the offset value to the measured mean pixel voltage value. Using the relative thresholding method, the thresholding parameters are calculated as follows:

$$Vthi+=[V_{PM}+(C_{HI+}\sigma_P)];$$

$$Vtlo+=[V_{PM}-C_{LO+}\sigma_P)];$$

$$Vthi-=[V_{NM}+C_{HI-}\sigma_N)]; \text{ and}$$

$$Vtlo-=[V_{NM}-C_{LO-}\sigma_N)];$$

where $V_{PM}$ and $V_{NM}$ are the measured mean pixel voltage values for positively and negatively driven pixels, respectively, and $C_{HI+}$, $C_{LO+}$, $C_{Hi-}$, and $C_{LO-}$ are the predetermined constants that are multiplied by the standard deviation $\sigma_P$ and $\sigma_N$, respectively.

By using the measured standard deviation at each measurement position, the thresholding parameters are adjusted based on actual standard deviations at each measurement position. Thus, because the changes in standard deviation are taken into account when setting the thresholding parameters, one does not have to reduce the detection accuracy at measurement positions with small standard deviations in order to avoid false defects at measurement positions exhibiting large standard deviations.

Figure 3F:
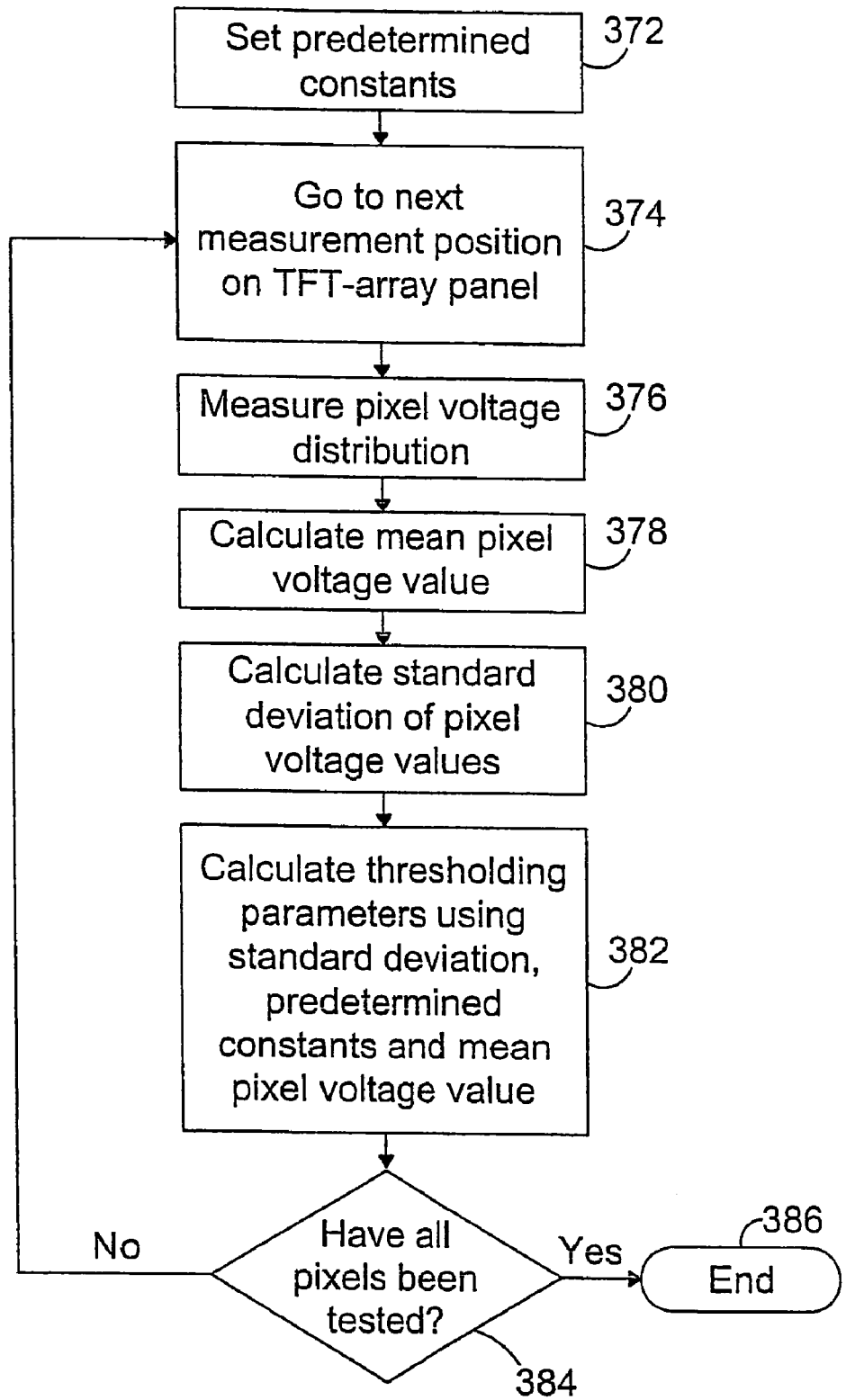
FIG. 3F is a flow chart showing steps in a standard deviation measurement process, in accordance with one embodiment of the present invention.

FIG. 3F is a flow chart showing steps in a standard deviation measurement process, in accordance with one preferred embodiment of the present invention. The process starts at step 372, where the predetermined constants are set. The process then proceeds to step 374, where the TFT-array panel and/or the sensor of the TFT-array tester are positioned at the next measurement position. If this is the first measurement, then the TFT-array panel and/or the sensor of the TFT-array tester are positioned at the first measurement position.

Next, at step 376, the pixel voltage distribution is measured by the TFT-array tester for the set of pixels that can be accessed by the TFT-array tester at the current measurement position. Then, at step 378, a mean pixel voltage value is calculated based on the pixel voltage distribution measured at step 376.

The process then proceeds to step 380, where the standard deviation of the pixel voltage values obtained at step 376 is calculated. Next, at step 382, the thresholding parameters used to classify defective pixels are calculated based on the calculated standard deviation and mean pixel voltage values, and the predetermined constants.

At step 384, it is determined whether all the pixels in the panel have been tested. If all the pixels in the panel have been tested, the process ends at step 386. Otherwise, the process jumps back to step 374.

The thresholding parameters calculated at step 382 are then used by the TFT-array testing system (controller 366 in FIG. 3B) to determine whether any of the pixels that were tested at the current measurement position are defective. As discussed above, the standard deviation measurement process is particularly suited for the testing of TFT-array panels that contain more pixels than can be measured by the sensor of the TFT-array tester in a single measurement. In this case, the TFT-array tester needs to perform multiple measurements in order to measure all the pixels in the TFT-array panel. The system and method of the present invention calculates the standard deviation of the measured pixel voltages at each measurement point, and adjusts the thresholding parameters based on the calculated standard deviation.

However, it should be appreciated that the standard deviation measurement process can also be used for the testing of smaller TFT-array panels, in which all the pixels of the TFT-array panel can be measured by the sensor of the TFT-array tester in a single measurement. In this case, the standard deviation of the pixel voltages would be measured for the one measurement point, and used to determine the thresholding parameters used to classify the pixels. Then, when a new TFT-array panel is tested, the standard deviation is again calculated for that TFT-array panel and used accordingly. In this way, differences in the standard deviation of pixel voltages between different TFT-array panels can be monitored and used to adjust the thresholding parameters.

In the case in which multiple measurements must be taken due to the size of the sensor in the TFT-array tester, each measurement site can be further divided into multiple sub-sites. The mean pixel voltage value and standard deviation of each sub-site can then be calculated and used for determining the thresholding parameters for pixels in that sub-site. This will improve the defect detection accuracy, as more accurate values for the mean pixel voltage and standard deviation are obtained when a more localized area is measured.

Changes in the measured standard deviation of pixel voltages, either between different measurement points on a common TFT-array panel or between different TFT-array panels, can be an indicator of a potential malfunction or performance degradation of the TFT-array tester 364. Accordingly, the standard deviation measurement process described above can also be used to monitor the performance of the TFT-array tester 364. For example, the controller 366 can be programmed so that a predetermined fluctuation amount in the measured standard deviation will trigger a warning signal. The trigger can be based on a predetermined fluctuation in the standard deviation between different measurement points on a common TFT-array panel, a predetermined fluctuation in the standard deviation between different TFT-array panels, a predetermined fluctuation in the average standard deviation for an entire lot of TFT-array panels, a predetermined fluctuation in the average standard deviation of a TFT-array panel, or based on any other definable fluctuation in the measured standard deviation of the pixel voltage values.

Figure 3G:
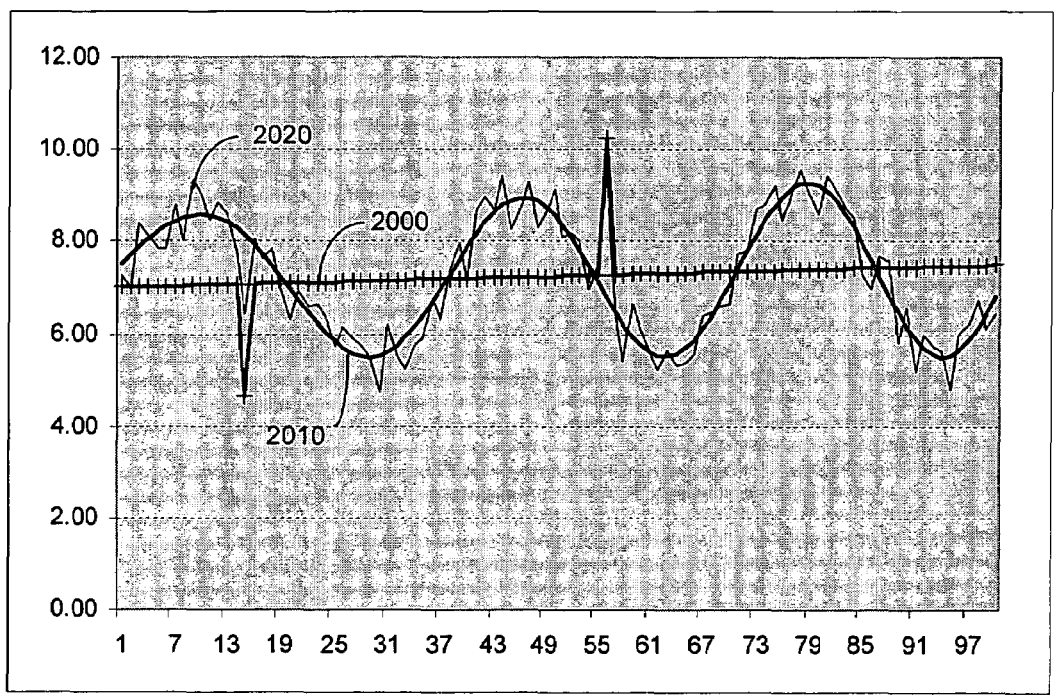
FIG. 3G is a plot of pixel voltage values along a one-dimensional array of pixels.

In general, the measurement accuracy is limited by the noise of the measurement system or the noise exhibited by the unit being tested. This is illustrated by FIG. 3G, which is a plot of pixel voltage values along a one-dimensional array of pixels. The thick line with cross marks (+) 2000 represent what the actual pixel voltage values would be without the presence of noise. The plain thick line 2010 represents the pixel voltage values in the presence of low frequency noise (hereinafter "low frequency pixel signal 2010"). The plain thin line 2020 represents the pixel voltages in the presence of both low and high frequency noise (hereinafter "high frequency pixel signal 2020"). In the example shown, pixel numbers 15 and 56 are defective and their respective defective signals are visible in the high frequency pixel signal 2020. However, the defective signal is not present in the low frequency pixel signal 2010.

If a pixel defect causes a pixel voltage that deviates from the mean pixel voltage value only in a very localized area, then the low frequency pixel signal 2010 is preferably used as a "reference pixel signal" along the one-dimensional array of pixels. In this way, the low frequency pixel signal 2010 is used as the valid voltage reference during defect detection, rather than the mean pixel voltage value at each measurement point. This "low frequency signal" thresholding method, which uses a respective reference pixel voltage value for each pixel (the low frequency pixel signal 2010), improves the measurement accuracy, as will be explained below.

The measured pixel voltage signal is typically the high frequency pixel signal 2020, with both low and high frequency noise. The low frequency pixel signal 2010 is preferably derived by applying a low-pass filter to the high frequency pixel signal 2020, which removes the high frequency noise. The pass band of the low-pass filter is chosen based on the low frequency noise properties of the pixel array and measurement system. For example, the low-pass filter can be set up to pass frequencies less than 1/(8 pixels), where frequency is defined in the pixel space. The low-pass filtering can be suitably carried out in software, using a mathematical algorithm that averages out the random noise of the pixel signal being measured and the pixel signals of its neighboring pixels (excluding extreme pixel signals).

Figure 3H:
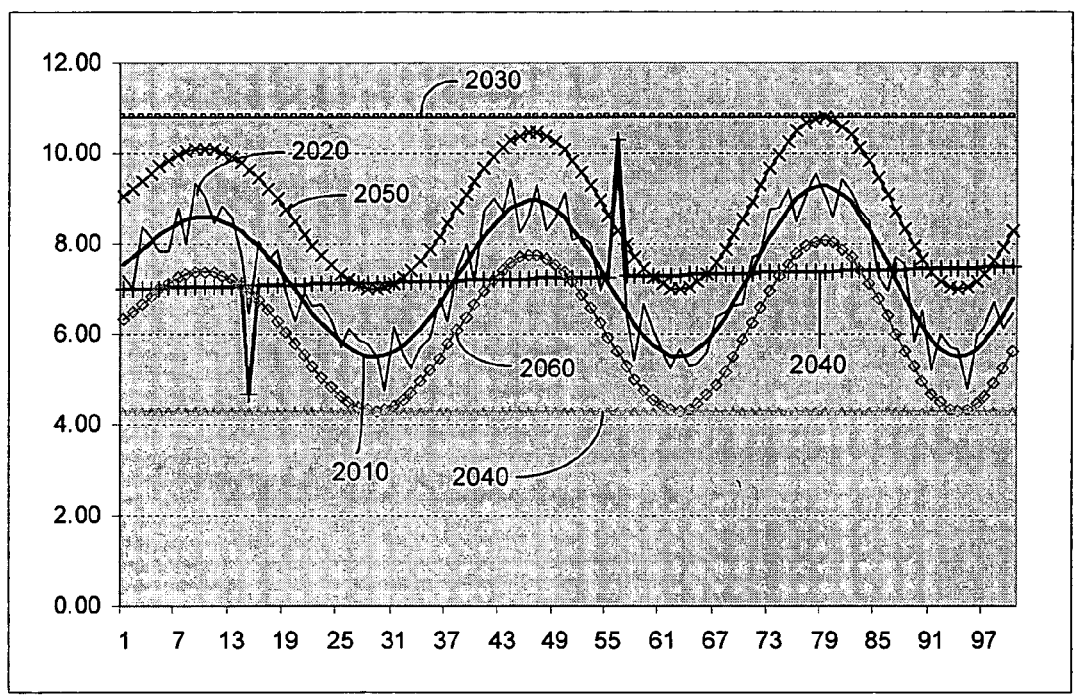
FIG. 3H is a plot illustrating how using a respective reference pixel voltage value for each pixel improves the defective pixel detection accuracy, in accordance with the present invention.

FIG. 3H is a plot illustrating how using a respective reference pixel voltage value for each pixel (the low frequency pixel signal 2010) improves the defective pixel detection accuracy. The thin line with square marks (□) 2030 and the thin line with triangle marks (Δ) 2040 represent fixed thresholding parameters. As discussed above, if fixed thresholding parameters are used, the thresholding span should be large enough so as to include pixel voltages over all the pixels. However, using the low frequency pixel signal 2010 as the reference pixel signal, the thresholding span need only cover pixel signals that deviate from a respective pixel's own reference pixel voltage value. Thus, this method detects more real defects with approximately the same rate of false defects as occurs with fixed thresholding parameters.

The thresholding parameters when using the low frequency pixel signal 2010 as the reference pixel signal is shown in FIG. 3H by a thin line with "x" marks 2050 and a thin line with diamond marks (◇) 2060. The thresholding parameters are preferably calculated as follows:

$$Vthi+ = [V_{PR} + (C_{HI+}\sigma_P)];$$

$$Vtlo+ = [V_{PR} - (C_{LO+}\sigma_P)];$$

$$Vthi- = [V_{NR} + (C_{HI-}\sigma_P)]; \text{ and}$$

$$Vtlo- = [V_{NR} - (C_{LO-}\sigma_P)];$$

where $V_{PR}$ and $V_{NR}$ are the reference pixel voltages at each pixel for positively and negatively driven pixels, respectively, and $C_{HI+}$, $C_{LO+}$, $C_{HI-}$, and $C_{LO-}$ are predetermined constants that are multiplied by the standard deviation $\sigma_P$. The product of the predetermined constants and the standard deviation $\sigma_P$ is added to or subtracted from the reference pixel voltages. The standard deviation $\sigma_P$ is preferably calculated based on the high frequency pixel noise over the group of pixels at each measurement site. The high frequency pixel noise is calculated as the difference between the high frequency pixel signal 2020 and the low frequency pixel signal 2010.

An alternative to using the low frequency pixel signal 2010 as the reference pixel signal at each pixel, which varies from pixel to pixel, one can also convert the low frequency pixel signal 2010 to a constant reference signal, which would then be used as a "mean reference signal" for thresholding. If this method is used, then the same conversion factor applied to the low frequency pixel signal to obtain the mean reference signal should also be applied to the measured pixel signal (high frequency pixel signal 2020) before it is tested to determine if it falls within the thresholding span.

Figure 3I:
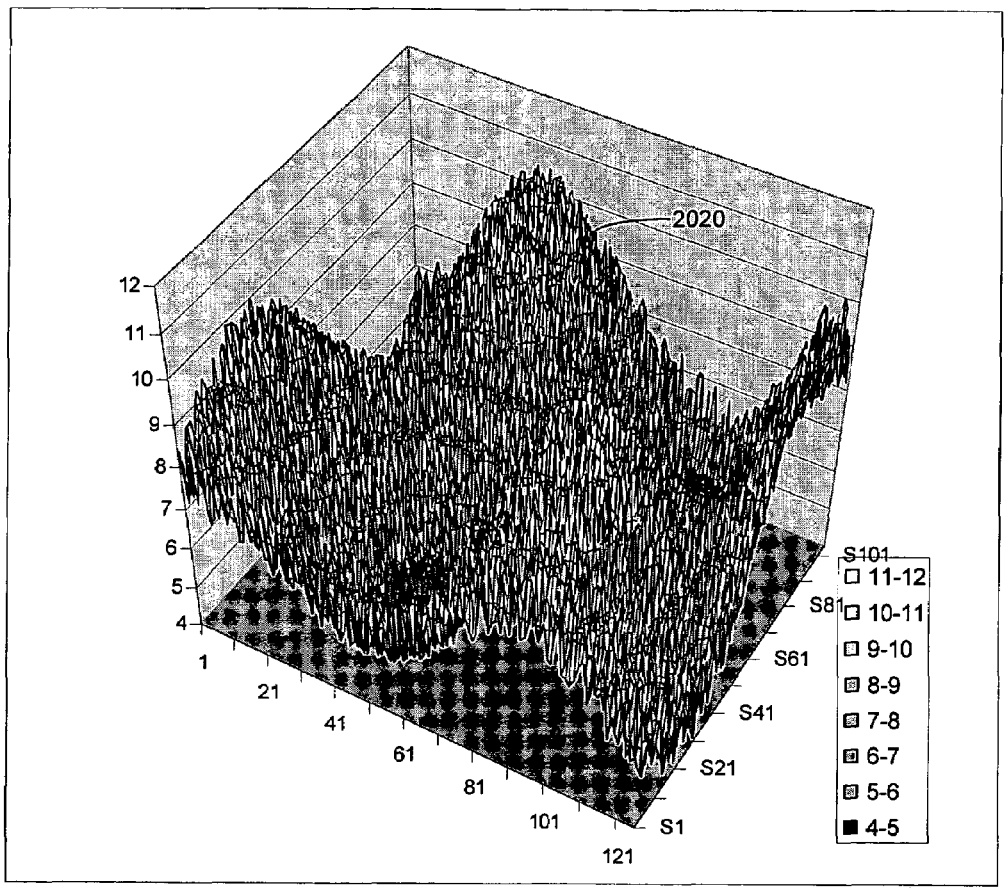
FIG. 3I is a plot showing original measured pixel signal variation over a two-dimensional array of pixels.
Figure 3J:
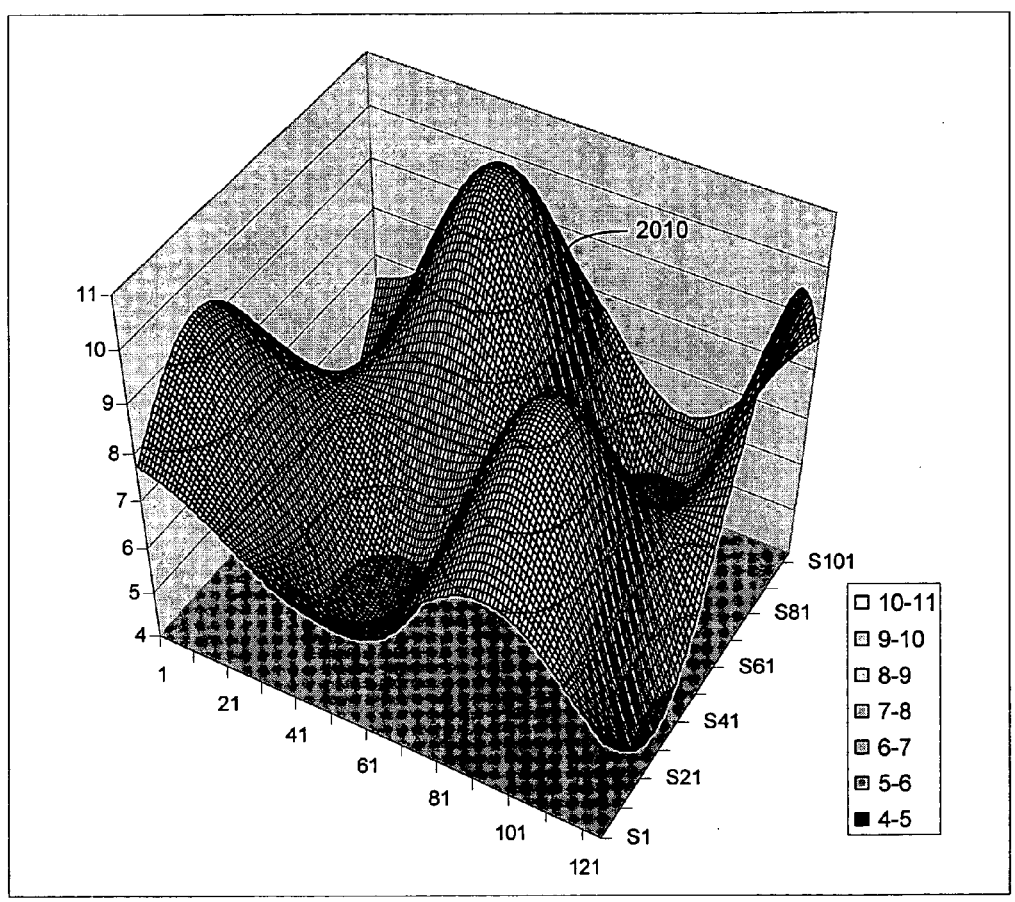
FIG. 3J is a plot showing low frequency pixel signal variation over a two-dimensional array.

The low frequency signal thresholding method can be applied to two-dimensional arrays of pixels as well. FIG. 3I is a plot showing original measured pixel signal variation (high frequency pixel signal 2020) over a two-dimensional array of pixels. FIG. 3J shows the low frequency pixel signal 2010 variation over the same two-dimensional array. The low frequency pixel signal 2010 is preferably obtained by low-pass filtering, as explained above. The low frequency pixel signal 2010 can be used as the reference pixel signal for calculating the thresholding parameters, as explained above.

The frequency signal thresholding method can also be applied to higher dimensional pixel arrays, using the principals discussed above.

IV. Effects of Bad Cells/Modules on the Number of Under-Killed Defects

Figure 4:
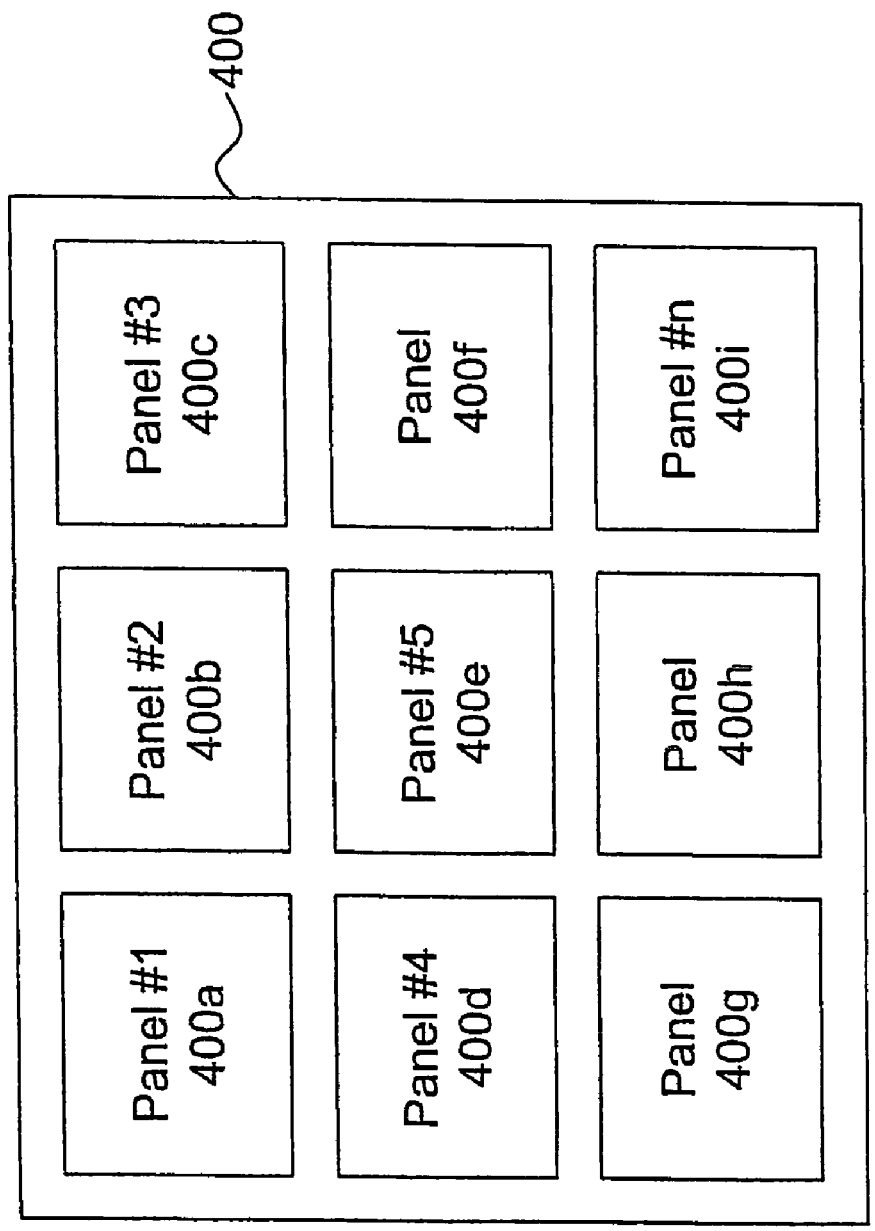
FIG. 4 is a block diagram showing the layout of a typical glass substrate 400 used in TFT-LCD manufacturing.

FIG. 4 is a block diagram showing the layout of a typical glass substrate 400 used in TFT-LCD manufacturing. The glass substrate 400 generally consists of multiple TFT-array panels 400a–400i, and each panel is used for a display unit assembly. If the display is classified as a bad unit when it has just a single defect, then the number of bad displays is determined as described below.

When there is only one defect in the glass substrate 400, the one defect can fall on any one of the n panels. Thus, one defect causes one bad display unit. Accordingly, the total number of bad panels in the case of single defect in the glass substrate 400 ($N_{BAD-PANEL1}$) is:

$$N_{BAD-PANEL1} = 1. \tag{45}$$

When there is second defect in the glass substrate 400, the second defect can fall on any one of the n panels. If the second defect falls on the same panel that the first defect falls on, then the second defect does not result in a new bad panel. However, the second defect will cause a new bad panel if it falls on one of the other panels. Thus the probability of causing another bad panel by a second defect ($P_2$) becomes:

$$P_2 = (n-1)/n. \tag{46}$$

Thus, from Equations (45) and (46), the total number of bad panels in the case of two defects in the glass substrate ($N_{BAD-PANEL2}$) is:

$$N_{BAD-PANEL2} = N_{BAD-PANEL1} + P_2 = 1 + (n-1)/n. \tag{47}$$

When there is third defect in the glass substrate 400, the third defect can fall on any one of the n panels. If the third defect falls on a panel that already has any number of defects, then the third defect does not result in a new bad panel. However, the third defect will cause a new bad panel if it falls on a panel that has no defect. Thus, the probability of causing another bad panel by the third defect ($P_3$) is:

$$P_3 = P_{DOUBLE}(n-1)/n + (1 - P_{DOUBLE})(n-2)/n, \tag{48}$$

where $P_{DOUBLE}$ is the probability of having two defects in the same panel, and is given by:

$$P_{DOUBLE} = n(1/n)(1/n) = 1/n. \tag{49}$$

Thus, $P_3$ becomes:

$$P_3 = (1/n)(n-1)/n + (1 - 1/n)(n-2)/n = (n-1)^2/n^2. \tag{50}$$

Thus, from Eqs. (47) and (50), the total number of bad panels in the case of three defects present in the glass substrate 400 ($N_{BAD-PANEL3}$) is:

$$N_{BAD-PANEL3} = N_{BAD-PANEL2} + P_3 = 1 + (n-1)/n + (n-1)^2/n^2. \tag{51}$$

When there is fourth defect in the glass substrate 400, the fourth defect can fall on any one of the n panels. If the fourth defect falls on a panel that already has any number of defects, then the fourth defect does not result in a new bad panel. However, the fourth defect results in a new bad panel if it falls on a panel that has no defect. Thus, the probability of causing another bad panel by the fourth defect ($P_4$) is:

$$P_4 = P_{TRIPLE}(n-1)/n + P_{DOUBLE-SINGLE}(n-2)/n + (1 - P_{TRIPLE} - P_{DOUBLE-SINGLE})(n-3)/n, \tag{52}$$

where $P_{TRIPLE}$ is the probability of having three defects in the same panel, and is given by:

$$P_{TRIPLE} = n(1/n)(1/n)(1/n) = 1/n^2, \tag{53}$$

and $P_{DOUBLE-SINGLE}$ is the probability of having two defects in the same panel and one defect in different pane, and is given by:

$$P_{DOUBLE-SINGLE} = n(1/n)(1/n)(n-1)/n = (n-1)/n^2. \tag{54}$$

Thus, $P_4$ becomes:

$$P_4 = (1/n^2)(n-1)/n + ((n-1)/n^2)(n-2)/n + (1 - 1/n^2 - (n-1)/n^2)(n-3)/n = (n-1)/n^3 + (n-1)(n-2)/n^3 + (1 - 1/n^2 - (n-1)/n^2)(n-3)/n = (n-1 + (n-1)(n-2) + (n^2 - 1 - (n-1))(n-3))/n^3 = (n-1 + (n-1)(n-2) + n(n-1)(n-3))/n^3 = (n-1)(1 + n - 2 + n(n-3))/n^3 = (n-1)(n^2 - 2n - 1)/n^3. \tag{55}$$

Thus, from Equations (51) and (55), the total number of bad panels in the case of four defects present in the glass substrate 400 ($N_{BAD\text{-}PANEL4}$) is:

$$N_{BAD\text{-}PANEL4} = N_{BAD\text{-}PANEL3} + P_4 = 1 + (n-1)/n + (n-1)^2/n^2 + (n-1)(n^2-2n-1)/n^3 \quad (56)$$

In a normal production line, it is very rare that the number of defects per glass substrate exceeds four. If the under-killed defects of the TFT-array test equipment are the dominant cause of bad panels at cell and module inspections, one can assume that the number of cell and module defects is proportional to the number of under-killed defects as follows:

$$N_{CELL\text{-}DEFECT} = \alpha U; \text{ and} \quad (57)$$

$$N_{MODULE\text{-}DEFECT} = \beta U, \quad (58)$$

where $\alpha$ and $\beta$ are the proportionality constants for cell and module defects, respectively. Then, from Equations (45), (47), (51), (56), (57), and (58), one can obtain:

$$N_{BAD\text{-}CELL1} = \alpha; \quad (59)$$

$$N_{BAD\text{-}CELL2} = \alpha(1+(n-1)/n); \quad (60)$$

$$N_{BAD\text{-}CELL3} = \alpha(1+(n-1)/n+(n-1)^2/n^2); \quad (61)$$

$$N_{BAD\text{-}CELL4} = \alpha(1+(n-1)/n+(n-1)^2/n^2 + (n-1)(n^2-2n-1)/n^3); \quad (62)$$

$$N_{BAD\text{-}MODULE1} = \beta; \quad (63)$$

$$N_{BAD\text{-}MODULE2} = \beta(1+(n-1)/n); \quad (64)$$

$$N_{BAD\text{-}MODULE3} = \beta(1+(n-1)/n+(n-1)^2/n^2); \text{ and} \quad (65)$$

$$N_{BAD\text{-}MODULE4} = \beta(1+(n-1)/n+(n-1)^2/n^2 + (n-1)(n^2-2n-1)/n^3), \quad (66)$$

where $N_{BAD\text{-}CELL}$ and $N_{BAD\text{-}MODULE}$ are the number of bad cells and modules, respectively.

If the number of under-kill defects per glass substrate does not exceed approximately four, and the number of panels per glass substrate (n) is significantly larger than 1, then one obtains:

$$N_{BAD\text{-}CELL1} = \alpha; \quad (67)$$

$$N_{BAD\text{-}CELL2} \cong 2\alpha; \quad (68)$$

$$N_{BAD\text{-}CELL3} \cong 3\alpha; \quad (69)$$

$$N_{BAD\text{-}CELL4} \cong 4\alpha; \quad (70)$$

$$N_{BAD\text{-}MODULE1} = \beta; \quad (71)$$

$$N_{BAD\text{-}MODULE2} \cong 2\beta; \quad (72)$$

$$N_{BAD\text{-}MODULE3} \cong 3\beta; \text{ and} \quad (73)$$

$$N_{BAD\text{-}MODULE4} \cong 4\beta. \quad (74)$$

Equations (67) to (70) can be summarized as:

$$N_{BAD\text{-}CELL} \cong U\alpha, \quad (75)$$

and Equations (71) to (74) can be summarized as:

$$N_{BAD\text{-}MODULE} \cong U\beta. \quad (76)$$

V. Test Recipes

Ideally, the array testing equipment is supposed to identify all the defective pixels in the TFT-array panel without misclassifying normal pixels as a defective pixels. However, in reality, the array testing equipment may miss actual defective pixels (under-killed defects) and wrongly classify normal pixels as defective pixels (over-killed defects).

The phrase "test recipe" is used herein to refer to the testing parameters used by the array testing equipment, e.g., the amplitude, timing and shape of the pixel driving signal, and the thresholding parameters used to classify pixels as normal or defective. A currently used recipe is referred to herein as a "primary test recipe", and its result is called a "primary test result". A proposed new test recipe is referred to herein as a "new test recipe", and its result is called a "new test result."

A new test recipe is classified herein as either a "new thresholding test recipe" or a "new distribution function test recipe." A new thresholding recipe is one that only changes the thresholding parameters, without affecting the voltage distribution functions of the normal and defective pixels. A new distribution function recipe is one that changes the voltage distribution functions of the normal and/or defective pixels.

VI. Effects of Under-Killed Defects on Profits

When a new test recipe is used in the array testing equipment, the numbers of under-killed and over-killed defects may change from those of the primary test recipe. A method for determining the effects that under-killed defects have on the yields and profits in TFT-LCD manufacturing will now be described. The method described below assumes that the optional cell repair and module repair stages 214 and 216 are not implemented.

If under-killed defects are the dominant cause of bad panels at the cell inspection stage 208 ($O_{CB}$ in FIG. 2), then one can assume that the rate of bad panels at the cell inspection stage 208 is proportional to the number of under-killed defects (refer to Equation (75)), and obtain the following expression:

$$O_{CB}/I_C : U = O'_{CB}/I'_C : U', \quad (77)$$

where U is the number of under-killed defects for the primary test recipe and U' is the number of under-killed defects for the new test recipe. Then, one obtains:

$$O'_{CB}/I'_C = O_{CB} U'/(I_C U). \quad (78)$$

Without the optional cell and module repair stages 214 and 216, $$O_{CB} = I_C - O_{CG}. \quad (79)$$

Thus, with Equation (78), one obtains:

$$(I'_C - O'_{CG})/I'_C = (I_C - O_{CG})U'/(I_C U), \quad (80)$$

which becomes:

$$1 - O'_{CG}/I'_C = (1 - O_{CG}/I_C)U'/U. \quad (81)$$

From Equations (11) and (81), one obtains:

$$Y'_C = 1 - (1 - Y_C)U'/U. \quad (82)$$

Then, the improvement of the yield at the cell inspection stage 208 ($E_{YC}$) can be expressed as:

$$E_{YC} = Y'_C - Y_C = (1 - Y_C)(1 - U'/U). \quad (83)$$

If the under-killed defects are the dominant cause of the bad panels at the module inspection stage 212 ($O_{MB}$ in FIG. 2), then one can also assume that the rate of bad panels at the module inspection stage 212 is proportional to the number of under-killed defects (refer to Equation (76)), and obtain following expression:

$$O_{MB}/I_M \cdot U = O'_{MB}/I'_M \cdot U'. \qquad (84)$$

Then, one obtains:

$$O'_{MB}/I'_M = O_{MB} U'/(I_M U). \qquad (85)$$

Since $O_{MB} = I_M - O_{MG}$ without the optional cell and module repair stages 214 and 216, with Equation (85), one obtains:

$$(I'_M - O'_{MG})/I'_M = (I_M - O_{MG})U'/(I_M U), \qquad (86)$$

which becomes:

$$1 - O'_{MG}/I'_M = (1 - O_{MG}/I_M)U'/U. \qquad (87)$$

From Equations (12) and (87), one obtains:

$$Y'_M = 1 - (1 - Y_M)U'/U. \qquad (88)$$

Then, the yield improvement at the module inspection stage 212 ($E_{YM}$) can be expressed as:

$$E_{YM} \equiv Y'_M - Y_M = (1 - Y_M)(1 - U'/U). \qquad (89)$$

From Equations (82), (88), and (26), one obtains:

$$P \cong (I_{AR} - I'_{AR})C_R + (Y_C - (1-(1-Y_C)U'/U))I_C(C_M + C_{MI}) + ((1-(1-Y_M)U'/U)(1-(1-Y_C)U'/U) - Y_M Y_C)P_{VALUE}I_C \qquad (90)$$

The effect of a new test recipe on the over-killed panels, $\Delta Q$, and on the under-killed panels, $\Delta U$, can be expressed as:

$$\Delta Q = Q - Q' = \gamma(Q - Q') = \gamma \Delta Q; \text{ and} \qquad (91)$$

$$\Delta U = U - U' = \gamma(U - U') = \gamma \Delta U, \qquad (92)$$

where Q and Q' are the numbers of over-killed defects for the primary and new test recipes, respectively, U and U' are the numbers of under-killed defects for the primary and new test recipes, respectively, and γ is a proportionality constant relating the number of defects to the number of bad panels, as shown by Equations (45), (47), (51), and (56).

Then, one can obtain, with the assumption $O_{ATB} \cong O'_{ATB}$, $$I_{AR} - I'_{AR} = (R + Q - U - O_{ATB}) - (R + Q' - U' - O'_{ATB}) \cong (Q - Q') - (U - U'), \qquad (93)$$

where R is the number of bad panels with real defects.

From Equations (91), (92), and (93), one obtains:

$$I_{AR} - I'_{AR} \cong \Delta Q - \Delta U = \gamma(\Delta Q - \Delta U). \qquad (94)$$

Using Equation (94) in Equation (90), one obtains:

$$P \cong \gamma(\Delta Q - \Delta U)C_R + (Y_C - (1-(1-Y_C)U'/U))I_C(C_M + C_{MI}) + ((1-(1-Y_M)U'/U)(1-(1-Y_C)U'/U) - Y_M Y_C)P_{VALUE}I_C. \qquad (95)$$

VI. Profit Maximization by Threshold Optimization

The effect of a new thresholding test recipe on yields at the cell inspection stage 208 and the module inspection stage 212, and on the productivity of the array repair equipment will now be described. It will also be shown how profit can be maximized by optimizing thresholding parameters.

As discussed above, in order to have a reference for optimization of the thresholding parameters, the current test recipe of the array test equipment is called the primary test recipe, and its test result is called the primary test result. The current thresholding parameters of Vthi+, Vtlo+, Vthi−, and Vtlo− are called primary thresholding parameters. If one wants to evaluate the effect of new thresholding parameters on a production batch that has been already been processed through final module inspection using the primary test recipe, then one can use the evaluation method that will now be described.

If the defective pixel voltage distribution is already known, then the number of under-killed defects for the primary test recipe can be obtained by:

$$U = Unl + Unh + Upl + Uph, \qquad (96)$$

where:

$$Unl = \int_{Vtlo-}^{Vdc-} \theta nl\, dv, \quad Unh = \int_{Vdb-}^{Vthi-} \theta nh\, dv,$$

$$Upl = \int_{Vtlo+}^{Vdb+} \theta pl\, dv, \quad Uph = \int_{Vdc+}^{Vthi+} \theta ph\, dv.$$

If the normal pixel voltage distribution is already known, then the number of over-killed defects for the primary test recipe can be obtained by:

$$Q = Qnl + Qnh + Qpl + Qph, \qquad (97)$$

where:

$$Qnl = \int_{-\infty}^{Vtlo-} \Theta n\, dv, \quad Qnh = \int_{Vthi-}^{0} \Theta n\, dv,$$

$$Qpl = \int_{0}^{Vtlo+} \Theta p\, dv, \quad Qph = \int_{Vthi+}^{\infty} \Theta p\, dv.$$

The Vtlo− thresholding value is scanned using variable vtlo−, while keeping the other threshold voltages at the fixed primary values. In this way, the number of under-killed and over-killed defects for the new thresholding recipe can be obtained by:

$$U' = U'nl + Unh + Upl + Uph; \text{ and} \qquad (98)$$

$$Q' = Q'nl + Qnh + Qpl + Qph, \qquad (99)$$

where:

$$U'nl = \int_{vtlo-}^{Vdc-} \theta nl\, dv \text{ and } Q'nl = \int_{-\infty}^{vtlo-} \Theta n\, dv.$$

From Equations (91), (92), and (96)–(99), one obtains:

$$\Delta Q = Q - Q' = Qnl - Q'nl; \text{ and} \qquad (100)$$

$$\Delta U = U - U' = Unl - U'nl. \qquad (101)$$

From Equations (82), (83), (88), (89), (96), and (98), one obtains:

$$Y'_C = 1 - (1 - Y_C)(U'nl + Unh + Upl + Uph)/(Unl + Unh + Upl + Uph); \qquad (102)$$

$$E_{YC} \equiv Y'_C - Y_C = (1 - Y_C)(1 - (U'nl + Unh + Upl + Uph)/(Unl + Unh + Upl + Uph)); \qquad (103)$$

$$Y'_M = 1 - (1 - Y_M)(U'nl + Unh + Upl + Uph)/(Unl + Unh + Upl + Uph); \text{ and} \qquad (104)$$

$$E_{YM} \equiv Y'_M - Y_M = (1 - Y_M)(1 - (U'nl + Unh + Upl + Uph)/(Unl + Unh + Upl + Uph)). \qquad (105)$$

From Equations (95), (96), (98), (100), and (101), one obtains:

$$P \cong \gamma(Qnl-Q'nl-Unl+U'nl)C_R+(Y_C-(1-(1-Y_C)(U'nl+Unh+Upl+Uph)/(Unl+Unh+Upl+Uph)))I_C(C_M+C_{MI})+((1-(1-Y_M)(U'nl+Unh+Upl+Uph)/(Unl+Unh+Upl+Uph))(1-(1-Y_C)(U'nl+Unh+Upl+Uph)/(Unl+Unh+Upl+Uph))-Y_MY_C)P_{VALUE}I_C \quad (106)$$

Therefore, profit maximization can be achieved by taking the maximum value of P while the variable vtlo– is scanned around the primary thresholding parameter of Vtlo–.

The Vthi– thresholding value can also be scanned using variable vthi–, while keeping the other thresholding voltages at the fixed primary values. The number of under-killed and over-killed defects for the new thresholding recipe can then be obtained by:

$$U'=Unl+U'nh+Upl+Uph; \text{ and} \quad (107)$$

$$Q'=Qnl+Q'nh+Qpl+Qph, \quad (108)$$

where:

$$U'nh = \int_{Vdb-}^{vthi-} \theta nh\, dv \text{ and } Q'nh = \int_{vthi-}^{0} \Theta n\, dv.$$

From Equations (91), (92), (96), (97), (107), and (108), one obtains:

$$\Delta Q = Q - Q' = Qnh - Q'nh; \text{ and} \quad (109)$$

$$\Delta U = U - U' = Unh - U'nh. \quad (110)$$

From Equations (82), (83), (88), (89), (96), and (107), one obtains:

$$Y'_C = 1-(1-Y_C)(Unl+U'nh+Upl+Uph)/(Unl+Unh+Upl+Uph); \quad (111)$$

$$E_{YC} \cong Y'_C - Y_C = (1-Y_C)(1-(Unl+U'nh+Upl+Uph)/(Unl+Unh+Upl+Uph)); \quad (112)$$

$$Y'_M = 1-(1-Y_M)(Unl+U'nh+Upl+Uph)/(Unl+Unh+Upl+Uph); \text{ and} \quad (113)$$

$$E_{YM} \cong Y'_M - Y_M = (1-Y_M)(1-(Unl+U'nh+Upl+Uph)/(Unl+Unh+Upl+Uph)). \quad (114)$$

From Equations (95), (96), (107), (109), and (110), one obtains:

$$P \cong \gamma(Qnh-Q'nh-Unh+U'nh)C_R+(Y_C-(1-(1-Y_C)(Unl+U'nh+Upl+Uph)/(Unl+Unh+Upl+Uph)))I_C(C_M+C_{MI})+((1-(1-Y_M)(Unl+U'nh+Upl+Uph)/(Unl+Unh+Upl+Uph))(1-(1-Y_C)(Unl+U'nh+Upl+Uph)/(Unl+Unh+Upl+Uph))-Y_MY_C)P_{VALUE}I_C \quad (115)$$

Therefore, profit maximization can be achieved by taking the maximum value of P, while the variable vthi– is scanned around the primary parameter of Vthi–.

Thresholding value Vtlo+ can also be scanned using variable vtlo+, while keeping the other thresholding voltages at the fixed primary values. The number of under-killed and over-killed defects for the new thresholding recipe can then be obtained by:

$$U'=Unl+Unh+U'pl+Uph; \text{ and} \quad (116)$$

$$Q'=Qnl+Qnh+Q'pl+Qph, \quad (117)$$

where:

$$U'pl = \int_{vtlo+}^{Vdb+} \theta pl\, dv \text{ and } Q'pl = \int_{0}^{vtlo+} \Theta p\, dv.$$

From Equations (91), (92), (96), (97), (116), and (117), one obtains:

$$\Delta Q = Q - Q' = Qpl - Q'pl; \text{ and} \quad (118)$$

$$\Delta U = U - U' = Upl - U'pl. \quad (119)$$

From Equations (82), (83), (88), (89), (96), and (116), one obtains:

$$Y'_C = 1-(1-Y_C)(Unl+Unh+U'pl+Uph)/(Unl+Unh+Upl+Uph); \quad (120)$$

$$E_{YC} \cong Y'_C - Y_C = (1-Y_C)(1-(Unl+Unh+U'pl+Uph)/(Unl+Unh+Upl+Uph)); \quad (121)$$

$$Y'_M = 1-(1-Y_M)(Unl+Unh+U'pl+Uph)/(Unl+Unh+Upl+Uph); \text{ and} \quad (122)$$

$$E_{YM} \cong Y'_M - Y_M = (1-Y_M)(1-(Unl+Unh+U'pl+Uph)/(Unl+Unh+Upl+Uph)) \quad (123)$$

From Equations (95), (96), (116), (118), and (119), one obtains:

$$P \cong \gamma(Qpl-Q'pl-Upl+U'pl)C_R+(Y_C-(1-(1-Y_C)(Unl+Unh+U'pl+Uph)/(Unl+Unh+Upl+Uph)))I_C(C_M+C_{MI})+((1-(1-Y_M)(Unl+Unh+U'pl+Uph)/(Unl+Unh+Upl+Uph))(1-(1-Y_C)(Unl+Unh+U'pl+Uph)/(Unl+Unh+Upl+Uph))-Y_MY_C)P_{VALUE}I_C. \quad (124)$$

Therefore, profit maximization can be achieved by taking the maximum value of P, while the variable vtlo+ is scanned around the primary parameter of Vtlo+.

Thresholding value Vthi+ can also be scanned using variable vthi+, while keeping the other thresholding voltages at the fixed primary values. The number of under-killed and over-killed defects for the new thresholding recipe can then be obtained by:

$$U'=Unl+Unh+Upl+U'ph; \text{ and} \quad (125)$$

$$Q'=Qnl+Qnh+Qpl+Q'ph, \quad (126)$$

where:

$$U'ph = \int_{Vdc+}^{vthi+} \theta ph\, dv \text{ and } O'ph = \int_{vthi+}^{\infty} \Theta p\, dv.$$

From Equations (91), (92), (96), (97), (125), and (126), one obtains:

$$\Delta Q = Q - Q' = Qph - Q'ph; \text{ and} \quad (127)$$

$$\Delta U = U - U' = Uph - U'ph. \quad (128)$$

From Equations (82), (83), (88), (89), (96), and (125), one obtains:

$$Y'_C = 1-(1-Y_C)(Unl+Unh+Upl+U'ph)/(Unl+Unh+Upl+Uph); \quad (129)$$

$$E_{YC} \cong Y'_C - Y_C = (1-Y_C)(1-(Unl+Unh+Upl+U'ph)/(Unl+Unh+Upl+Uph)); \quad (130)$$

$$Y'_M = 1-(1-Y_M)(Unl+Unh+Upl+U'ph)/(Unl+Unh+Upl+Uph); \text{ and} \quad (131)$$

$$E_{YM} = Y'_M - Y_M = (1-Y_M)(1-(Unl+Unh+Upl+U'ph)/(Unl+Unh+Upl+Uph)). \quad (132)$$

From Equations (95), (96), (125), (127), and (128), one obtains:

$$P \cong \gamma(Qph-Q'ph-Uph+U'ph)C_R + (Y_C-(1-(1-Y_C)(Unl+Unh+Upl+U'ph)/(Unl+Unh+Upl+Uph)))I_C(C_M + C_{MI}) + ((1-(1-Y_M)(Unl+Unh+Upl+U'ph)/(Unl+Unh+Upl+Uph))(1-(1-Y_C)(Unl+Unh+Upl+U'ph)/(Unl+Unh+Upl+Uph)) - Y_M Y_C)P_{VALUE}I_C. \quad (133)$$

Therefore, profit maximization can be achieved by taking the maximum value of P, while the variable vthi+ is scanned around the primary parameter of Vthi+.

Thus, it has been shown how new values for the thresholding parameters of Vtlo−, Vthi−, Vtlo+, and Vthi+ can be determined that give the maximum profit when the defective and normal pixel voltage distributions are already known. One can use the methodology described above to optimize the thresholding parameters based on presumed or known distributions of defective and normal pixel voltages.

Figure 5:
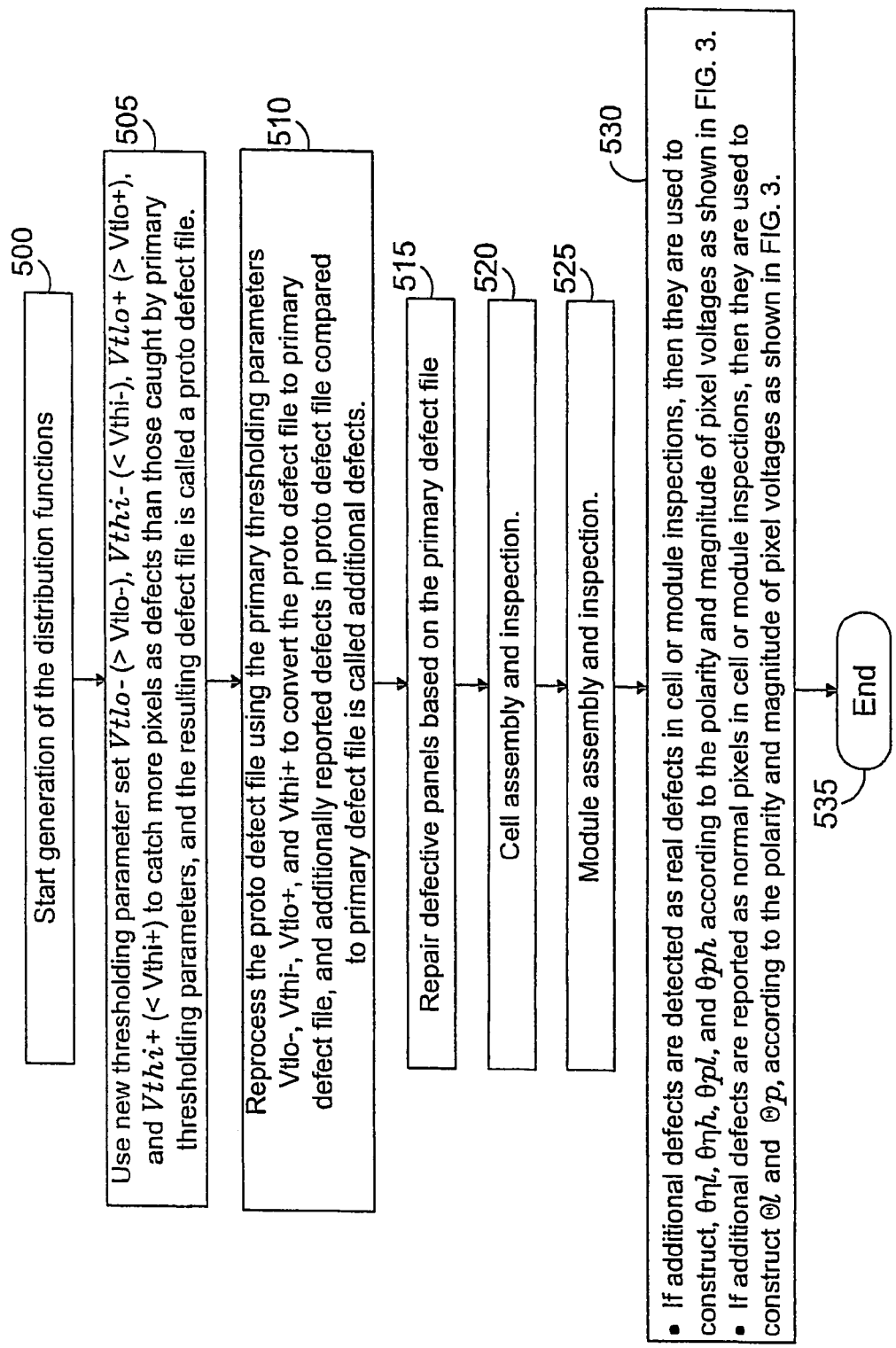
FIG. 5 is a flow chart of a method of generating the distribution functions for normal pixels and defective pixels in an actual production environment, in accordance with the present invention.

FIG. 5 is a flow chart of a method of generating the distribution functions for normal pixels and defective pixels in an actual production environment. All the equations having integral expressions should be solved in such a way that the integration is performed numerically by counting the number of either good pixels for Θn and Θp, or the number of defective pixels for θnl, θnh, θpl and θph, as the thresholding parameter is scanned.

The method starts at step 500, and proceeds to step 505, where a new thresholding parameter set is used that will classify more pixels as defects than those classified by the primary thresholding parameters. The resulting defect file is labeled "proto defect file".

Then, at step 510, the proto defect file is reprocessed using the primary thresholding parameters, in order to convert the proto defect file to a primary defect file. The primary defect file is then compared to the proto defect file, and the additional defective pixels reported in the proto defect file are labeled "additional defects".

Next, at step 515, the defective panels are repaired based on information in the primary defect file. The process proceeds to step 520, where the cells are assembled and inspected.

Then, at step 525, the modules are assembled and inspected. Next, at step 530, if the "additional defects" are detected as real defective pixels during the cell or module inspections, the "additional defects" are used to construct θnl, θnh, θpl, and θph in accordance with the polarity and magnitude of the pixel voltages, as shown in FIG. 3. The process then ends at step 535.

The analysis described above is applicable to a production line model that does not utilize the optional cell and module repair stages 214 and 216. However, it should be appreciated that the analysis described above can be adapted for a production line model that does utilize the optional cell and model repair stages 214 and 216, while still falling within the scope of the present invention. Further, if the optional cell and module repair stages 214 and 216 are used, but the cell and module repair rates are so low as to not make a significant contribution to the yield rates, then the above-described analysis may be applied.

VII. Profit Evaluation Using New Distribution Function Test Recipe

It was described above how profit can be maximized by optimizing the thresholding parameters, based on the assumption that the under-killed defects are the dominant cause of bad panels at the cell and module inspection stages 208 and 212. In order to further improve the profit, a new distribution function test recipe can also be applied to the TFT-array test equipment.

In order to verify the effect of the new distribution function test recipe, one may split a very large production run into two groups, and test one group using the primary test recipe and the second group using the new distribution function test recipe. Then, the yields at the cell and module inspection stages 208 and 212 for each group can be compared. However, this method would take a long time due to the very large sample quantity required to minimize process fluctuations, and also takes the high risk of sacrificing many sample units if one uses an improper new distribution function test recipe.

Thus, it is preferable to evaluate the new distribution function test recipe using the same production run that was already tested with the primary test recipe, in order to obtain a fair comparison between the primary and new distribution function test recipes, without the need for large numbers of panels. The new distribution function test recipe generates different distribution functions for normal and defective pixel voltages from those generated by the primary test recipe, even for the same sample production run. The effects of the new distribution function test recipe on the yield and profit are then evaluated.

First, at the array test stage 202, the sample production run is tested with the primary test recipe, and the test results is labeled "primary defect file" ($DF_{PRIME}$). Then, the same sample production run is retested with the new distribution function test recipe, and that test result is called "new defect file" ($DF_{NEW}$).

The sample production run then proceeds to the array repair stage 204, and only the pixels commonly reported as defective in $DF_{PRIME}$ and $DF_{NEW}$ are reviewed by the operator of the TFT-array repair equipment. The operator then attempts to repair the pixels when the defects are visually confirmed. The sample production run then proceeds to next stages, which is assumed to not include the optional cell and module repair stages 214 and 216.

For evaluation of the new distribution function test recipe, one needs to sort out the defects reported in $DF_{PRIME}$ and $DF_{NEW}$ based on the repair actions performed on the defects, and the results of cell and module inspections at the cell and module inspection stages 208 and 212.

Figure 7:
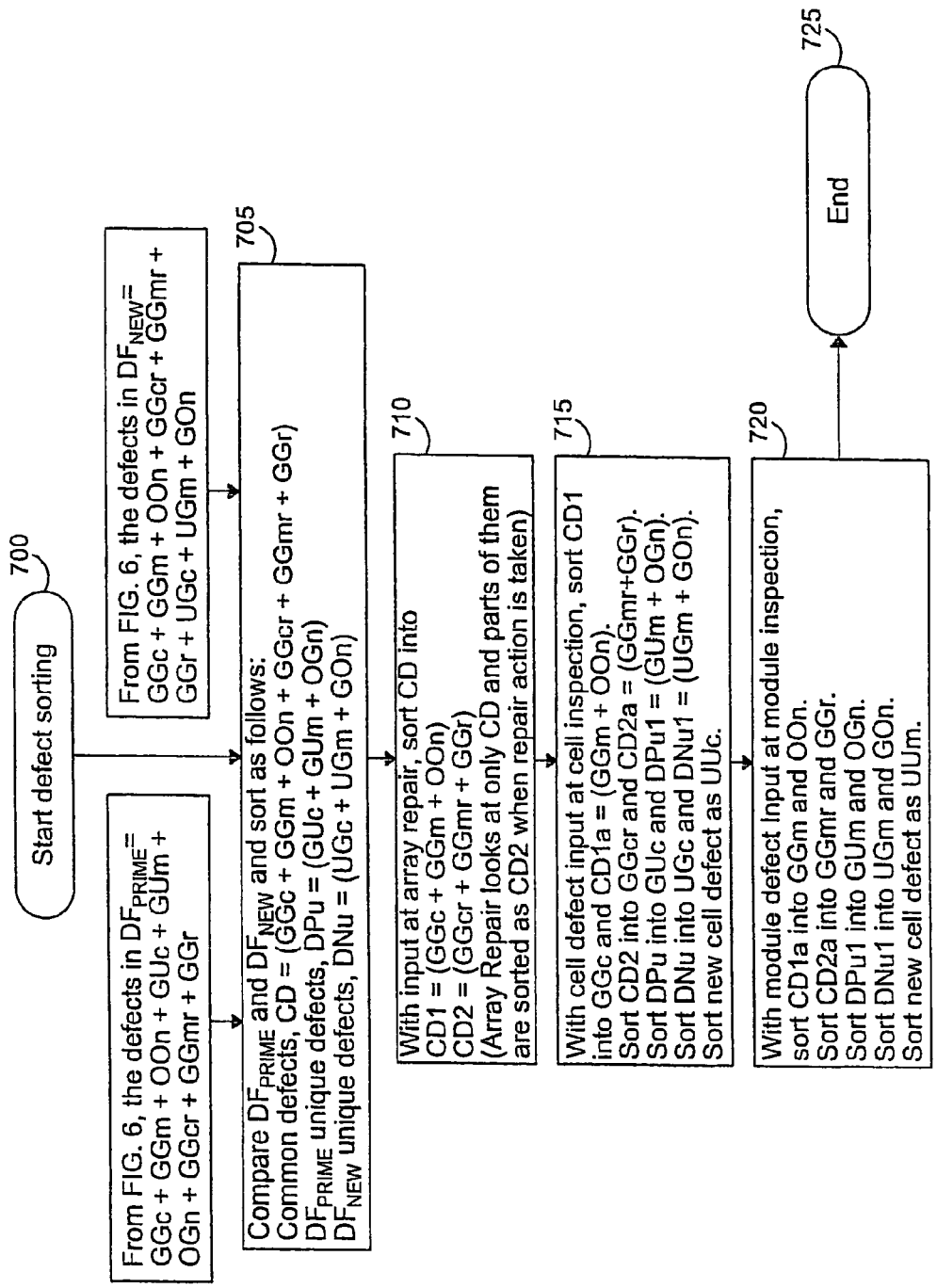
FIG. 7 is a flow chart of a process for sorting defective pixels discovered using the results of the array test stage, array repair stage, cell inspection stage and module inspection stage, in accordance with the present invention.

The table shown in FIG. 6 and the flow chart shown in FIG. 7 illustrate how the results of the array test stage 202, array repair stage 204, cell inspection stage 208 and module inspection stage 212 are used to sort out the defective pixels discovered.

The process of FIG. 7 starts at step 700, and proceeds to steps 705, where the $DF_{PRIME \; and \; DFNEW}$ are obtained from the table of FIG. 6 and sorted as follows:

Common defects, CD=(GGc+GGm+OOn+GGcr+GGmr+GGr);

$DF_{PRIME}$ unique defects, DPu=(GUc+GUm+OGn); and $DF_{NEW}$ unique defects, DNu=(UGc+UGm+GOn).

The process then continues to step 710 where, using the input to the array repair stage 204, CD is sorted into:

CD1=(GGc+GGm+OOn); and

CD2=(GGcr+GGmr+GGr).

The array repair stage looks at only CD and parts of them are sorted as CD2 when a repair action is taken.

Next, at step 715, using the input to the cell inspection stage 208, the following sorting is done:

CD1 into GGc and CD1a=(GGm+OOn);
CD2 into GGcr and CD2a=(GGmr+GGr);
DPu into GUc and DPu1=(GUm+OGn);
DNu into UGc and DNu1=(UGm+GOn); and new cell defects as UUc.

Then, at step 720, using the input to the module inspection stage, the following sorting is done:

CD1a into GGm and OOn;
CD2a into GGmr and GGr;
DPu1 into GUm and OGn;
DNu1 into UGm and GOn; and new cell defect as UUm.

The process then ends at step 725. From FIG. 6, the total cell defect for the sample production ($T_{CDc}$) can be obtained as:

$$T_{CDc}=GGc+GUc+GGcr+UGc+UUc. \quad (134)$$

The effect of a new distribution function test recipe on the cell yield will now be considered. Total cell defect, if only the primary test recipe had been applied, is shown in the table of FIG. 8, and is given by:

$$T_{CD}=T_{CDc}-NcGUc, \quad (135)$$

because all GUc pixels should have been identified as defects and Nc portion of them could have been repaired to good pixels and would have increased GGr. GGr can be defined as:

$$GGr=GGrc+GGrm, \quad (136)$$

where GGrc is the number of good repaired pixels, which would have been detected as defects at the cell inspection stage 208 had they not been repaired, and GGrm is the number of good repaired pixels which would have been detected as defects at the module inspection stage 212 had they nor been repaired. One can then assume that the number of successfully repaired pixels (Nc) would have followed the successful repair rate for the commonly detected defects, and obtain an expression for Nc as follows:

$$Nc=GGrc/(GGcr+GGrc). \quad (137)$$

One can assume that the successful repair rate of cell defects is the same as that of module defects (GGcr:GGmr=GGrc:GGrm) and obtain:

$$GGrc=GGcrGGrm/GGmr. \quad (138)$$

From Equations (136) and (138), one obtains:

$$GGrc=GGcr(GGr-GGrc)/GGmr; \quad (139)$$

$$GGmrGGrc+GGcrGGrc=GGcrGGr; \text{ and} \quad (140)$$

$$GGrc=GGcrGGr/(GGmr+GGcr). \quad (141)$$

From Equations (134), (135), (137) and (141), one obtains:

$$N_C=(GGcrGGr/(GGmr+GGcr))/(GGcr+(GGcrGGr/(GGmr+GGcr)))=GGcrGGr/(GGcr(GGmr+GGcr)+GGcrGGr)=GGr/(GGmr+GGcr+GGr); \text{ and} \quad (142)$$

$$T_{CD}=T_{CDc}-NcGUc=GGc+(1-N_c)GUc+GGcr+UGc+UUc. \quad (143)$$

From Equations (142) and (143), one obtains:

$$T_{CD}=GGc+(GGmr+GGcr)GUc/(GGmr+GGcr+GGr)+GGcr+UGc+UUc. \quad (144)$$

Total cell defects, if only the new distribution function test recipe had been applied, is shown in the table of FIG. 9, and is given by:

$$T'_{CD}=T_{CDc}-NcUGc, \quad (145)$$

because all the UGc pixels should have been identified as defects and Nc number of them could have been repaired to good pixels and would have increased GGr.

From Equations (134) and (145), one obtains:

$$T'_{CD}=T_{CDc}-NcUGc=GGc+GUc+GGcr+(1-N_C)UGc+UUc. \quad (146)$$

From Equations (142) and (146), one obtains:

$$T'_{CD}=GGc+GUc+GGcr+(GGmr+GGcr)UGc/(GGmr+GGcr+GGr)+UUc. \quad (147)$$

From Equations (143) and (146), the effect on total cell defects ($\epsilon_{TCD}$) due to using the new distribution function test recipe only instead of only the primary test recipe is given by:

$$\epsilon_{TCD}=T_{CD}-T'_{CD}=NcUGc-NcGUc=Nc(UGc-GUc). \quad (148)$$

From FIG. 6, the total module defects for the sample production ($T_{MDc}$) can be obtained as:

$$T_{MDc}=GGm+GUm+GGmr+UGm+UUm. \quad (149)$$

The effect of the new distribution function test recipe on the module yield will now be considered. Total module defects, if only the primary test recipe had been applied is shown in FIG. 8, and is given by:

$$T_{MD}=T_{MDc}-NmGUm, \quad (150)$$

because all GUm pixels should have been identified as defects, and Nm number of them could have been repaired to good pixels, which would have increased GGr. Then, one can assume that the portion of successfully repaired pixels follows the successful repair rate for the commonly detected defects, and obtain the following expression for Nm:

$$Nm=GGrm/(GGmr+GGrm). \quad (151)$$

From Equation (138), one obtains:

$$GGrm=GGmrGGrc/GGcr. \quad (152)$$

From Equations (136) and (152), one obtains:

$$GGrm=GGmr(GGr-GGrm)/GGcr; \quad (153)$$

$$GGrmGGcr+GGmrGGrm=GGmrGGr; \text{ and} \quad (154)$$

$$GGrm=GGmrGGr/(GGcr+GGmr). \quad (155)$$

From Equations (149), (150), (151) and (155), one obtains:

$$Nm=(GGmrGGr/(GGcr+GGmr))/(GGmr+(GGmrGGr/(GGcr+GGmr)))=GGmrGGr/(GGmr(GGcr+GGmr)+GGmrGGr)=GGr/(GGcr+GGmr+GGr); \text{ and} \quad (156)$$

$$T_{MD}=T_{MDc}-NmGUm=GGm+(1-Nm)GUm+GGmr+UGm+UUm. \quad (157)$$

From Equations (156) and (157), one obtains:

$$T_{MD}=GGm+(GGcr+GGmr)GUm/(GGcr+GGmr+GGr)+GGmr+UGm+UUm. \quad (158)$$

Total module defects, if only the new distribution function test recipe had been applied, is shown in FIG. 9, and is given by:

$$T'_{MD}=T_{MDc}-NmUGm, \quad (159)$$

because all UGm pixels should have been identified as defects, and Nm number of them could have been repaired to good pixels and would have increased GGr.

From Equations (149) and (159), one obtains:

$$T'_{MD} = T_{MDc} - NmUGm = GGm + GUm + GGmr + (1-Nm)UGm + UUm. \quad (160)$$

From Equations (156) and (160), one obtains:

$$T'_{MD} = GGm + GUm + GGmr + (GGcr + GGmr)UGm/(GGcr + GGmr + GGr) + UUm. \quad (161)$$

From Equations (157) and (160), the effect on total module defects ($\epsilon_{TMD}$) due to using the new distribution function test recipe only instead of only the primary test recipe is given by:

$$\epsilon_{TMD} = T_{MD} - T'_{MD} = NmUGm - NmGUm = Nm(UGm - GUm). \quad (162)$$

The effect of the new distribution function test recipe on over-kill will now be considered. From Equation (91) and FIG. 6, one can obtain:

Number of over-killed panels of primary-test-only,
$$Q = \gamma Q = \gamma(OOn + OGn); \quad (163)$$

Number of over-killed panels of new-test-only,
$$Q' = \gamma Q' = \gamma(OOn + GOn); \text{ and} \quad (164)$$

$$\Delta Q = Q - Q' = \gamma(OGn - GOn). \quad (165)$$

In TFT-LCD manufacturing, because of the possibility of unsuccessful repair work, the under-killed defects may not be the only dominating source for bad panels at cell or module inspections. Thus, from Equations (45), (47), (51) and (56), one can assume that the rate of bad panels at the cell inspection stage 208 is proportional to the number of total cell defects, and obtain following expressions:

$$O_{CB}/I_C \cdot T_{CD} = O'_{CB}/I'_C \cdot T'_{CD}; \text{ and} \quad (166)$$

$$O'_{CB}/I'_C = O_{CB}T'_{CD}/(I_C T_{CD}). \quad (167)$$

From Equations (79) and (167), one obtains:

$$(I'_C - O'_{CG})/I'_C = (I_C - O_{CG})T'_{CD}/(I_C T_{CD}); \text{ and} \quad (168)$$

$$1 - O'_{CG}/I'_C = (1 - O_{CG}/I_C)T'_{CD}/T_{CD}. \quad (169)$$

From Equations (11) and (169), one obtains:

$$Y'_C = 1 - (1 - Y_C)T'_{CD}/T_{CD}. \quad (170)$$

Then, the improvement of cell inspection yield ($E_{YC}$) can be expressed as:

$$E_{YC} = Y'_C - Y_C = (1 - Y_C)(1 - T'_{CD}/T_{CD}). \quad (171)$$

One can also assume that the rate of bad panels at the module inspection stage 212 is proportional to the number of total module defects, and obtain following expression:

$$O_{MB}/I_M \cdot T_{MD} = O'_{MB}/I'_M \cdot T'_{MD}. \quad (172)$$

Then, one obtains:

$$O'_{MB}/I'_M = O_{MB}T'_{MD}/(I_M T_{MD}). \quad (173)$$

From Equation (173), since $O_{MB} = I_M - O_{MG}$ without the optional cell and module repair stages 214 and 216, one obtains:

$$(I'_M - O'_{MG})/I'_M = (I_M - O_{MG})T'_{MD}/(I_M T_{MD}); \text{ and} \quad (174)$$

$$1 - O'_{MG}/I'_M = (1 - O_{MG}/I_M)T'_{MD}/T_{MD}. \quad (175)$$

From Equations (12) and (175), one obtains:

$$Y'_M = 1 - (1 - Y_M)T'_{MD}/T_{MD}. \quad (176)$$

Then, the improvement in the module inspection yield ($E_{YM}$) can be expressed as:

$$E_{YM} = Y'_M - Y_M = (1 - Y_M)(1 - T'_{MD}/T_{MD}). \quad (177)$$

Then, one can obtain an expression for the profit increase by using Equations (170), (171), (176), (177), and (26), as follows:

$$P \cong (I_{AR} - I'_{AR})C_R + (Y_C - 1)(1 - T'_{CD}/T_{CD})I_C(C_M + C_{MI}) + ((1 - (1-Y_M)T'_{MD}/T_{MD})(1 - (1-Y_C)T'_{CD}/T_{CD}) - Y_M Y_C)P_{VALUE}I_C. \quad (178)$$

Using Equation (94) in Equation (178), one obtains:

$$P \cong (\Delta Q - \Delta U)C_R + (Y_C - 1)(1 - T'_{CD}/T_{CD})I_C(C_M + C_{MI}) + ((1 - (1-Y_M)T'_{MD}/T_{MD})(1 - (1-Y_C)T'_{CD}/T_{CD}) - Y_M Y_C)P_{VALUE}I_C. \quad (179)$$

The effect of the new distribution function test recipe on under-kill will now be considered. From Equation (92) and FIG. 6, one can obtain:

Number of under-killed panels of primary-test-only,
$$U = \gamma U = \gamma(UGc + UUc + UGm + UUm); \text{ and} \quad (180)$$

Number of under-killed panels of new-test-only,
$$U' = \gamma U' = \gamma(GUc + GUm + UUc + UUm), \quad (181)$$

where U and U' are the numbers of under-killed defects for the primary and new distribution function test recipes, respectively. From Equations (92), (180) and (181), one obtains the following expression for the effect of the new distribution function test recipe on the under-killed panels:

$$\Delta U = U - U' = \gamma(UGc + UGm - GUc - GUm). \quad (182)$$

Using Equations (165) and (182) in Equation (179), one obtains:

$$P \cong \gamma(OGn - GOn - UGc - UGm + GUc + GUm)C_R + (Y_C - 1)(1 - T'_{CD}/T_{CD})I_C(C_M + C_{MI}) + ((1 - (1-Y_M)T'_{MD}/T_{MD})(1 - (1-Y_C)T'_{CD}/T_{CD}) - Y_M Y_C)P_{VALUE}I_C. \quad (183)$$

The values of $Y_C$ and $Y_M$ can be obtained from a recent production that was tested with the primary test recipe, under the assumption that the yields between the recent and sample productions are the same. The values of $Y_C$ and $Y_M$ can also be obtained from the sample production, as will now be explained.

One can obtain expressions for $Y_C$ and $Y_M$, similar to the expressions for $Y'_C$ and $Y'_M$ shown in Equations (170) and (176), from the assumption that the rate of bad panels at cell and module inspection stages 208 and 212 is proportional to the number of total cell and module defects:

$$Y_C = 1 - (1 - Y_{Cc})T_{CD}/T_{CDc}; \text{ and} \quad (184)$$

$$Y_M = 1 - (1 - Y_{Mc})T_{MD}/T_{MDc}, \quad (185)$$

where $Y_{Cc}$ and $Y_{Mc}$ are the cell and module yields, respectively, for the sample production in which only the pixels commonly reported as defects in $DF_{PRIME}$ and $DF_{NEW}$ are sent to the TFT-array repair equipment.

From Equations (134), (144), (149), (158), (184) and (185), one obtains:

$$Y_C = 1 - (1 - Y_{Cc})(GGc + (GGmr + GGcr)GUc/(GGmr + GGcr + GGr) + GGcr + UGc + UUc)/(GGc + GUc + GGcr + UGc + UUc); \text{ and} \quad (186)$$

$$Y_M = 1 - (1 - Y_{Mc})(GGm + (GGcr + GGmr)GUm/(GGcr + GGmr + GGr) + GGmr + UGm + UUm)/(GGm + GUm + GGmr + UGm + UUm). \quad (187)$$

The values of $I_C$, $I_{AR}$, and $I_M$ can be obtained from the recent production with the same quantity of $I_A$ that was tested with the primary test recipe, under the assumption that the yields are the same between the recent and sample productions. The values of $I_C$, $I_{AR}$, and $I_M$ can also be obtained from the sample production, as will now be described.

In regular production of TFT-LCDs, one can assume that $O_{ATB}+O_{ARB} \cong O_{ATBc}+O_{ARBc}$ (c denotes the sample production), because the bad panels usually go to next process stage as a portion of the larger TFT-array base plate. If the assumption $$O_{ATB}+O_{ARB} \cong O_{ATBc}+O_{ARBc} \tag{188}$$

is valid, then with $$I_C=I_A-(O_{ATB}+O_{ARB}) \text{ and} \tag{189}$$

$$I_{Cc}=I_A-(O_{ATBc}+O_{ARBc}), \tag{190}$$

one obtains:

$$I_C \cong I_{Cc} \tag{191}$$

From Equations (93), (163), (164), (180), (181) and FIG. 6, one obtains the following expressions for the sample production, in which only the defects detected both by the primary and new distribution function test recipes are sent to the TFT-array repair equipment:

$$I_{AR}-I_{ARc}=(R+Q-U-O_{ATB})-(R+Qc-Uc-O_{ATBc}) \cong (Q-Qc)-(U-Uc), \tag{192}$$

where $O_{ATB}-O_{ATBc} \cong 0$ is assumed;

Over-killed panels of sample production,
$$Qc=Q \cap Q'=\gamma OOn; \text{ and} \tag{193}$$

Under-killed panels of sample production,
$$Uc=U \cup U'=\gamma(UGc+UUc+UGm+UUm+GUc+GUm). \tag{194}$$

From Equations (163), (180), (192), (193) and (194), one obtains:

$$I_{AR}-I_{ARc} \cong \gamma(OOn+OGn-OOn)-\gamma(UGc+UUc+UGm+UUm-(UGc+UUc+UGm+UUm+GUc+GUm))=\gamma(OGn+GUc+GUm). \tag{195}$$

The value of $\gamma$ can be obtained with the assumption that $O_{ATBc}$ is very small compared with other parameters. From Equations (192), (193), (194) and FIG. 6, one obtains:

$$I_{ARc}=R+Qc-Uc=\gamma(GGc+GUc+GGm+GUm+GGcr+GGmr+GGr+UGc+UUc+UGm+UUm+OOn-(UGc+UUc+UGm+UUm+GUc+GUm))=\gamma(GGc+GGm+GGcr+GGmr+GGr+OOn). \tag{196}$$

Thus, from Eq. (196), one obtains:

$$\gamma=I_{ARc}/(GGc+GGm+GGcr+GGmr+GGr+OOn) \tag{197}$$

From Equations (195) and (197), one obtains:

$$I_{AR} \cong \gamma(OGn+GUc+GUm)+I_{ARc}=I_{ARc}(OGn+GUc+GUm)/(GGc+GGm+GGcr+GGmr+GGr+OOn)+I_{ARc}=I_{ARc}(OGn+GUc+GUm+GGc+GGm+GGcr+GGmr+GGr+OOn)/(GGc+GGm+GGcr+GGmr+GGr+OOn). \tag{198}$$

From FIG. 2, without the optional cell and module repair stages 214 and 216, and Equation (191), one obtains:

$$I_M \cong O_{CG}=I_C-O_{CB}; \text{ and} \tag{199}$$

$$I_{Mc}=O_{CGc}=I_{Cc}-O_{CBc} \cong I_C-O_{CBc}. \tag{200}$$

From Equations (199) and (200), one obtains:

$$I_M \cong I_{Mc}+O_{CBc}-O_{CB}. \tag{201}$$

From Equation (45), (47), (51) and (56), one can assume that the number of bad panels at the cell inspection stage 208 is proportional to the number of total cell defects, and obtain the following expressions:

$$O_{CB}=\delta T_{CD}; \text{ and} \tag{202}$$

$$O_{CBc}=\delta T_{CDc}, \tag{203}$$

where $\delta$ is a proportionality constant.

From Equations (134) and (203), one obtains:

$$\delta=O_{CBc}/T_{CDc}=O_{CBc}/(GGC+GUc+GGcr+UGc+UUc). \tag{204}$$

From Equations (144), (202) and (204), one obtains:

$$O_{CB}=(GGc+(GGmr+GGcr)GUc/(GGmr+GGcr+GGr)+GGcr+UGc+UUc)O_{CBc}/(GGc+GUc+GGcr+UGc+UUc). \tag{205}$$

Thus, from Equations (201) and (205), one obtains:

$$I_M \cong I_{Mc}+O_{CBc}-(GGc+(GGmr+GGcr)GUc/(GGmr+GGcr+GGr)+GGcr+UGc+UUc)O_{CBc}/(GGc+GUc+GGcr+UGc+UUc)=I_{Mc}+O_{CBc}(1-(GGc+(GGmr+GGcr)GUc/(GGmr+GGcr+GGr)+GGcr+UGc+UUc)/(GGc+GUc+GGcr+UGc+UUc)). \tag{206}$$

Using Equations (134), (144), (147), (149), (158), (161), (184), (185), (186), (187), (191) and (197) in Equation (183), one obtains:

$$P \cong (I_{ARc}/(GGc+GGm+GGcr+GGmr+GGr+OOn))(OGn-GOn-UGc-UGm+GUc+GUm))C_R+((Y_{Cc}-1)(GGc+(GGmr+GGcr)GUc/(GGmr+GGcr+GGr)+GGcr+UGc+UUc)/(GGc+GUc+GGcr+UGc+UUc))(1-(GGc+GUc+GGcr+(GGmr+GGcr)GUc/(GGmr+GGcr+GGr)+UUc)/(GGc+(GGmr+GGcr)GUc/(GGmr+GGcr+GGr)+GGcr+UGc+UUc))I_{Cc}(C_M+C_{MI})+((1-(1-Y_{Mc})(GGm+GUm+GGmr+(GGcr+GGmr)UGm/(GGcr+GGmr+GGr)+UUm)/(GGm+GUm+GGmr+UGm+UUm))(1-(1-Y_{Cc})(GGc+GUc+GGcr+(GGmr+GGcr)UGc/(GGmr+GGcr+GGr)+UUc)/(GGc+GUc+GGcr+UGc+UUc))-(1-(1-Y_{Mc})(GGm+(GGcr+GGmr)GUm/(GGcr+GGmr+GGr)+GGmr+UGm+UUm)/(GGm+GUm+GGmr+UGm+UUm))(1-(1-Y_{Cc})(GGc+(GGmr+GGcr)GUc/(GGmr+GGcr+GGr)+GGcr+UGc+UUc)/(GGc+GUc+GGcr+UGc+UUc)))P_{VALUE}I_{Cc}. \tag{207}$$

The analysis described above is applicable to a production line model that does not utilize the optional cell and module repair stages 214 and 216. However, it should be appreciated that the analysis described above can be adapted for a production line model that does utilize the optional cell and model repair stages 214 and 216, while still falling within the scope of the present invention. Further, if the optional cell and module repair stages 214 and 216 are used, but the cell and module repair rates are so low as to not make a significant contribution to the yield rates, then the above-described analysis may be applied.

VIII. Threshold Optimization with No Assumption about Defects

The threshold optimization methodology described above is based on the assumption that the under-killed defects are the only dominant cause of bad panels at cell and module inspections. Threshold optimization can also be done without the assumption that the under-killed defects are the only dominant cause of the bad panels at cell and module inspections.

Figure 10:
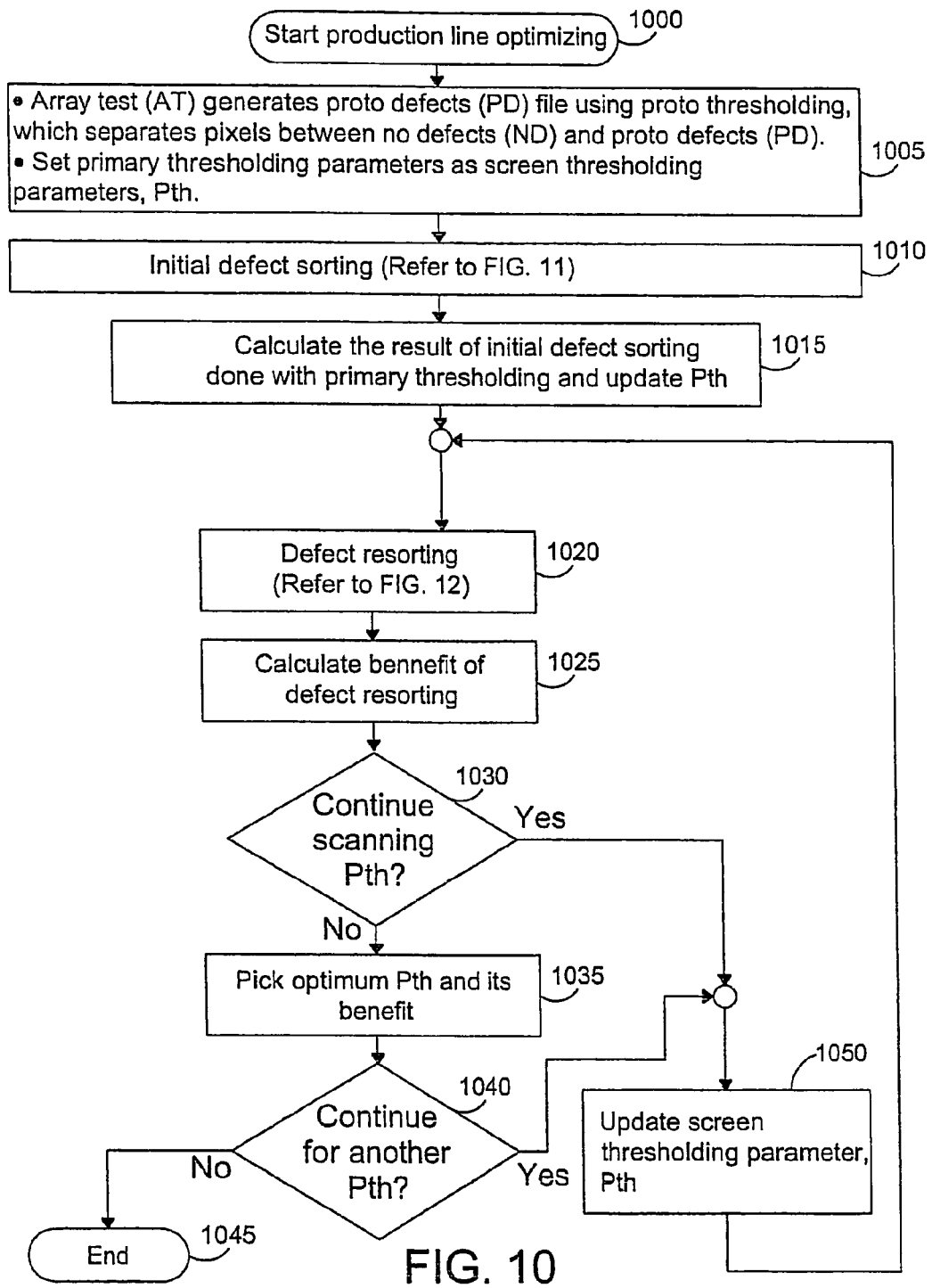
FIG. 10 is a flow chart of a process for profit maximization for the TFT-LCD production line can be achieved by optimization of the thresholding parameters, in accordance with the present invention.

FIG. 10 is a flow chart showing how profit maximization for the TFT-LCD production line can be achieved by optimization of the thresholding parameters. The process begins at step 1000, and proceeds to step 1005, where the TFT-array panels are tested, at the array test stage 202, by TFT-array test equipment. The testing is done with "proto thresholding" parameters, which are tighter than the primary thresholding parameters of the primary test recipe. The generated proto defects (PD) file identifies more defective pixels than the normal production defects file generated by the primary thresholding. At step 1005, the primary thresholding parameters are set as "screen thresholding parameters" (Pth).

Figure 11:
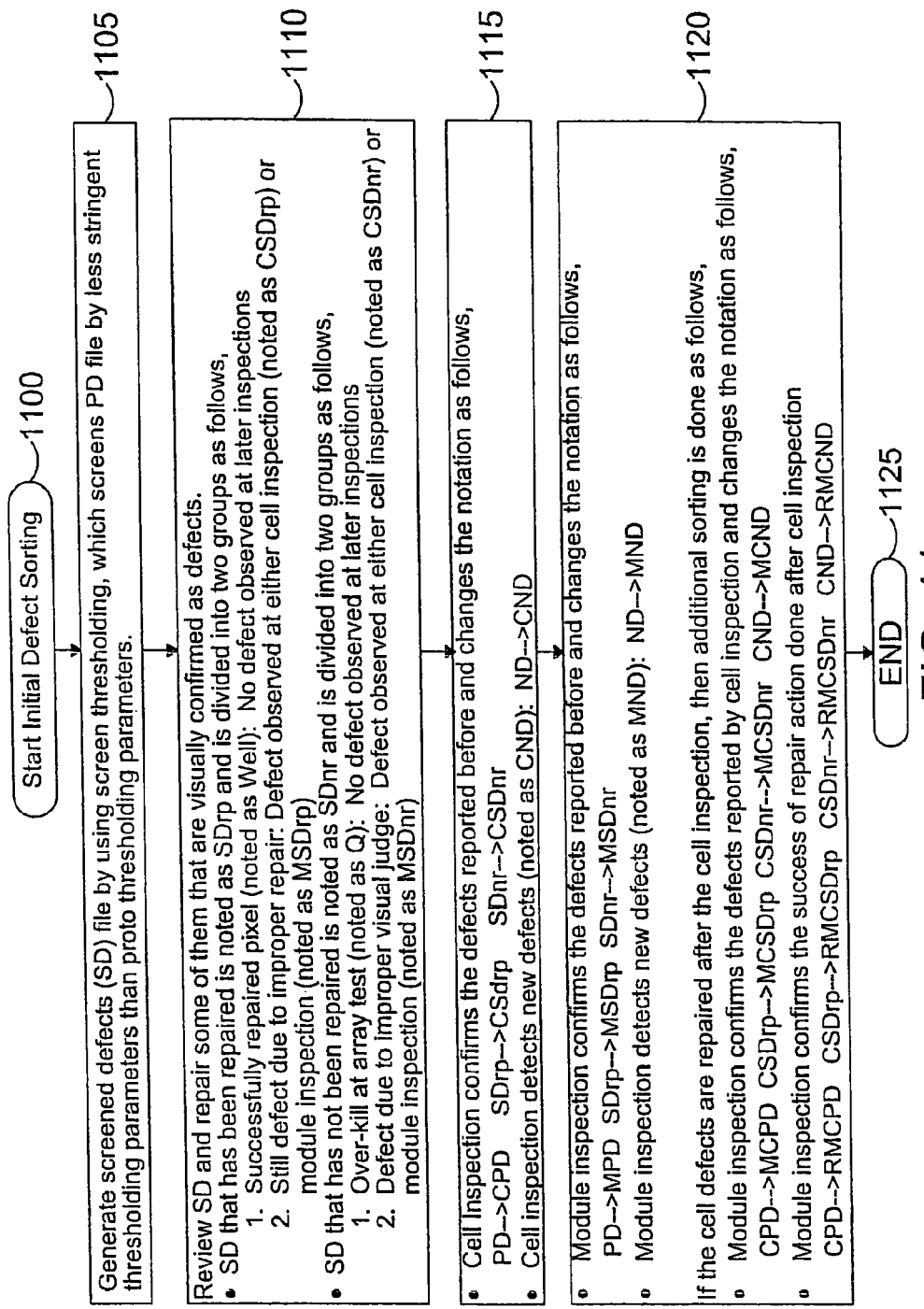
FIG. 11 is a flow chart of a process for initial defect sorting, in accordance with the present invention.

Next, at step 1010, initial defect sorting is performed for the PD file, in accordance with the flow chart of FIG. 11, in which primary thresholding parameters are applied to the proto defects file as screen thresholding parameters (Pth) to screen the PD file and generate a screened defects (SD) file that is identical to the normal defects file generated by the primary thresholding.

Referring to FIG. 11, the initial defect sorting process starts at step 1100, and proceeds to step 1105, where the screened defects (SD) file is generated by using screen thresholding, which screens the PD file by less stringent thresholding parameters than proto thresholding parameters. Then, at step 1110, the SD is reviewed and the panels that are visually confirmed as defective are repaired. The SD that has been repaired is noted as SDrp and is divided into two groups as follows: (1) Successfully repaired pixel (noted as Well)—no defect observed at later inspections; and (2) Still defective due to improper repair: The defect is observed at either cell inspection (noted as CSDrp) or module inspection (noted as MSDrp).

An SD that has not been repaired is noted as SDnr and is divided into two groups as follows: (1) Over-kill at array test (noted as Q)—no defect observed at later inspections; and (2) Defect due to improper visual judge—Defect observed at either cell inspection (noted as CSDnr) or module inspection (noted as MSDnr).

Next, at step 1115, cell inspection confirms the defects reported before and changes the notation as follows:
PD→CPD SDrp→CSDrp SDnr→CSDnr.

In addition, cell inspection detects new defects (noted as CND): ND→CND.

Then, at step 1120, module inspection confirms the defects reported before and changes the notation as follows:
PD→MPD SDrp→MSDrp SDnr→MSDnr.

Also, module inspection detects new defects (noted as MND): ND→MND.

If the cell defects are repaired after the cell inspection, then additional sorting is done as follows:
(1) Module inspection confirms the defects reported by cell inspection and changes the notation as follows:
CPD→MCPD  CSDrp→MCSDrp  CSDnr→MCSDnr  CND→MCND; and
(2) Module inspection confirms the success of repair action done after cell inspection, and changes the notation as follows:
CPD→RMCPD  CSDrp→RMCSDrp  CSDnr→RMCSDnr  CND→RMCND The process then ends at step 1125.

Referring back to FIG. 10, the result of the initial defect sorting shown in FIG. 11 is calculated at step 1015 as follows:

Cell defect $(T_{CD})=CPD+CSDrp+CSDnr+CND;$ (208)

Module defect $(T_{MD})=MPD+MSDrp+MSDnr+MND;$ and (209)

Over-kill $(Q)=SDnr-(CSDnr+MSDnr).$ (210)

After initial defect sorting, the screen thresholding parameters are scanned through the primary thresholding parameters in each zone, so that they can be either tighter or looser than the primary thresholding parameters, but not tighter than the proto thresholding parameters.

Whenever any of the screen thresholding parameters changes its value, defect resorting is done (step 1020) by applying the new parameter to the PD file to determine the effects of the changed parameter. Next, at step 1025, the benefit of the defect resorting is calculated. The process then proceeds to step 1030, where a decision is made as to whether to continue scanning Pth, whose span is set by the user around primary thresholding parameters with a restriction that Pth does not become tighter than the proto thresholding. If it is decided to continue scanning Pth, the process jumps to step 1050. Otherwise, the process continues to step 1035.

At step 1035, the optimum screen thresholding parameters (Pth) is chosen among all the screen thresholding parameters evaluated and its benefit is determined. Next, at step 1040, a decision is made as to whether to try additional screen thresholding parameters based on the benefit determined at step 1035. If it is decided to try additional screen thresholding parameters, the process proceeds to step 1050. Otherwise, the process ends at step 1045.

At step 1050, the screen thresholding parameters are updated, and the process jumps back to step 1020.

Figure 12:
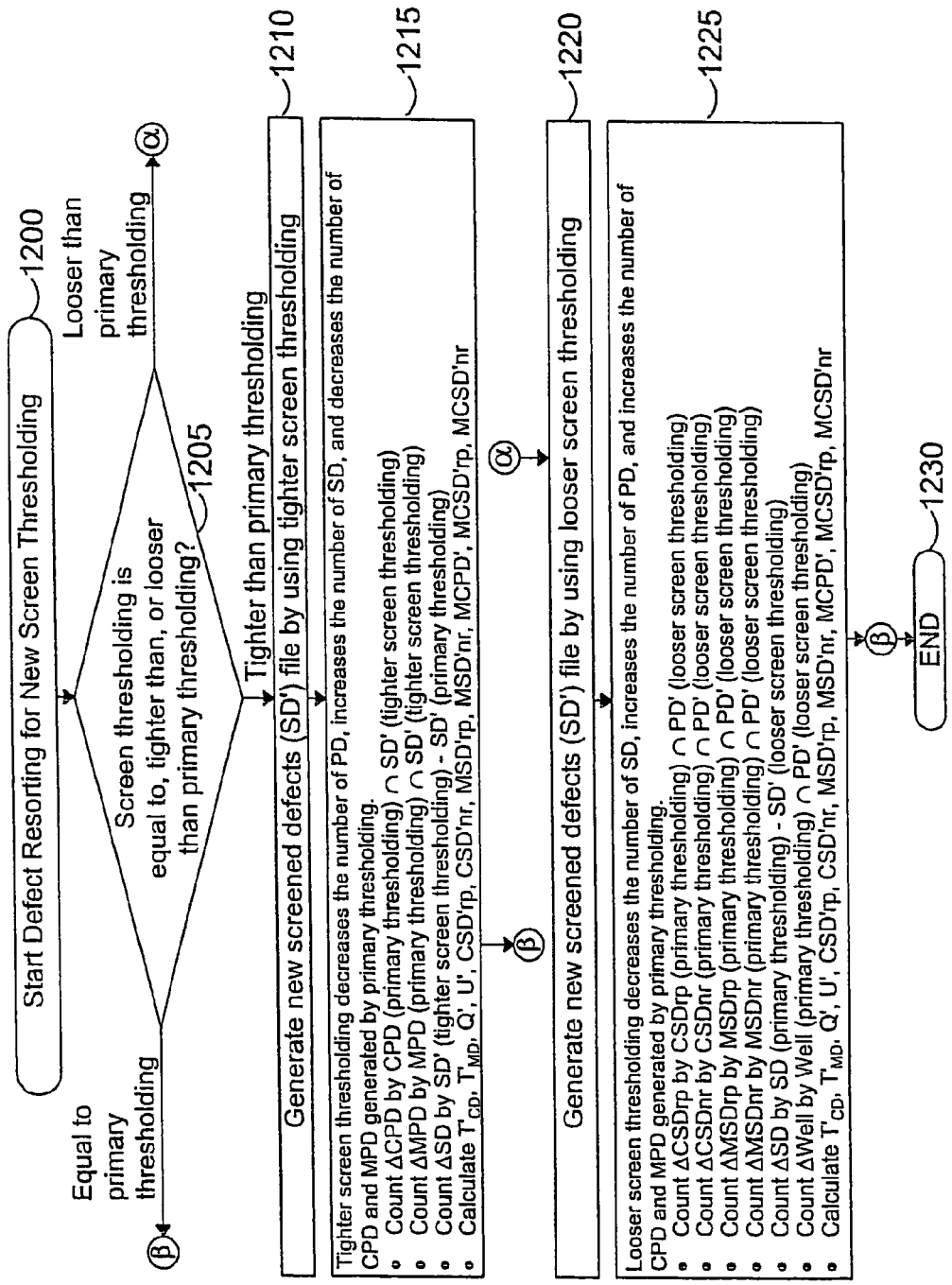
FIG. 12 is a flow chart of a process for defect resorting for new screen thresholding, in accordance with the present invention.

FIG. 12 is a flow chart showing the method used for defect resorting (step 1020 of FIG. 10). The process starts at step 1200, and proceeds to step 1205, where it is determined if the screen thresholding is equal to, tighter than, or looser than the primary thresholding. If the screen thresholding is looser than the primary thresholding, then the process jumps to step 1220. If the screen thresholding is equal to the primary thresholding, then the process jumps to step 1230, where the process ends.

If the screen thresholding is tighter than the primary thresholding, then the process proceeds to step 1210, where a new screened defects (SD') file is generated by using tighter screen thresholding. Tighter screen thresholding decreases the number of PD, increases the number of SD, and decreases the number of CPD and MPD compared to those of primary thresholding. The portion of decrease in the total cell or module defects is given by Rwell, which is defined as the number of well repaired pixel divided by the number of real defects that the repair operator reviews and is expressed as (SDrp−CSDrp−MSDrp)/(SD−Q), based on the assumption that the repair rate is maintained as constant.

At step 1215, the change in CPD (ΔCPD), the change in MPD (ΔMPD) and the change in SD (ΔSD) are calculated. The amount of increase of over-killed defects is given by subtracting the increase of real defect detection, (ΔCPD+ΔMPD), from the increase of screened defects, ΔSD. Thus, when the scanned thresholding parameters are tighter than the primary thresholding parameters, the cell and module defects and over-kill defects are as follows:

$T'_{CD}=CPD+CSDrp+CSDnr+CND-\Delta CPD(SDrp-CSDrp-MSDrp)/(SD-Q);$ (211)

$T'_{MD}=MPD+MSDrp+MSDnr+MND-\Delta MPD(SDrp-CSDrp-MSDrp)/(SD-Q);$ and (212)

$Q'=SDnr-(CSDnr+MSDnr)+\Delta SD-(\Delta CPD+\Delta MPD).$ (213)

Other parameters can be obtained in a similar way as follows:

Cell under-kill, $CPD'=CPD-\Delta CPD$; (214)

$CSD'rp=CSDrp+(\Delta CPD+\Delta MPD)CSDrp/(SD-Q)$; (215)

$CSD'nr=CSDnr+(\Delta CPD+\Delta MPD)CSDnr/(SD-Q)$; (216)

Module under-kill, $MPD'=MPD-\Delta MPD$; (217)

$MSD'rp=MSDrp+(\Delta CPD+\Delta MPD)MSDrp/(SD-Q)$; (218)

$MSD'nr=MSDnr+(\Delta CPD+\Delta MPD)MSDnr/(SD-Q)$; (219)

$MCPD'=MCPD-\Delta CPD$; (220)

$MCSD'rp=MCSDrp+(\Delta CPD+\Delta MPD)MCSDrp/(SD-Q)$; and (221)

$MCSD'nr=MCSDnr+(\Delta CPD+\Delta MPD)MCSDnr/(SD-Q)$. (222)

From Equations (208) and (211), the change in total cell defects ($\epsilon_{TCD}$) due to tighter thresholding parameters is given by:

$\epsilon_{TCD}=T_{CD}-T'_{CD}=\Delta CPD(SDrp-CSDrp-MSDrp)/(SD-Q)$. (223)

From Equations (209) and (212), the change in total module defects ($\epsilon_{TMD}$) due to tighter thresholding parameters is given by:

$\epsilon_{TMD}=T_{MD}-T'_{MD}=\Delta MPD(SDrp-CSDrp-MSDrp)/(SD-Q)$. (224)

From Equations (210) and (213), the change in over-kill defects ($\Delta Q$) due to tighter thresholding parameters is given by:

$\Delta Q=Q-Q'=\Delta CPD+\Delta MPD-\Delta SD$. (225)

From Equations (214) and (217), the change in under-kill defects ($\Delta U$) due to tighter thresholding parameters is given by:

$\Delta U=U-U'=(CPD+MPD)-(CPD'+MPD')=(CPD+MPD)-(CPD-\Delta CPD+MPD-\Delta MPD)=\Delta CPD+\Delta MPD$. (226)

From Equations (170), (171), (176), (177), (208), (209), (211), and (212), one obtains:

$Y'_C=1-(1-Y_C)(CPD+CSDrp+CSDnr+CND-\Delta CPD(SDrp-CSDrp-MSDrp)/(SD-Q))/(CPD+CSDrp+CSDnr+CND)$; (227)

$E_{YC}\equiv Y'_C Y_C=(1-Y_C)(1-(CPD+CSDrp+CSDnr+CND-\Delta CPD(SDrp-CSDrp-MSDrp)/(SD-Q))/(CPD+CSDrp+CSDnr+CND))$; (228)

$Y'_M=1-(1-Y_M)(MPD+MSDrp+MSDnr+MND-\Delta MPD(SDrp-CSDrp-MSDrp)/(SD-Q))/(MPD+MSDrp+MSDnr+MND)$; and (229)

$E_{YM}\equiv Y'_M-Y_M=(1-Y_M)(1-(MPD+MSDrp+MSDnr+MND-\Delta MPD(SDrp-CSDrp-MSDrp)/(SD-Q))/(MPD+MSDrp+MSDnr+MND))$. (230)

From Equations (94), (179), (208), (209), (211), (212), (225), and (226), one can obtain the expression for the profit increase from using the tighter thresholding parameters:

$P\cong-\gamma\Delta SDC_R+(Y_C-1)(1-(CPD+CSDrp+CSDnr+CND-\Delta CPD(SDrp-CSDrp-MSDrp)/(SD-Q))/(CPD+CSDrp+CSDnr+CND))I_C(C_M+C_{MI})+((1-(1-Y_M)(MPD+MSDrp+MSDnr+MND-\Delta MPD(SDrp-CSDrp-MSDrp)/(SD-Q))/(MPD+MSDrp+MSDnr+MND))(1-(1-Y_C)(CPD+CSDrp+CSDnr+CND-\Delta CPD(SDrp-CSDrp-MSDrp)/(SD-Q))/(CPD+CSDrp+CSDnr+CND))-Y_M Y_C)P_{VALUE}I_C$. (231)

The value of $\gamma$ can be obtained with the assumption that $O_{ATB}$ is very small compared with other parameters, as will now be described. From Equations (91), (92), (93), (210) and (226), one obtains:

$I_{AR}=\gamma(R+Q-U)-O_{ATB}\cong\gamma(R+Q-U)=\gamma((CPD+MPD+SD-Q)+Q-(CPD+MPD))=\gamma SD$, (232)

where R is the number of real defects before repair, and is given by:

$R=CPD+MPD+SD-Q$. (233)

Thus, from Equation (232), one obtains:

$\gamma=I_{AR}/SD$. (234)

From Equations (231) and (234), one obtains:

$P\cong-\Delta SDC_R I_{AR}/SD+(Y_C-1)(1-(CPD+CSDrp+CSDnr+CND-\Delta CPD(SDrp-CSDrp-MSDrp)/(SD-Q))/(CPD+CSDrp+CSDnr+CND))I_C(C_M+C_{MI})+((1-(1-Y_M)(MPD+MSDrp+MSDnr+MND-\Delta MPD(SDrp-CSDrp-MSDrp)/(SD-Q))/(MPD+MSDrp+MSDnr+MND))(1-(1-Y_C)(CPD+CSDrp+CSDnr+CND-\Delta CPD(SDrp-CSDrp-MSDrp)/(SD-Q))/(CPD+CSDrp+CSDnr+CND))-Y_M Y_C)P_{VALUE}I_C$. (235)

The values of $Y_C$, $Y_M$, $I_{AR}$, and $I_C$ can be obtained from the sample production runs using the primary thresholding parameters.

The use of looser screen thresholding parameters decreases the number of SD and successfully repaired pixels, increases the number of PD, and increases the number of CPD and MPD, compared to using the primary thresholding parameters. In order to analyze the effects of looser screen thresholding parameters, the results of the primary thresholding parameters, given by Equations (208) and (209), are expressed in a different format as follows:

$T_{CD}=CPD+CSDrp+CSDnr+CND=CPD+CSD'rp+CSD'nr+\Delta CSDrp+\Delta CSDnr+CND$; and (236)

$T_{MD}=MPD+MSDrp+MSDnr+MND=MPD+MSD'rp+MSD'nr+\Delta MSDrp+\Delta MSDnr+MND$, (237)

where $\Delta CSDrp$ indicates the number of CSDrp that are converted to CPD and is obtained by (CSDrp−CSD'rp), $\Delta CSDnr$ indicates the number of CSDnr that are converted to CPD and is obtained by (CSDnr−CSD'nr), $\Delta MSDrp$ indicates the number of MSDrp that are converted to MPD and is obtained by (MSDrp−MSD'rp), and $\Delta MSDnr$ indicates the number of MSDnr that are converted to MPD and is obtained by (MSDnr−MSD'nr).

The increase in the cell or module defects, which is due to the reduction of the number of successfully repaired pixels, is given by Rwc and Rwm, respectively, based on the assumption that the reverse rate of under-kill defects from the successfully repaired pixels remains constant, and is determined by the following ratios of under-kill defects for the primary thresholding parameters:

Rwc=Number of cell under-kill defects/Total number of under-kill defects=$CPD/(CPD+MPD)$; and (238)

Rwm=Number of module under-kill defects/Total number of under-kill defects=$MPD/(CPD+MPD)$. (239)

Thus, when the scanned thresholding parameters are looser than the primary thresholding parameters, the cell and module defects are given as follows (from Equations (208), (209), (238), and (239)):

$$T'_{CD} = T_{CD} + \Delta Well\ Rwc = CPD + CSDrp + CSDnr + CND + \Delta Well\ CPD/(CPD+MPD);\ \text{and} \quad (240)$$

$$T'_{MD} = T_{MD} + \Delta Well\ Rwm = MPD + MSDrp + MSDnr + MND + \Delta Well\ MPD/(CPD+MPD), \quad (241)$$

where $\Delta Well$ is the portion of successfully repaired pixels with primary thresholding that would not have been detected with looser thresholding, and become either cell or module under-kill defects. With looser thresholding, the number of over-killed defects is decreased because some portion of Q ($\Delta Q$) would not have been reported as defects. From FIG. 11, one obtains:

$$SD = SDrp + SDnr;\ \text{and} \quad (242)$$

$$SDrp = CSDrp + MSDrp + Well, \quad (243)$$

where Well is the number of successfully repaired defects. From Equations (210), (242) and (243), one obtains the following expression for $\Delta Q$:

$$\Delta Q = Q - Q' = (SDnr - (CSDnr + MSDnr)) - (SD'nr - (CSD'nr + MSD'nr)) = (SD - SDrp - (CSDnr + MSDnr)) - (SD' - SD'rp - (CSD'nr + MSD'nr)) = (SD - (CSDrp + MSDrp + Well) - (CSDnr + MSDnr)) - (SD' - (CSD'rp + MSD'rp + W'ell) - (CSD'nr + MSD'nr)) = (SD - SD') - (CSDrp - CSD'rp + MSDrp - MSD'rp + Well - W'ell) - (CSDnr - CSD'nr + MSDnr - MSD'nr) = \Delta SD - \Delta CSDrp - \Delta CSDnr - \Delta MSDrp - \Delta MSDnr - \Delta well. \quad (244)$$

Other parameters can be obtained by similar way as follows:

Cell under-kill, $CPD' = CPD + \Delta CSDrp + \Delta CSDnr + \Delta Well\ Rwc;$ (245)

$$CSD'rp = CSDrp - \Delta CSDrp; \quad (246)$$

$$CSD'nr = CSDnr - \Delta CSDnr; \quad (247)$$

Module under-kill, $MPD' = MPD + \Delta MSDrp + \Delta MSDnr + \Delta Well\ Rwm;$ (248)

$$MSD'rp = MSDrp - \Delta MSDrp; \quad (249)$$

$$MSD'nr = MSDnr - \Delta MSDnr; \quad (250)$$

$$MCPD' = MCPD + \Delta CSDrp + \Delta CSDnr + \Delta Well\ Rwc; \quad (251)$$

$$MCSD'rp = MCSDrp - \Delta MCSDrp;\ \text{and} \quad (252)$$

$$MCSD'nr = MCSDnr - \Delta MCSDnr. \quad (253)$$

From Equations (236) and (240), the effect of looser thresholding parameters over the primary thresholding parameters on the total cell defects ($\epsilon_{TCD}$) is obtained by:

$$\epsilon_{TCD} = T_{CD} - T'_{CD} = -\Delta Well\ Rwc = -\Delta Well\ CPD/(CPD+MPD). \quad (254)$$

From Equations (237) and (241), the effect of looser thresholding parameters over the primary thresholding parameters for the total module defects (ETMD) is obtained by $$\epsilon_{TMD} = T_{MD} - T'_{MD} = -\Delta Well\ Rwm = -\Delta Well\ MPD/(CPD+MPD). \quad (255)$$

From Equations (238), (239), (245) and (248), the effect of looser thresholding parameters over the primary thresholding parameters for the under-kill defects ($\Delta U$) is obtained by:

$$\Delta U = U - U' = (CPD + MPD) - (CPD' + MPD') = (CPD + MPD) - (CPD + \Delta CSDrp + \Delta CSDnr + \Delta Well\ Rwc + MPD + \Delta MSDrp + \Delta MSDnr + \Delta Well\ Rwm) = -(\Delta CSDrp + \Delta CSDnr + \Delta Well\ Rwc + \Delta MSDrp + \Delta MSDnr + \Delta Well\ Rwm) = -(\Delta CSDrp + \Delta CSDnr + \Delta Well + \Delta MSDrp + \Delta MSDnr). \quad (256)$$

From Equations (170), (171), (176), (177), (236), (237), (240) and (241), one obtains:

$$Y'_C = 1 - (1 - Y_C)(CPD + CSDrp + CSDnr + CND + \Delta Well\ CPD/(CPD+MPD))/(CPD + CSDrp + CSDnr + CND); \quad (257)$$

$$E_{YC} \equiv Y'_C - Y_C = (1 - Y_C)(1 - (CPD + CSDrp + CSDnr + CND + \Delta Well\ CPD/(CPD+MPD))/(CPD + CSDrp + CSDnr + CND)); \quad (258)$$

$$Y'_M = 1 - (1 - Y_M)(MPD + MSDrp + MSDnr + MND + \Delta Well\ MPD/(CPD+MPD))/(MPD + MSDrp + MSDnr + MND);\ \text{and} \quad (259)$$

$$E_{YM} \equiv Y'_M - Y_M = (1 - Y_M)(1 - (MPD + MSDrp + MSDnr + MND + \Delta Well\ MPD/(CPD+MPD))/(MPD + MSDrp + MSDnr + MND)). \quad (260)$$

From Equations (244) and (256), one obtains:

$$\Delta Q - \Delta U = \Delta SD. \quad (261)$$

From Equations (94), (179), (234), (236), (237), (240), (241) and (261), one can obtain the expression for the profit increase resulting from the looser thresholding parameters as follows:

$$P \cong \Delta SDC_R I_{AR}/SD + (Y_C - 1)(1 - (CPD + CSDrp + CSDnr + CND + \Delta Well\ CPD/(CPD+MPD))/(CPD + CSDrp + CSDnr + CND))I_C(C_M + C_{MT}) + ((1 - (1 - Y_M)(MPD + MSDrp + MSDnr + MND + \Delta Well\ MPD/(CPD+MPD))/(MPD + MSDrp + MSDnr + MND))(1 - (1 - Y_C)(CPD + CSDrp + CSDnr + CND + \Delta Well\ CPD/(CPD+MPD))/(CPD + CSDrp + CSDnr + CND)) - Y_M Y_C) P_{VALUE} I_C. \quad (262)$$

If the cell defects are repaired after the cell inspection stage 208, then the successful rate of cell repair, Rcell, can be obtained from FIG. 11 as follows:

$$Rcell = (RMCPD + RMCSDrp + RMCSDnr + RMCND)/(CPD + CSDrp + CSDnr + CND). \quad (263)$$

Once the profit maximization has been achieved for one screen thresholding parameter, then another profit maximization process is performed for another screen thresholding parameter in its scanning zone. This profit maximization process is repeated for all remaining screen thresholding parameters. The data for profit maximization should be obtained from the entire sample production runs, and the optimum screen thresholding parameters are preferably chosen that will maximize the profit for the entire production run.

The analysis described above is applicable to a production line model that does not utilize the optional cell and module repair stages 214 and 216. However, it should be appreciated that the analysis described above can be adapted for a production line model that does utilize the optional cell and model repair stages 214 and 216, while still falling within the scope of the present invention. Further, if the optional cell and module repair stages 214 and 216 are used, but the cell and module repair rates are so low as to not make a significant contribution to the yield rates, then the above-described analysis may be applied.

IX. Profit Maximization of Both Primary and New Test

Profit maximization for both new and primary test recipes using the same sample production runs will now be described. FIGS. 13A–13D illustrate a flow chart for profit maximization of new and primary test recipes.

The process starts at step 1300, and proceeds to step 1302, where sample production runs are tested by the TFT-array test equipment at the array test stage (AT) with a primary distribution function test recipe and primary thresholding parameters ($\theta_{PRIME}$). The test result is labeled primary defect files ($DF_{PRIME}$). Then, the same sample production runs are retested with the primary distribution function test recipe and $1^{st}$ proto thresholding, and the test result is labeled "$1^{st}$ PD file." Then, the same sample production runs are retested with a new distribution function test recipe and $2^{nd}$ proto thresholding, and the test result is called "$2^{nd}$ PD file."

Then, at step 1304, thresholding for the new distribution function test recipe ($\theta_{NEW}$), which is looser than the $2^{nd}$ proto thresholding, is applied to the $2^{nd}$ PD file to generate defect files labeled $DF_{NEW}$. Next, at step 1306, the sample production runs proceed to the TFT-array repair stage 204 and, as described above in Section VII, only the pixels commonly reported as defects in $DF_{PRIME}$ and $DF_{NEW}$ are reviewed by the operator of the TFT-array repair equipment, and the operator attempts to repair the pixels when the defects are visually confirmed. The sample production runs then proceed to next process stage, which is assumed to have not include the optional cell and module repair stages 214 and 216.

For evaluation of new distribution function test recipe, as described above in Section VII, the defects reported in $DF_{PRIME}$ and $DF_{NEW}$ are sorted out based on the repair actions performed on the defects and the results of cell and module inspections. Then, at step 1308, the effect of the new distribution function test recipe is calculated, as described above in Section VII.

Figure 13A:
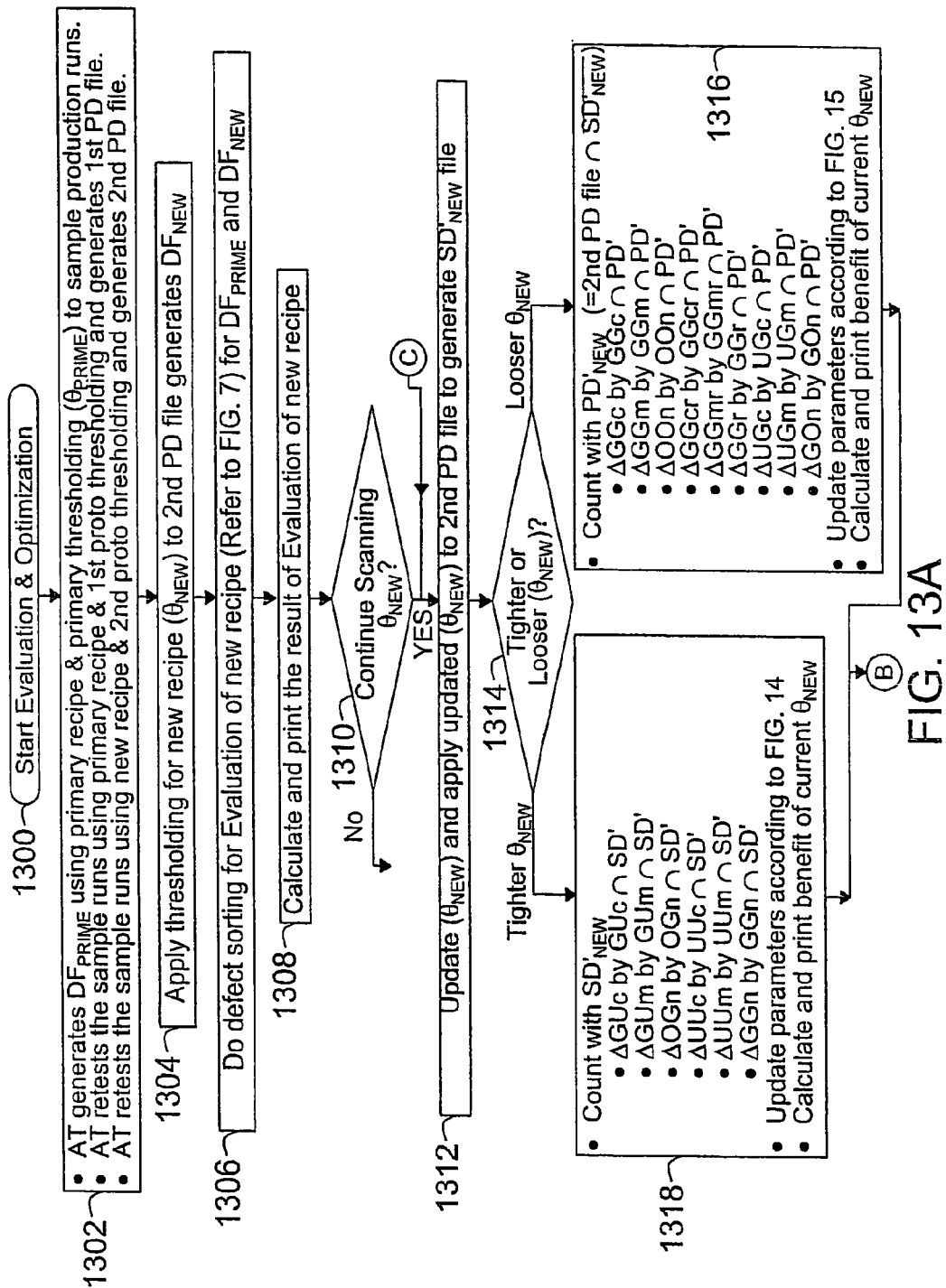
Figure 13C:
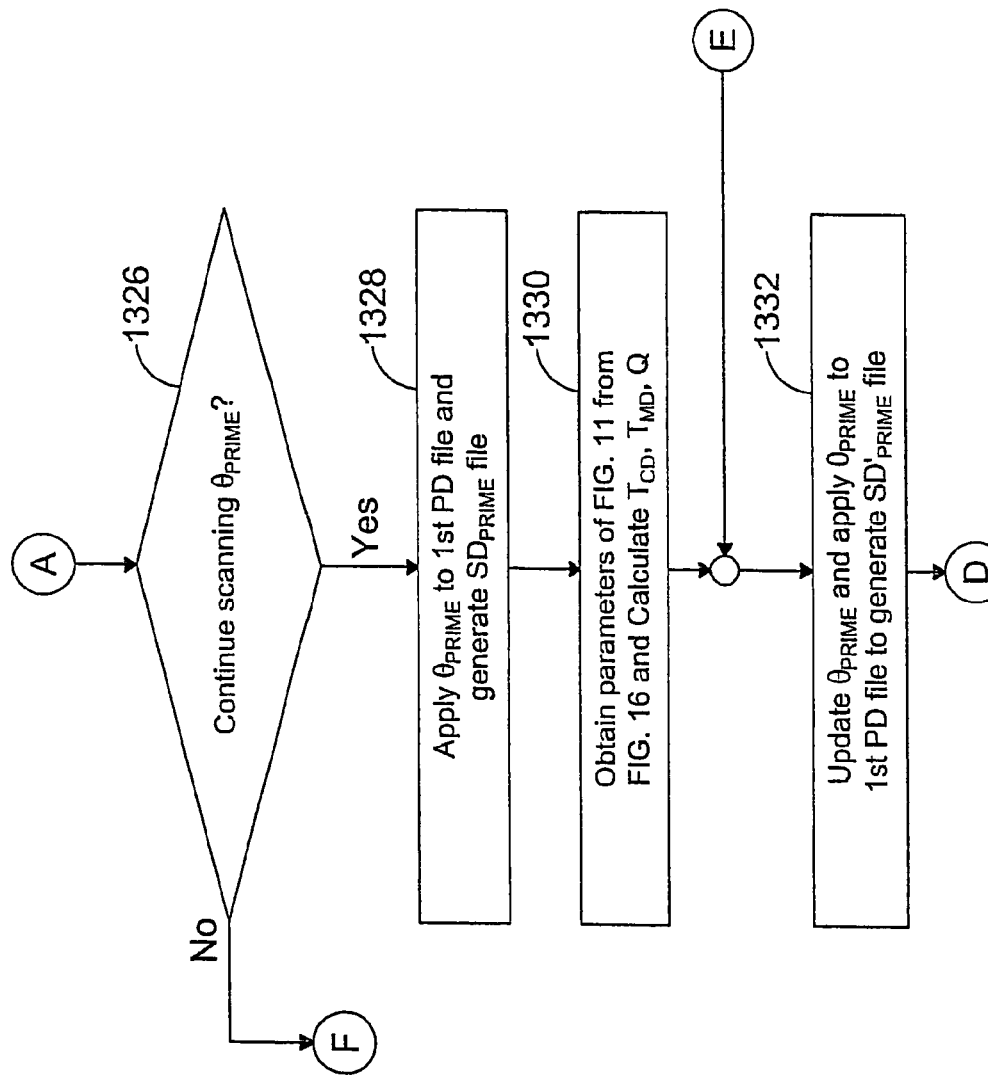
Figure 13D:
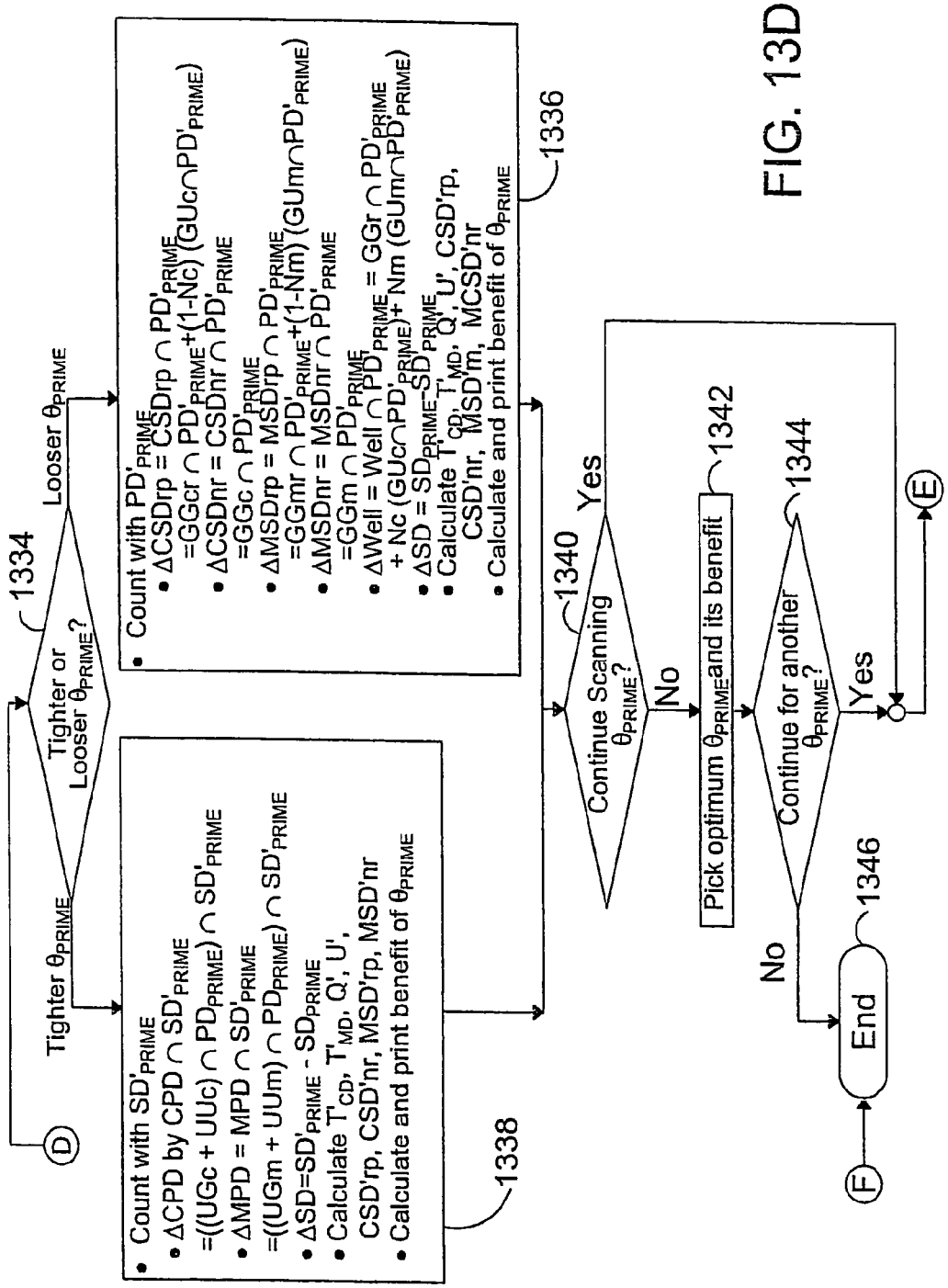

At step 1310, it is decided whether to continue tuning $\theta_{NEW}$, whose span is set by the user around the starting $\theta_{NEW}$ in step 1304 with a restriction that $\theta_{NEW}$ does not become tighter than the $2^{nd}$ proto thresholding. If the decision is made to not continue $\theta_{NEW}$ scanning, then the process jumps to step 1326 (FIG. 13C). Otherwise, the process continues to step 1312.

At step 1312, $\theta_{NEW}$ is updated and applied to the $2^{nd}$ PD file to generate an $SD'_{NEW}$ file. Next, at step 1314, it is determined if $\theta_{NEW}$ has been updated to tighter or looser thresholding. If $\theta_{NEW}$ is updated to tighter thresholding, then the process proceeds to step 1318, where the values of GUc, GUm, OGn, UUc, UUm and GGn decrease by $\Delta$GUc, $\Delta$GUm, $\Delta$OGn, $\Delta$UUc, $\Delta$UUm, and $\Delta$GGn, respectively, because the $SD'_{NEW}$ files report these as additional defects. FIG. 14 is a table showing how the defect sorting result is modified by the additional defects. In the table of FIG. 14, GGcr is increased by (1–Nc) $\Delta$GUc, GGmr by (1–Nm) $\Delta$GUm, and GGr by Nc$\Delta$GUc+Nm$\Delta$GUm, based on the same assumptions used in the table of FIG. 8 above.

If $\theta_{NEW}$ is updated to looser thresholding, the process proceeds to step 1316, where the values of GGc, GGm, OOn, GGcr, GGmr, GGr, UGc, UGm, and GOn decrease by $\Delta$GGc, $\Delta$GGm, $\Delta$OOn, $\Delta$GGcr, $\Delta$GGmr, $\Delta$GGr, $\Delta$UGc, $\Delta$UGm, and $\Delta$GOn, respectively, because these are included in the $2^{nd}$ PD files, but not included in the $SD'_{NEW}$ files as defects. FIG. 15 is a table showing how the defect sorting result is modified by the decrement of reported defects in the $SD'_{NEW}$. In the table of FIG. 15, GUc is increased by $\Delta$GGc+$\Delta$GGcr+$\Delta$GGr GUc/(GUc+GUm) and GUm is increased by $\Delta$GGm+$\Delta$GGmr+$\Delta$GGrGUm/(GUc+GUm), based on the assumption that the reverse rate to GUc or GUm from the successfully repaired pixels when $\theta_{NEW}$ becomes looser is maintained constant and is determined by the ratio of GUc and GUm for the starting $\theta_{NEW}$.

Once the parameters are updated, as shown in the tables of FIG. 14 or 15, then the effect of the new $\theta_{NEW}$ can be obtained by using the analysis of Section VII. Therefore, profit maximization can be achieved by taking the maximum value of P while $\theta_{NEW}$ is scanned through the starting $\theta_{NEW}$ in its scanning zone. Once the profit maximization has been achieved for one $\theta_{NEW}$ parameter, then another profit maximization process is performed for another $\theta_{NEW}$ parameter in its scanning zone. This profit maximization process is repeated for all the remaining $\theta_{NEW}$ parameters, and is carried out by steps 1312–1324. The data for profit maximization is preferably obtained from the entire sample production runs, and $\theta_{NEW}$ parameters are preferably chosen that will maximize profits (P) for the entire production runs.

Once the $\theta_{NEW}$ parameters are chosen, the process continues to step 1326, at which a decision is made as to whether to continue scanning primary thresholding parameters ($\theta_{PRIME}$), whose span is set by the user around the starting $\theta_{PRIME}$ in step 1302 with a restriction that $\theta_{PRIME}$ does not become tighter than the $1^{st}$ proto thresholding. If a decision is made to continue $\theta_{PRIME}$ scanning, then the process continues to step 1328, where $\theta_{PRIME}$ is applied to the $1^{st}$ PD file to generate a defect file labeled $SD_{PRIME}$ file. The parameters shown in FIG. 11 above must be defined for the profit maximization process for the primary test recipe. Since only the pixels commonly reported as defects in $DF_{PRIME}$ and $DF_{NEW}$ were reviewed by the operator of the TFT-array repair equipment, and the operator attempted to repair the pixels when the defects were visually confirmed, the table of FIG. 8 needs to be used for the defect sorting table for the assumed scenario of primary-test-only at the TFT-array test stage 202. By comparing the table of FIG. 8 and FIG. 11, one can obtain the revised defect sorting table in conjunction with the initial defect sorting of FIG. 11, for the assumed scenario of primary-test-only. This table is shown in FIG. 16.

The table of FIG. 16 is used in step 1330, to obtain the parameters of FIG. 11. The expressions for CPD, MPD, CND, and MND are obtained as follows:

$$CPD = (UGc + UUc) \cap PD_{PRIME} = \qquad (264)$$
$$(UGc + UUc) \cap (1^{st}PD \text{ file} \cap \overline{SD_{PRIME}});$$

$$MPD = (UGm + UUm) \cap PD_{PRIME} = \qquad (265)$$
$$(UGm + UUm) \cap (1^{st}PD \text{ file} \cap \overline{SD_{PRIME}});$$

$$CND=(UGc+UUc)-CPD; \text{ and} \qquad (266)$$

$$MND=(UGm+UUm)-MPD. \qquad (267)$$

Then, Equations (208) to (210) can be used to calculate the effect of the primary-test-only.

At step 1332, for tuning of the primary test recipe, $\theta_{PRIME}$ is updated and applied to the $1^{st}$ PD file to generate the $SD'_{PRIME}$ file. The process then proceeds to step 1334 (FIG. 13D), where it is determined if $\theta_{PRIME}$ has been updated to tighter or looser thresholding. If $\theta_{PRIME}$ is updated to tighter thresholding, then the process proceeds to step 1338, where the values of CPD and MPD decrease by $\Delta$CPD and $\Delta$MPD, respectively, and the value of SD increases by ΔSD, because the SD'$_{PRIME}$ files report additional defects of ΔSD. The expressions for ΔCPD, ΔMPD, and ΔSD are obtained as follows using Equations (264) and (265):

$$\Delta CPD = CPD \cap SD'_{PRIME} = ((UGc + UUc) \cap PD_{PRIME}) \cap SD'_{PRIME}; \quad (268)$$

$$\Delta MPD = MPD \cap SD'_{PRIME} = ((UGm + UUm) \cap PD_{PRIME}) \cap SD'_{PRIME}; \text{ and} \quad (269)$$

$$\Delta SD = SD'_{PRIME} - SD_{PRIME}. \quad (270)$$

If θ$_{PRIME}$ is updated to looser thresholding, then the process proceeds to step 1336, where the values of CSDrp, CSDnr, MSDrp, MSDnr, Well, and SD decrease by ΔCSDrp, ΔCSDnr, ΔMSDrp, ΔMSDnr, ΔWell, and ΔSD, respectively, because the SD'$_{PRIME}$ files do not report these as defects. The expressions for ΔCSDrp, ΔCSDnr, ΔMSDrp, ΔMSDnr, ΔWell, and ΔSD are obtained as follows using the table of FIG. 16:

$$\Delta CSDrp = CSDrp \cap PD'_{PRIME} = GGcr \cap PD'_{PRIME} + (1-Nc)(GUc \cap PD'_{PRIME}); \quad (271)$$

$$\Delta CSDnr = CSDnr \cap PD'_{PRIME} = GGc \cap PD'_{PRIME}; \quad (272)$$

$$\Delta MSDrp = MSDrp \cap PD'_{PRIME} = GGmr \cap PD'_{PRIME} + (1-Nm)(GUm \cap PD'_{PRIME}); \quad (273)$$

$$\Delta MSDnr = MSDnr \cap PD'_{PRIME} = GGm \cap PD'_{PRIME}; \quad (274)$$

$$\Delta Well = Well \cap PD'_{PRIME} = GGr \cap PD'_{PRIME} + Nc(Guc \cap PD'_{PRIME}) + Nm(Gum \cap PD'_{PRIME}); \text{ and} \quad (275)$$

$$\Delta SD = SD_{PRIME} - SD'_{PRIME}, \quad (276)$$

$$PD'_{PRIME}); \text{ and} \quad (275)$$

$$\Delta SD = SD_{PRIME} - SD'_{PRIME} \text{ where} \quad (276)$$
$$PD'_{PRIME} = 1^{st} PD \text{ file} \cap \overline{SD_{PRIME}}.$$

Once the parameters are updated using Equations (268) to (270) for tighter θ$_{PRIME}$ and using Equations (271) to (276) for looser θ$_{PRIME}$, then the effect of the new θ$_{PRIME}$ can be obtained by using the analysis of Section VIII. Therefore, profit maximization can be achieved by taking the maximum value of P while θ$_{PRIME}$ is scanned through the starting θ$_{PRIME}$ in its scanning zone. Once the profit maximization has been achieved for one θ$_{PRIME}$ parameter, then another profit maximization process is performed for another θ$_{PRIME}$ parameter in its scanning zone. This profit maximization process is repeated for all the remained θ$_{PRIME}$ parameters, and is carried out by steps 1332–1344. The data for profit maximization should be obtained from the entire sample production runs and θ$_{PRIME}$ parameters are preferably chosen that maximize the profit (P) for the entire production runs. The process then ends at step 1346.

X. Dependence of Thresholding Parameters on Defect Probability

As discussed in Section III, when measuring TFT-array panels using TFT-array test equipment, normal pixels have some voltage distribution around a mean value, as shown in FIG. 3, mainly due to the noise involved in measuring the pixel voltages. This causes some of the normal pixels with extreme noise magnitudes to be falsely reported as defects. The voltage distribution of defective pixels is not always distinct from that of normal pixels, and this causes some of the defective pixels to go through the TFT-array test undetected and become under-killed defects.

In general, tighter thresholding allows less under-killed defects and more over-killed defects, and looser thresholding allows more under-killed defects and less over-killed defects. Some defects exhibit very small defect signals, meaning that their pixel voltages are very close to normal pixel voltages, and very tight thresholding is required to detect these kinds of defects however, very tight thresholding results in too many over-killed defects. An improved thresholding scheme will now be described that detects more defects, but only increases over-killed defects by a negligibly small amount.

If multiple pixels in very close proximity have some deviation in their pixel voltages from the normal pixel voltage, then tighter thresholding than is needed for an isolated defect should be applied to these pixels, because multiple defects in very close proximity are much more likely to come from a single process abnormality that covers multiple pixels than from multiple isolated defects in close proximity, as will now be explained.

The probability of having the second isolated defect in the area of A$_{NEAR}$ near the first defect (PB$_{NT}$) is given by "PB$_{NT}$=A$_{NEAR}$/A$_{TOTAL}$", where A$_{TOTAL}$ is the total display area of the TFT-array panel. The area covering two defects in close proximity (A$_{NEAR}$) is usually very small compared to A$_{TOTAL}$. If A$_{NEAR}$ is defined by a 10 by 10 pixel array and A$_{TOTAL}$ is $10^6$ pixels, then PB$_{NT}$=10×10/$10^6$=$10^{-4}$.

If the probability of a single process abnormality covering two pixels is comparable to that of the first isolated defect, then the probability of having two defects in very close proximity due to a single process abnormality is larger (on the order of about $10^4$ larger) than that due to two isolated defects in close proximity. Therefore, the thresholding should be tighter for multiple defects in close proximity as the number of defects in close proximity increases, because the probability of having multiple defects in very close proximity due to a single process abnormality is increasingly larger on the order of about $10^4$ times the number of multiple defects than that due to multiple isolated defects in close proximity.

Single process abnormalities involving a signal line, such as data, scanning, or common line, can cause multiple defects along the line. The probability of having multiple isolated defects in a linear form is extremely low, based on reasoning similar to that explained above. Thus, the thresholding for defects in a line should also be tighter than the normal thresholding used for an isolated defect.

Process abnormalities can effect a relatively large area of the display, causing many isolated pixels over the relatively large area to have pixel voltages that are slightly deviated from the mean value of normal pixel voltages. Thus, tighter thresholding than that normally used for detecting an isolated defect should be applied to those defects scattered over the relatively large area, if the total number of defects in the defined area exceeds some pre-defined critical number. In general, tighter thresholding should be applied to multiple defects if they are caused by certain single process abnormalities with higher probability.

In some manufacturing lines, additional inspection equipment called automated optical inspection (AOI) equipment may also be used in the TFT-array process area to detect process abnormalities in the TFT-array panel. One of the difficulties of this type of inspection is that not every process abnormality detected by the AOI equipment is related to functional defects in the TFT-LCD unit, even though the process abnormalities detected by AOI equipment end up causing functional defects with reasonably high probability. Thus tighter thresholding should be applied to the defects already detected as process abnormalities by the AOI equipment. One can correlate the thresholding of the TFT-array test with the area of process abnormality detected by the AOI equipment, so that tighter thresholding is used as the area of process abnormality gets larger.

Therefore, in order to increase the defect detection efficiency, the first defect file should be generated by the tightest thresholding to detect all the potential defects. Then, the defect file is preferably screened by next tightest thresholding to detect the defects that satisfy the right criteria for that specific thresholding. This procedure is preferably continued until all the different thresholding levels are applied to the potential defects.

XI. Sample Results

As discussed above, the profit of TFT-LCD manufacturing can be maximized by optimizing the parameters of the TFT-array test. The profit maximization is performed by finding the test parameters that strike the right balance between improvement of cell and module yields, and reducing the costs of the TFT-array repair process.

Figure 17:
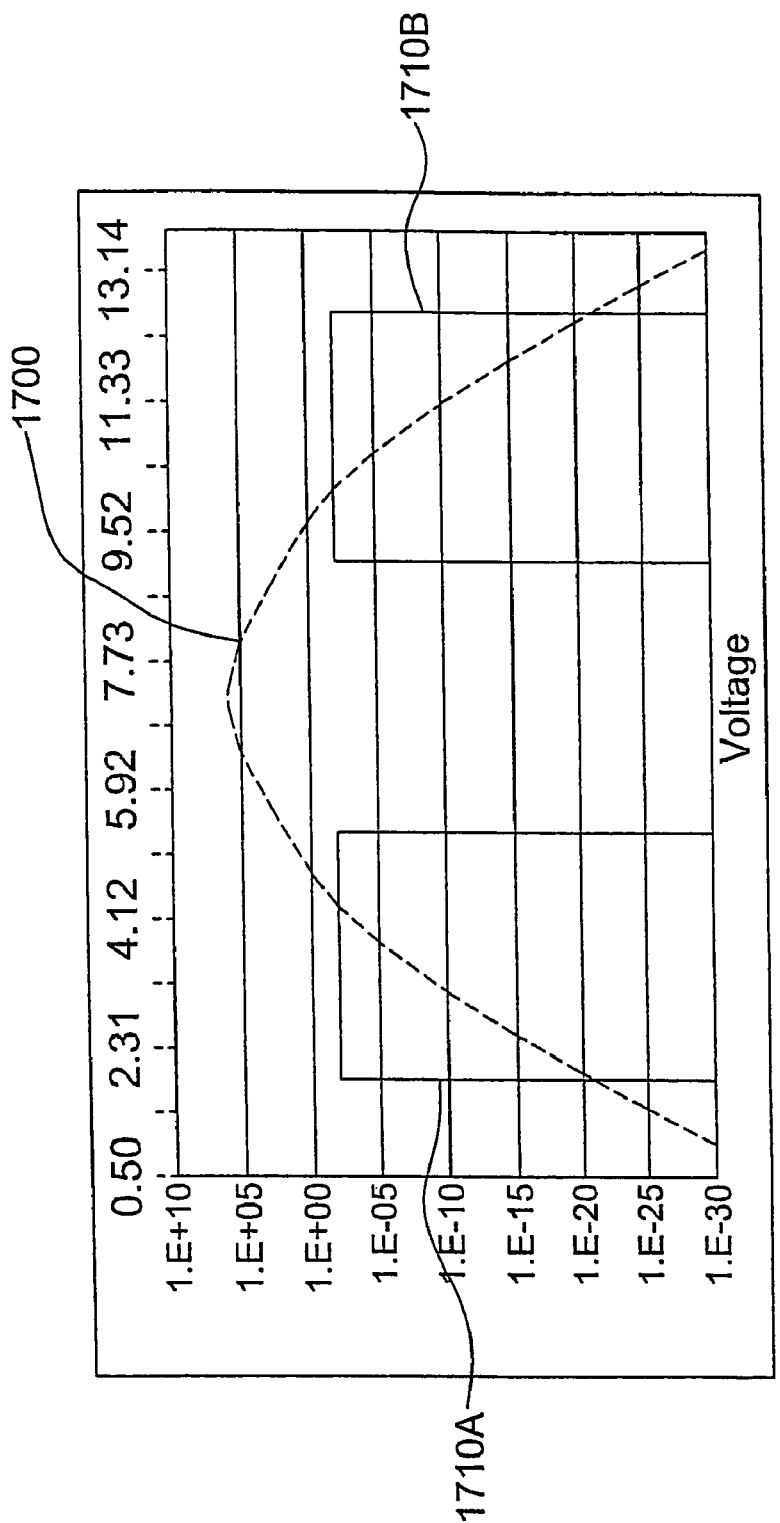
FIG. 17 is a plot showing an example of the distribution of normal and defective pixel voltages of a TFT-array panel, in accordance with the present invention.

FIG. 17 is a plot showing an example of the distribution of normal 1700 and defective 1710A and 1710B pixel voltages of a TFT-array panel, which are used as the basis of parameter optimization. The distribution of normal pixel voltages 1700 can be represented by a statistical distribution function, because of the large number of pixels per TFT-array panel, and because of sensor's statistical measurement properties. Thus, the distribution of normal pixel voltages 1700 can be well represented by a normal distribution function. The distribution of defect pixel voltages 1710A and 1710B is not fixed, but is dependent on the specific process problems. The distribution of defect pixel voltages 1710A and 1710B is assumed to be constant between arbitrary values of pixel voltages.

As discussed above, TFT-array test equipment uses thresholding parameters to detect the defective pixels. Pixels are reported as defects when their pixel voltages fall outside of the threshold region. If a normal pixel has its pixel voltage outside of the threshold region, then the normal pixel is wrongly reported as a defect and this kind of pixel is called an over-killed defect. If a defective pixel has its pixel voltage within the threshold region, then the defective pixel is wrongly reported as a normal pixel, and this kind of pixel is called an under-killed defect.

Figure 18:
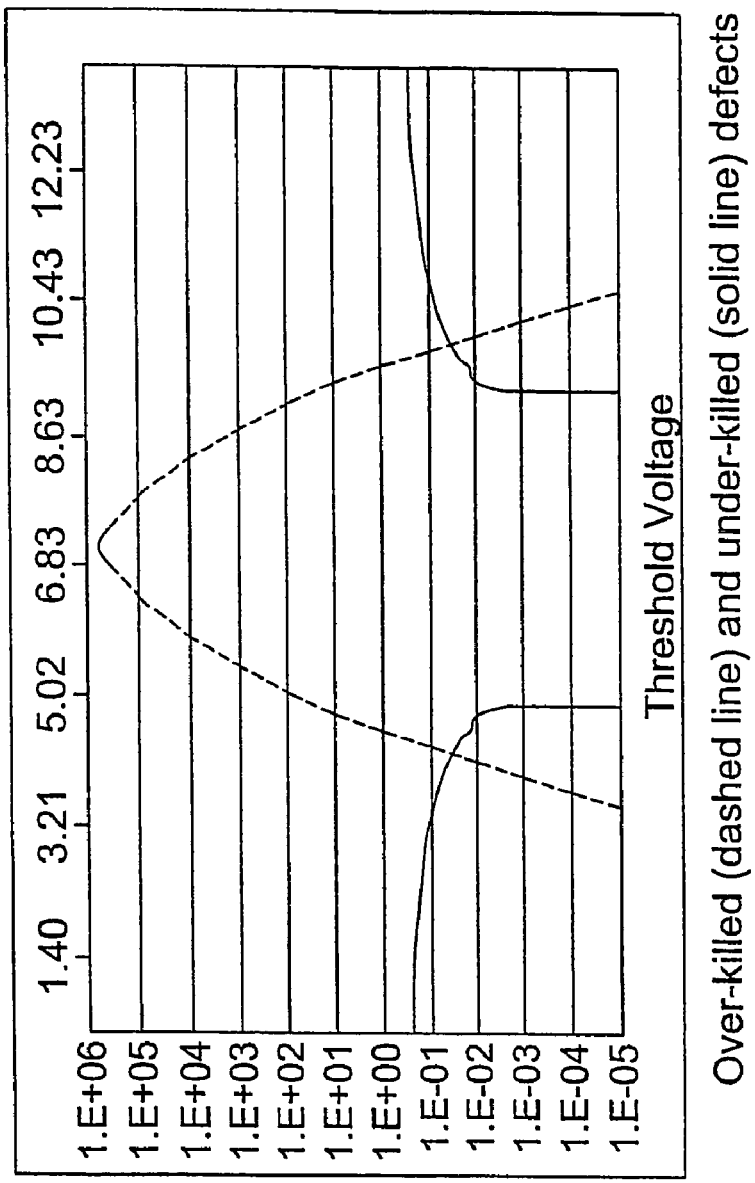
FIG. 18 is a plot showing the over-killed and under-killed defects as the threshold parameters are scanned, in accordance with the present invention.

FIG. 18 is a plot showing the over-killed and under-killed defects as the thresholding parameters are scanned, based on the distribution of normal and defect pixel voltages shown in FIG. 17.

Figure 19:
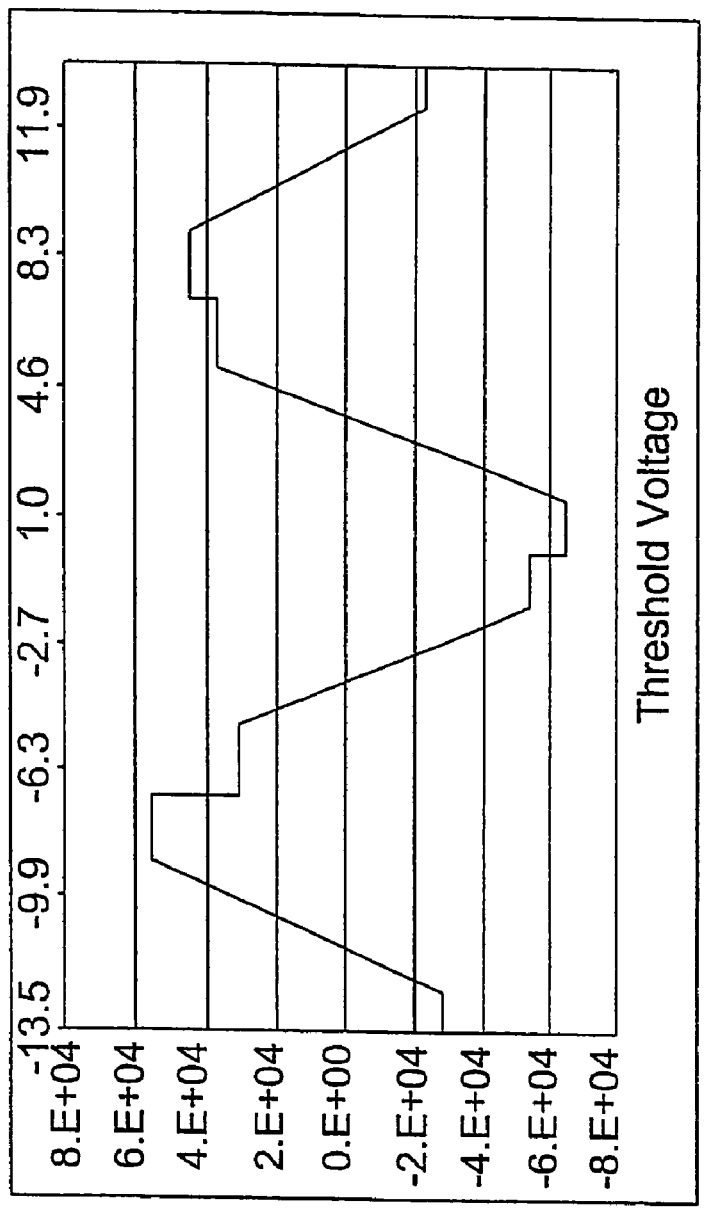
FIG. 19 is a plot showing the differential effect of changing threshold parameters for under-killed defects, in accordance with the present invention.

FIG. 19 is a plot showing the differential effect of changing threshold parameters for under-killed defects, as compared with the results obtained with the primary thresholding parameters, based on the under-killed defects shown in FIG. 18.

Figure 20:
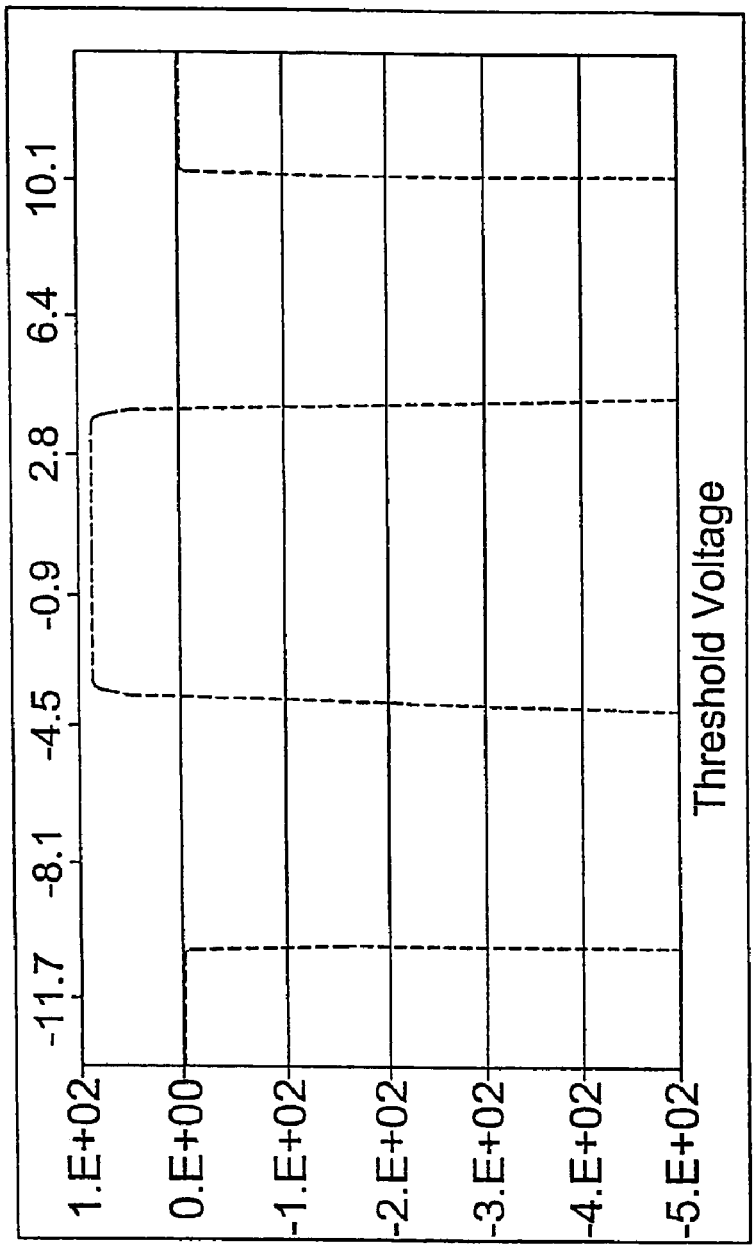
FIG. 20 is a plot showing the differential effect of changing threshold parameters on over-killed defects, in accordance with the present invention.

FIG. 20 is a plot showing the differential effect of changing threshold parameters on over-killed defects, as compared with the results obtained with the primary thresholding parameters, based on the over-killed defects shown in FIG. 18.

Figure 21:
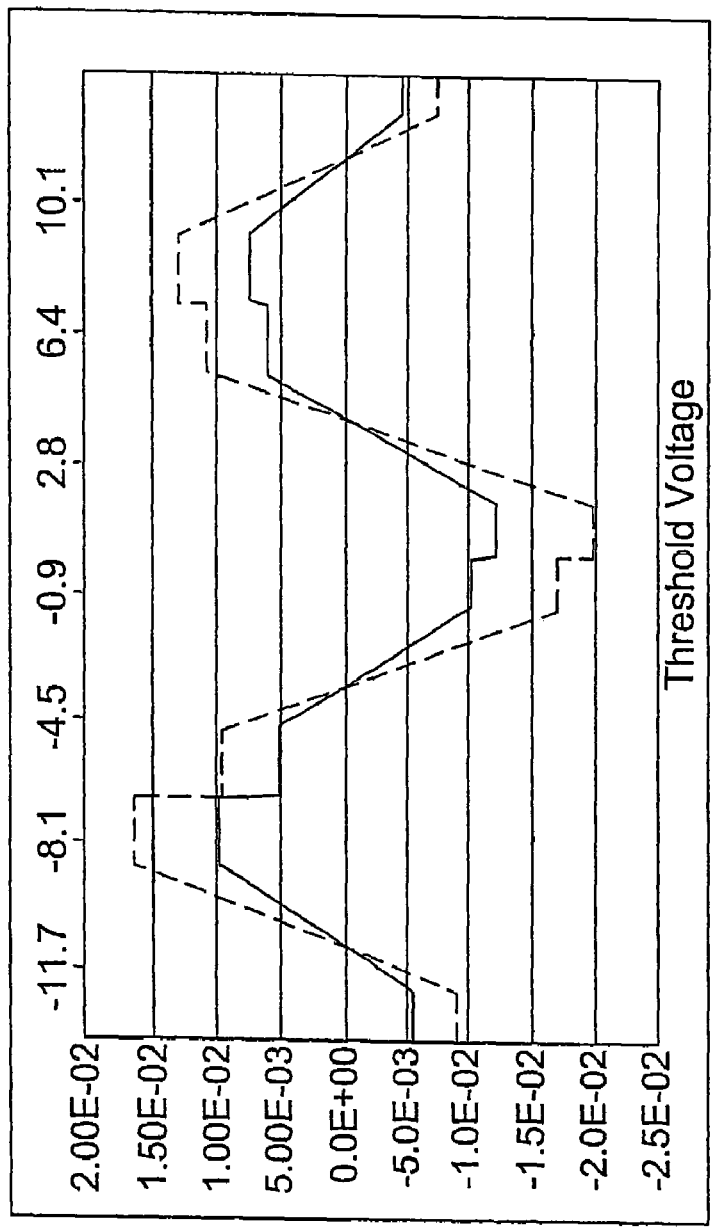
FIG. 21 is a plot showing the differential effect of changing threshold parameters on cell and module yields, in accordance with the present invention.

FIG. 21 is a plot showing the differential effect of changing threshold parameters on cell and module yields, as compared with the results obtained with the primary thresholding parameters, based on the differential under-killed defects shown in FIG. 19.

Figure 22:
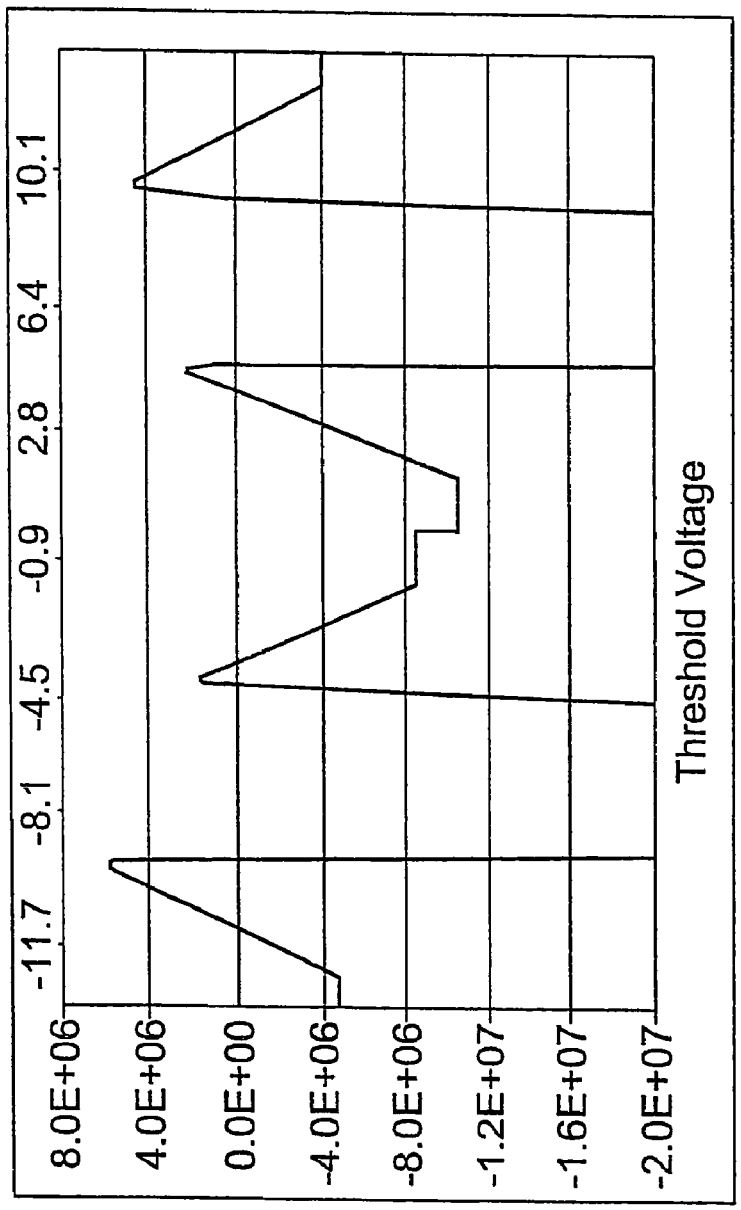
FIG. 22 is a plot showing the differential effect of changing threshold parameters on total monetary benefit, in accordance with the present invention.

FIG. 22 is a plot showing the differential effect of changing threshold parameters on total monetary benefit, as compared with the results obtained with the primary thresholding parameters, based on the differential effect on over-killed defects shown in FIG. 20 and the differential effect on cell and module yields shown in FIG. 21.

Figure 23:
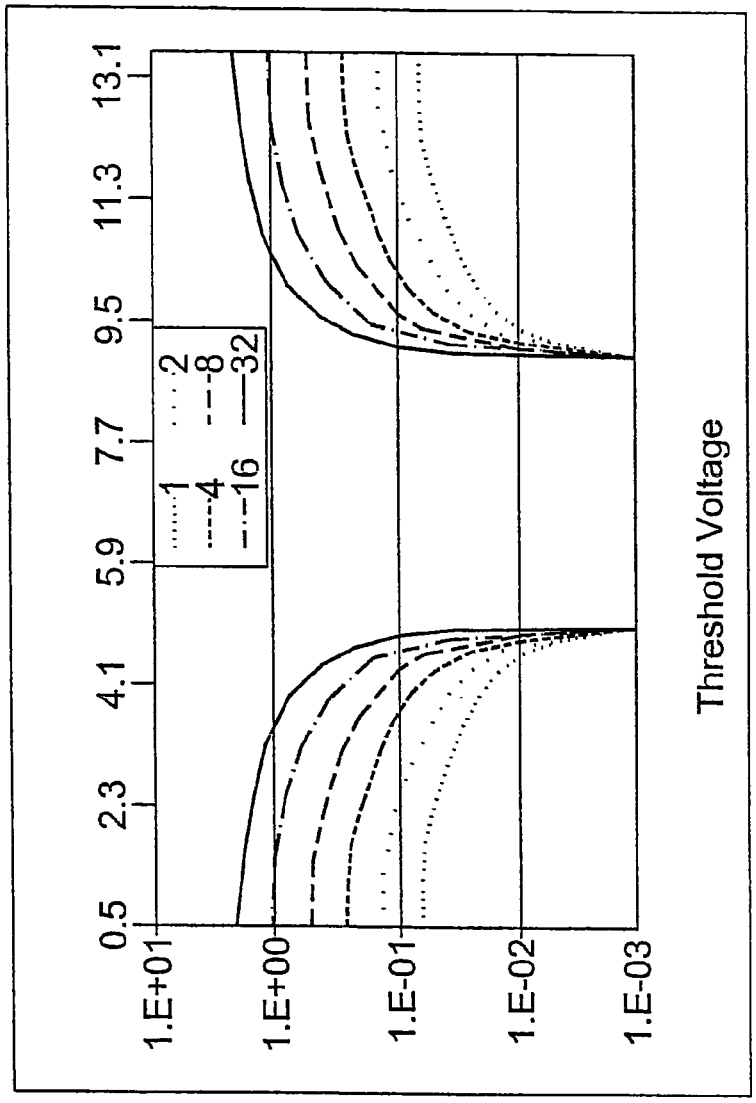
FIG. 23 is a plot showing the under-killed defects for different defect density values, in accordance with the present invention.

FIG. 23 is a plot showing the under-killed defects for different defect density values. The numbers in the legend indicate the multiplication constants applied to the starting defect density used in FIG. 17.

Figure 24:
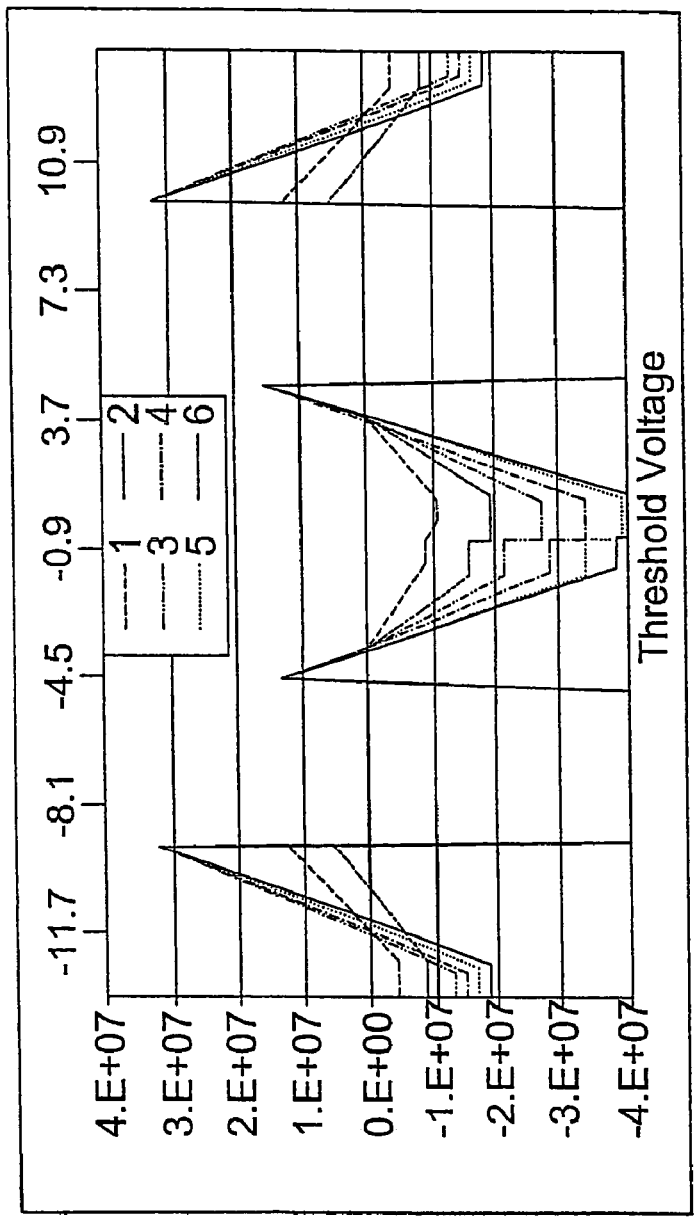
FIG. 24 is a plot showing the differential effect of changing threshold parameters on the total monetary benefit, in accordance with the present invention.

FIG. 24 is a plot showing the differential effect of changing threshold parameters on the total monetary benefit for the defect densities used in FIG. 23. The numbers in the legend indicate the multiplication constants applied to the starting defect density used in FIG. 17. The profit maximization can be achieved by taking the thresholding parameters that yield the peak points of total monetary benefit, while the thresholding variables are scanned around the primary thresholding parameters.

Figure 25:
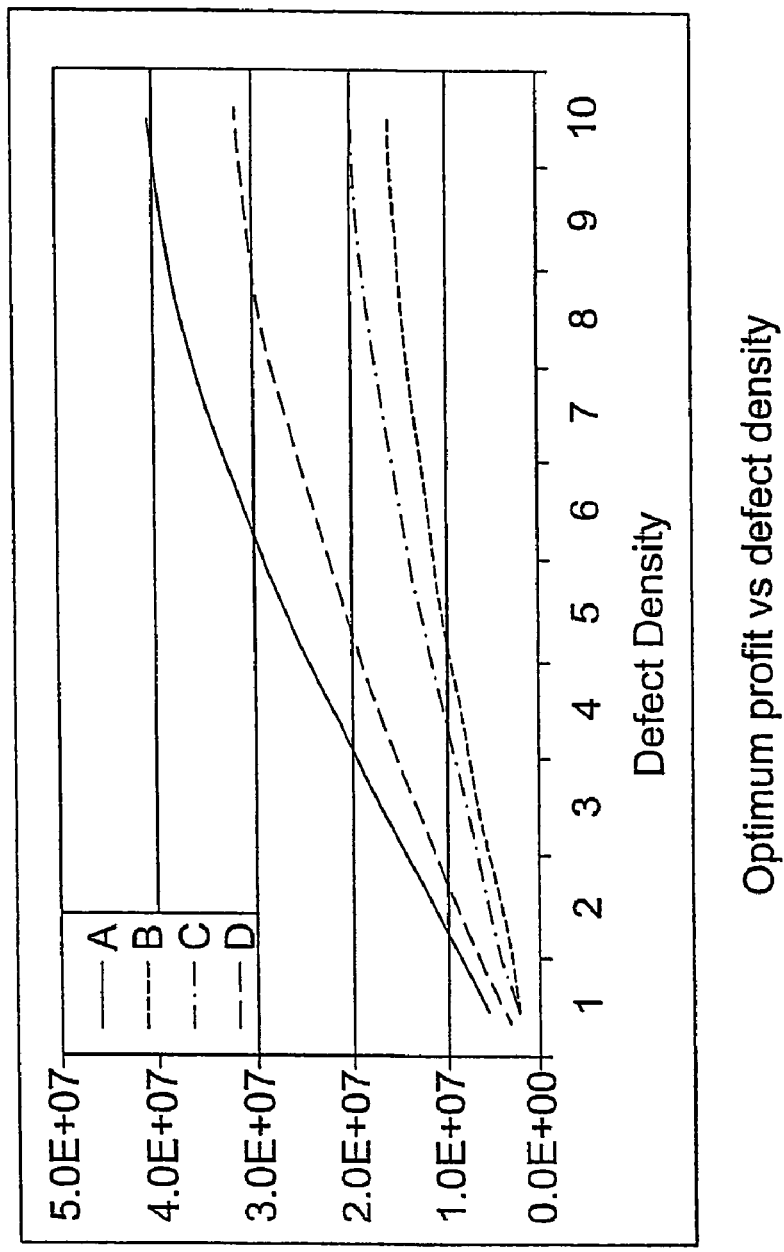
FIG. 25 is a plot showing how the profit improvement increases with increasing defect density, in accordance with the present invention.

FIG. 25 is a plot showing how the profit improvement increases with increasing defect density, based on the differential total monetary benefit shown in FIG. 24. The alphabets in the legend indicate the different scanning zones used in FIG. 24.

The processor 200 (FIG. 1A), the comparison unit 222 (FIG. 1B), the estimating unit 224 (FIG. 1B) and/or the controller 366 (FIG. 3B) can be implemented on a server, which may be or include, for instance, a work station running the Microsoft Windows™ NT™, Windows™ 2000, UNIX, LINUX, XENIX, IBM, AIX, Hewlett-Packard UX™, Novel™, Sun Micro Systems Solaris™, OS/2™, BeOS™, Mach, Apache Open Step™, or other operating system or platform. However, the processor 200, the comparison unit 222, the estimating unit 224 and/or the controller 366 could also be implemented on a programmed general purpose computer, a special purpose computer, a programmed microprocessor or microcontroller and peripheral integrated circuit elements, an ASIC or other integrated circuit, a hardwired electronic or logic circuit such as a discrete element circuit, a programmable logic device such as a FPGA, PLD, PLA, or PAL, or the like. In general, any device on which a finite state machine capable of implementing the process steps, methods and mathematical routines discussed above can be used to implement the processor 200, the comparison unit 222, the estimating unit 224 and/or the controller 366.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of detecting defects in an electrode array, wherein the electrode array defines a plurality of pixels, comprising:

applying a test signal to the pixels;
measuring a voltage at each pixel;
deriving a low frequency voltage from the measured voltage to yield a reference pixel voltage for each pixel;
calculating thresholding parameters for each pixel based on the reference pixel voltage; and determining if a pixel is defective based on its respective calculated thresholding parameters.

2. The method of claim 1, wherein calculating thresholding parameters for each pixel comprises:
determining a standard deviation of a voltage distribution for a group of at least two pixels;
multiplying the standard deviation value by a predetermined constant to yield an offset value; and
adding the offset value to and/or subtracting the offset value from the reference pixel voltage of a pixel in the group to yield the thresholding parameters for the pixel in the group.

3. The method of claim 2, wherein the test signal comprises a voltage, and wherein the thresholding parameters for each pixel are calculated in accordance with the following relationships:

$$Vthi+=[V_{PR}+(C_{HI+}\sigma_P)];$$

$$Vtlo+=[V_{PR}-C_{LO+}\sigma_P)];$$

$$Vthi-=[V_{NR}+C_{HI-}\sigma_P)]; \text{ and}$$

$$Vtlo-=[V_{NR}-C_{LO-}\sigma_P)];$$

where Vthi+ and Vtlo+ are thresholding parameters for pixels that are driven with a positive voltage, Vthi– and Vtlo– are thresholding parameters for pixels that are driven with a negative voltage, $V_{PR}$ and $V_{NR}$ are reference pixel voltage values for the positively and negatively driven pixels, respectively, $C_{HI+}$, $C_{Lo+}$, $C_{HI-}$ and $C_{LO-}$ are predetermined constants, and $\sigma_p$ is the standard deviation value.

4. The method of claim 3, wherein Vthi+ and Vtlo+ define a first threshold region, and Vthi– and Vtlo– defined a second threshold region.

5. The method of claim 4, wherein a pixel driven with a positive voltage is classified as defective if the measured voltage for that pixel falls outside the first threshold region.

6. The method of claim 4, wherein a pixel driven with a negative voltage is classified as defective if the measured voltage for that pixel falls outside the second threshold region.

7. The method of claim 2, wherein the standard deviation is calculated based on a high frequency component of the voltage distribution.

8. The method of claim 1, wherein the thresholding parameters define a threshold region, and wherein a pixel is classified as defective if it falls outside the threshold region.

9. The method of claim 1, wherein the electrode array comprises a thin-film transistor (TFT)-array.

10. The method of claim 1, wherein the low frequency voltage at each pixel is derived by low-pass filtering the measured voltage at the pixel.

11. The method of claim 1, wherein a conversion factor is applied to the low frequency voltage at each pixel so that reference pixel voltages of all the pixels are substantially the same.

12. The method of claim 1, wherein the electrode array comprises a one-dimensional electrode array.

13. The method of claim 1, wherein the electrode array comprises a two-dimensional electrode array.

14. A system for detecting defects in an electrode array, wherein the electrode array defines a plurality of pixels, comprising:
an electrode array tester; and
a controller, wherein the controller:
controls the electrode array tester so that a test signal is applied to the plurality of pixels,
determines a voltage at each pixel from pixel voltages measured by the electrode array tester,
derives a low frequency voltage from the measured voltage to yield a reference pixel voltage for each pixel;
calculates thresholding parameters for each pixel based on the reference pixel voltage; and
determines if a pixel is defective based on its respective calculated thresholding parameters.

15. The system of claim 14, wherein the controller calculates thresholding parameters by:
determining a standard deviation of a voltage distribution for a group of at least two pixels;
multiplying the standard deviation value by a predetermined constant to yield an offset value; and
adding the offset value to and/or subtracting the offset value from the reference pixel voltage of a pixel in the group to yield the thresholding parameters for the pixel in the group.

16. The system of claim 15, wherein the test signal comprises a voltage, and wherein the controller calculates the thresholding parameters for each pixel in accordance with the following relationships:

$$Vth+=[V_{PR}+(C_{HI+}\sigma_p)];$$

$$Vtlo+=[V_{PR}-C_{LO+}\sigma_p)];$$

$$Vthi-=[V_{NR}+C_{HI-}\sigma_p)]; \text{ and}$$

$$Vtlo-=[V_{NR}-C_{LO-}\sigma_p)];$$

where Vthi+ and Vtlo+ are thresholding parameters for pixels that are driven with a positive voltage, Vthi– and Vtlo– are thresholding parameters for pixels that are driven with a negative voltage, $V_{PR}$ and $V_{NR}$ are reference pixel voltage values for the positively and negatively driven pixels, respectively, $C_{HI-}$, $C_{LO-}$, $C_{HI-}$ and $C_{LO-}$ are predetermined constants, and $\sigma_p$ is the standard deviation value.

17. The system of claim 16, wherein Vthi+ and Vtlo+ define a first threshold region, and Vthi– and Vtlo+ defined a second threshold region.

18. The system of claim 17, wherein a pixel driven with a positive voltage is classified as defective by the controller if the measured voltage for that pixel falls outside the first threshold region.

19. The system of claim 17, wherein a pixel driven with a negative voltage is classified as defective by the controller if the measured voltage for that pixel falls outside the second threshold region.

20. The system of claim 15, wherein the controller calculates the standard deviation based on a high frequency component of the voltage distribution.

21. The system of claim 14, wherein the thresholding parameters define a threshold region, and wherein a pixel is classified as defective if it falls outside the threshold region.

22. The system of claim 14, wherein the electrode array tester comprises a thin-film transistor (TFT)-array tester.

23. The system of claim 14, wherein the controller derives the low frequency voltage at each pixel by low-pass filtering the measured voltage at the pixel.

24. The system of claim 14, wherein the controller applies a conversion factor to the low frequency voltage at each pixel so that reference pixel voltages of all the pixels are substantially the same.

25. The system of claim 14, wherein the electrode array comprises a one-dimensional electrode array.

26. The system of claim 14, wherein the electrode array comprises a two-dimensional electrode array.

* * * * *